(12) United States Patent
Santamaria

(10) Patent No.: US 12,448,419 B2
(45) Date of Patent: Oct. 21, 2025

(54) METHODS AND COMPOSITIONS FOR TREATING INFLAMMATION

(71) Applicant: UTI Limited Partnership, Calgary (CA)

(72) Inventor: Pedro Santamaria, Calgary (CA)

(73) Assignee: UTI Limited Partnership, Calgary (CA)

( * ) Notice: Subject to any disclaimer, the term of this patent is extended or adjusted under 35 U.S.C. 154(b) by 1253 days.

(21) Appl. No.: 17/153,212

(22) Filed: Jan. 20, 2021

(65) Prior Publication Data

US 2021/0230237 A1  Jul. 29, 2021

Related U.S. Application Data

(63) Continuation of application No. 13/842,302, filed on Mar. 15, 2013, now Pat. No. 10,988,516.

(60) Provisional application No. 61/615,743, filed on Mar. 26, 2012.

(51) Int. Cl.
| | | |
|---|---|---|
| *A61K 39/385* | (2006.01) | |
| *A61K 39/00* | (2006.01) | |
| *A61K 39/02* | (2006.01) | |
| *A61K 47/69* | (2017.01) | |
| *C07K 14/195* | (2006.01) | |
| *C07K 14/47* | (2006.01) | |

(52) U.S. Cl.
CPC .......... *C07K 14/47* (2013.01); *A61K 39/0008* (2013.01); *A61K 39/0216* (2013.01); *A61K 47/6923* (2017.08); *C07K 14/195* (2013.01); *A61K 2039/55555* (2013.01); *Y10T 428/2982* (2015.01)

(58) Field of Classification Search
None
See application file for complete search history.

(56) References Cited

U.S. PATENT DOCUMENTS

| | | |
|---|---|---|
| 4,367,110 A | 1/1983 | Yoshikawa |
| 4,414,148 A | 11/1983 | Jansen |
| 4,452,901 A | 6/1984 | Gordon |
| 4,478,946 A | 10/1984 | Van der Merwe |
| 4,554,101 A | 11/1985 | Hopp |
| 4,569,789 A | 2/1986 | Blattler |
| 4,589,071 A | 5/1986 | Yamamuro |
| 4,589,330 A | 5/1986 | Teron |
| 4,659,839 A | 4/1987 | Nicolotti |
| 4,671,958 A | 6/1987 | Rodwell |
| 4,680,338 A | 7/1987 | Sundoro |
| 4,699,784 A | 10/1987 | Shih |
| 4,818,542 A | 4/1989 | Deluca |
| 4,859,839 A | 8/1989 | Tetelman |
| 5,258,499 A | 11/1993 | Konigsberg |
| 5,543,391 A | 8/1996 | Yatvin |
| 5,676,926 A | 10/1997 | Platzek |
| 5,676,928 A | 10/1997 | Klaveness |
| 5,731,168 A | 3/1998 | Carter |
| 5,807,706 A | 9/1998 | Carter |
| 5,821,333 A | 10/1998 | Carter |
| 5,840,839 A | 11/1998 | Wang |
| 6,103,379 A | 8/2000 | Margel |
| 6,387,498 B1 | 5/2002 | Coulter |
| 6,651,655 B1 | 11/2003 | Licalsi |
| 6,688,494 B2 | 2/2004 | Pozarnsky |
| 6,712,997 B2 | 3/2004 | Won |
| 6,797,514 B2 | 9/2004 | Berenson |
| 6,846,474 B2 | 1/2005 | Nayfeh |
| 6,929,675 B1 | 8/2005 | Bunge |
| 7,060,121 B2 | 6/2006 | Lin |
| 7,090,973 B1 | 8/2006 | Breton |
| 7,183,065 B2 | 2/2007 | Braun |
| 7,285,289 B2 | 10/2007 | Nagy |
| 7,326,399 B2 | 2/2008 | Zhou |
| 7,332,586 B2 | 2/2008 | Franzen |
| 7,361,733 B2 | 4/2008 | Hershberg |
| 7,572,631 B2 | 8/2009 | Berenson |
| 7,642,228 B2 | 1/2010 | Carter |
| 7,695,936 B2 | 4/2010 | Carter |
| 7,785,801 B2 | 8/2010 | Tuereci |
| 7,795,224 B2 | 9/2010 | Eisenbach |
| 7,812,116 B2 | 10/2010 | Bae |
| 7,816,814 B1 | 10/2010 | Hennessy |
| 8,216,805 B2 | 7/2012 | Carter |
| 8,354,110 B2 | 1/2013 | Santamaria |
| 8,679,785 B2 | 3/2014 | Carter |
| 8,835,144 B2 | 9/2014 | Jiang |

(Continued)

FOREIGN PATENT DOCUMENTS

| | | |
|---|---|---|
| CA | 2517097 | 9/2004 |
| CA | 2717719 | 8/2009 |

(Continued)

OTHER PUBLICATIONS

Xu et al., Evolution of Symbiotic Bacteria in the Distal Human Intestine. PLoS Biol. 5 (7), E156 (2007) (Year: 2007).*
Clemente et al. The Impact of the Gut Microbiota on Human Health: An Integrative View (Cell, 2012, 148:1258-1270). (Year: 2012).*
't Hart, B. et al., "Modelling of Multiple Sclerosis: Lessons Learned in a Non-Human Primate", Lancet Neurol., 3(10):588-97, (2004).
Aichele, P. et al., "Peptide-induced T-cell Tolerance to Prevent Autoimmune Diabetes in a Transgenic Mouse Model", Proc Natl Acad Sci USA, 91(2):444-8, (1994).
Altman, J. et al., "Phenotypic Analysis of Antigen-Specific T Lymphocytes", Science, 274(5284):94-6, (1996).
Altschul, S. et al., "Basic Local Alignment Search Tool", J Mol Biol., 215(3):403-10, (1990).
Amrani, A. et al., "Expansion of the Antigenic Repertoire of a Single T Cell Receptor Upon T Cell Activation", J Immunol., 167(2):655-66, (2001).

(Continued)

*Primary Examiner* — Arthur S Leonard

(74) *Attorney, Agent, or Firm* — Global Patent Group Inc.; Cynthia Hathaway; Gina F. Nellesen

(57) ABSTRACT

This disclosure provides therapeutic compositions and methods for inducing an anti-inflammatory response and/or treating inflammation in the gastrointestinal tract and/or accumulating gut microbial antigen-specific anti-inflammatory T cells in a patient in need thereof.

18 Claims, 40 Drawing Sheets

Specification includes a Sequence Listing.

(56) References Cited

U.S. PATENT DOCUMENTS

| | | |
|---|---|---|
| 9,149,440 B2 | 10/2015 | Turos |
| 9,511,151 B2 | 12/2016 | Santamaria |
| 9,603,948 B2 | 3/2017 | Santamaria |
| 10,004,703 B2 | 6/2018 | Jacobson |
| 10,012,045 B2 | 7/2018 | Lajesic |
| 10,080,808 B2 | 9/2018 | Santamaria |
| 10,124,045 B2 | 11/2018 | Santamaria |
| 10,172,955 B2 | 1/2019 | Santamaria |
| 10,441,556 B2 | 10/2019 | Jacobson |
| 10,485,882 B2 | 11/2019 | Santamaria |
| 10,632,193 B2 | 4/2020 | Mccreedy |
| 10,905,773 B2 | 2/2021 | Santamaria |
| 10,988,516 B2 | 4/2021 | Santamaria |
| 11,000,596 B2 | 5/2021 | Santamaria |
| 11,338,024 B2 | 5/2022 | Santamaria |
| 12,011,480 B2 | 6/2024 | Santamaria |
| 2003/0068363 A1 | 4/2003 | Clark |
| 2003/0124149 A1 | 7/2003 | Shalaby |
| 2004/0115216 A1 | 6/2004 | Schneck |
| 2004/0137642 A1 | 7/2004 | Erfle |
| 2004/0197304 A1 | 10/2004 | Chen |
| 2004/0224402 A1 | 11/2004 | Bonyhadi |
| 2004/0265392 A1 | 12/2004 | Tovar |
| 2005/0003431 A1 | 1/2005 | Wucherpfennig |
| 2005/0118102 A1 | 6/2005 | Xiang |
| 2005/0129617 A1 | 6/2005 | Tan |
| 2005/0202032 A1 | 9/2005 | Kaufman |
| 2005/0208120 A1 | 9/2005 | Albani |
| 2006/0216239 A1 | 9/2006 | Zhang |
| 2006/0219239 A1 | 10/2006 | Plaschkes |
| 2006/0246524 A1 | 11/2006 | Bauer |
| 2007/0054337 A1 | 3/2007 | Ferning |
| 2007/0059775 A1 | 3/2007 | Hultman |
| 2007/0129307 A1 | 6/2007 | Tan |
| 2007/0154953 A1 | 7/2007 | Brunner |
| 2009/0155292 A1 | 6/2009 | Santamaria |
| 2009/0258355 A1 | 10/2009 | Maye |
| 2010/0061984 A1 | 3/2010 | Greene |
| 2010/0095544 A1 | 4/2010 | Haseloh |
| 2010/0104503 A1 | 4/2010 | Mellman |
| 2010/0303730 A1 | 12/2010 | Hegmann |
| 2010/0303866 A1 | 12/2010 | Saint-Remy |
| 2011/0029121 A1 | 2/2011 | Amit |
| 2011/0059121 A1 | 3/2011 | Santamaria |
| 2011/0250146 A1 | 10/2011 | Zhang |
| 2011/0318380 A1 | 12/2011 | Brix |
| 2012/0077686 A1 | 3/2012 | Weiner |
| 2012/0093934 A1 | 4/2012 | Santamaria |
| 2012/0121649 A1 | 5/2012 | Santamaria |
| 2012/0252742 A1 | 10/2012 | Kranz |
| 2013/0089553 A1 | 4/2013 | Carter |
| 2013/0128138 A1 | 5/2013 | Kuo |
| 2013/0171179 A1 | 7/2013 | Burrows |
| 2013/0302421 A1 | 11/2013 | Santamaria |
| 2013/0330414 A1 | 12/2013 | Santamaria |
| 2014/0105980 A1 | 4/2014 | Santamaria |
| 2014/0294982 A1 | 10/2014 | Freund |
| 2014/0341938 A1 | 11/2014 | Rademacher |
| 2014/0370099 A1 | 12/2014 | Green |
| 2015/0068613 A1 | 3/2015 | Taskar |
| 2015/0125536 A1 | 5/2015 | Santamaria |
| 2015/0150996 A1 | 6/2015 | Miller |
| 2015/0209446 A1 | 7/2015 | Santamaria |
| 2015/0250871 A1 | 9/2015 | Santamaria |
| 2015/0344586 A1 | 12/2015 | Georges |
| 2015/0374815 A1 | 12/2015 | Kishimoto |
| 2016/0068613 A1 | 3/2016 | Regula |
| 2016/0271237 A1 | 9/2016 | Santamaria |
| 2017/0095544 A1 | 4/2017 | Santamaria |
| 2017/0274096 A1 | 9/2017 | Santamaria |
| 2017/0312348 A1 | 11/2017 | Santamaria |
| 2017/0333540 A1 | 11/2017 | Santamaria |
| 2018/0127481 A1 | 5/2018 | Santamaria |
| 2019/0060427 A1 | 2/2019 | Santamaria |
| 2019/0060484 A1 | 2/2019 | Santamaria |
| 2019/0076545 A1 | 3/2019 | Santamaria |
| 2019/0134171 A1 | 5/2019 | Santamaria |
| 2020/0009265 A1 | 1/2020 | Santamaria |
| 2020/0057048 A1 | 2/2020 | Santamaria |
| 2020/0390856 A1 | 12/2020 | Santamaria |
| 2021/0145949 A1 | 5/2021 | Santamaria |
| 2021/0205470 A1 | 7/2021 | Santamaria |
| 2022/0401534 A1 | 12/2022 | Santamaria |
| 2023/0355730 A1 | 11/2023 | Santamaria |
| 2024/0201171 A1 | 6/2024 | Santamaria |
| 2024/0299536 A1 | 9/2024 | Santamaria |
| 2025/0051420 A1 | 2/2025 | Santamaria |

FOREIGN PATENT DOCUMENTS

| | | |
|---|---|---|
| CA | 2868551 | 10/2013 |
| CN | 101678090 | 3/2010 |
| EP | 0188256 | 7/1986 |
| EP | 1088256 | 4/2001 |
| EP | 2131856 | 12/2009 |
| EP | 2614834 | 7/2013 |
| EP | 2621523 | 8/2013 |
| EP | 3065771 | 9/2016 |
| EP | 3269384 | 1/2018 |
| EP | 3291832 | 3/2018 |
| EP | 3539564 | 9/2019 |
| JP | 2003231698 | 8/2003 |
| JP | 2005538083 | 12/2005 |
| JP | 2006522319 | 9/2006 |
| JP | 2007508503 | 4/2007 |
| JP | 2008514686 | 5/2008 |
| JP | 2010522695 | 7/2010 |
| JP | 2012505249 | 3/2012 |
| JP | 2013538208 | 10/2013 |
| WO | 1990007339 | 7/1990 |
| WO | 1992018150 | 10/1992 |
| WO | 1993001716 | 2/1993 |
| WO | 1993016725 | 9/1993 |
| WO | 1994009823 | 5/1994 |
| WO | 1996018105 | 6/1996 |
| WO | 1998006749 | 2/1998 |
| WO | 1999014236 | 3/1999 |
| WO | 1999042597 | 8/1999 |
| WO | 1999064926 | 12/1999 |
| WO | 2000043662 | 7/2000 |
| WO | 2000067788 | 11/2000 |
| WO | 2001024764 | 4/2001 |
| WO | 2002080963 | 10/2002 |
| WO | 2004006951 | 1/2004 |
| WO | 2004076909 | 9/2004 |
| WO | 2004078909 | 9/2004 |
| WO | 2005033267 | 4/2005 |
| WO | 2005036035 | 4/2005 |
| WO | 2006016113 | 2/2006 |
| WO | 2006037979 | 4/2006 |
| WO | 2006054806 | 5/2006 |
| WO | 2006080951 | 8/2006 |
| WO | 2007024026 | 3/2007 |
| WO | 2008051245 | 5/2008 |
| WO | 2008109852 | 9/2008 |
| WO | 2008118861 | 10/2008 |
| WO | 2009003492 | 1/2009 |
| WO | 2009031258 | 3/2009 |
| WO | 2009040811 | 4/2009 |
| WO | 2009064273 | 5/2009 |
| WO | 2009078799 | 6/2009 |
| WO | 2009094273 | 7/2009 |
| WO | 2009111588 | 9/2009 |
| WO | 2009126835 | 10/2009 |
| WO | 2010025324 | 3/2010 |
| WO | 2010027827 | 3/2010 |
| WO | 2010037395 | 4/2010 |
| WO | 2010037397 | 4/2010 |
| WO | 2010042876 | 4/2010 |
| WO | 2010080032 | 7/2010 |
| WO | 2010085509 | 7/2010 |
| WO | 2011073685 | 6/2011 |
| WO | 2011104497 | 9/2011 |
| WO | 2012012874 | 2/2012 |

(56) References Cited

FOREIGN PATENT DOCUMENTS

| WO | 2012031258 | 3/2012 |
|---|---|---|
| WO | 2012041968 | 4/2012 |
| WO | 2012062904 | 5/2012 |
| WO | 2012121528 | 9/2012 |
| WO | 2013043662 | 3/2013 |
| WO | 2013072051 | 5/2013 |
| WO | 2013103438 | 7/2013 |
| WO | 2013144811 | 10/2013 |
| WO | 2014080286 | 5/2014 |
| WO | 2015063616 | 5/2015 |
| WO | 2016081854 | 5/2016 |
| WO | 2016145605 | 9/2016 |
| WO | 2016146505 | 9/2016 |
| WO | 2016193299 | 12/2016 |
| WO | 2016198932 | 12/2016 |
| WO | 2018087597 | 5/2018 |
| WO | 2018185564 | 10/2018 |
| WO | 2019106435 | 6/2019 |

OTHER PUBLICATIONS

Amrani, A. et al., "Progression of Autoimmune Diabetes Driven by Avidity Maturation of a T-cell Population," Nature, 406(6797):739-42, (2000).

Anderson, B. et al., "Prevalent CD8(+) T Cell Response Against One peptide/MHC Complex in Autoimmune Diabetes", Proc Natl Acad Sci USA, 96(16):9311-6, (1999).

Anderton, S. et al., "Hierarchy in the Ability of T Cell Epitopes to Induce Peripheral Tolerance to Antigens From Myelin", Eur J Immunol., 28(4):1251-61, (1998).

Anonymous, Diabetes Prevention Trial—Type 1 Diabetes Study Group, "Effects of Insulin in Relatives of Patients With Type 1 Diabetes Mellitus", N Engl J Med., 346(22):1685-91, (2002).

Anonymous, Website article from kidshealth.org/PageManager.jsp?dn=KidsHealth&lic=1&ps=107&cat_id=139&article; downloaded Nov. 9, 2010: 2 pages total.

Appay, V. et al., "HIV-specific CD8(+) T Cells Produce Antiviral Cytokines but Are Impaired in Cytolytic Function", J Exp Med., 192(1):63-72, (2000).

Asai, H. et al., "Co-introduced Functional CCR2 Potentiates in Vivo Anti-Lung Cancer Functionality Mediated by T Cells Double Gene-Modified to Express WT1-specific T-cell", PLoS One, 8(2):e56820, (2013).

Azuma, M. et al., "T Cell Costimulation and Diseases," Kokubyo Gakkai Zasshi, 67(3):233-9, (2000).

Babbe, H. et al., "Clonal Expansions of CD8(+) T Cells Dominate the T Cell Infiltrate in Active Multiple Sclerosis Lesions as Shown by Micromanipulation and Single Cell Polymerase Chain Reaction", J Exp Med., 192(2):393-404, (2000).

Bacchetta, R. et al., "High Levels of Interleukin 10 Production in Vivo Are Associated With Tolerance in SCID Patients Transplanted With HLA Mismatched Hematopoietic Stem Cells", J Exp Med., 179(2):493-502, (1994).

Bachmann, M. et al., "Developmental Regulation of Lck Targeting to the CD8 Coreceptor Controls Signaling in Naive and Memory T Cells", J Exp Med., 189(10):1521-30, (1999).

Bahcetepe, N. et al., "The Role of HLA Antigens in the Aetiology of Psoriasis", Med Glas (Zenica), 10(2):339-42, (2013).

Bailey-Bucktrout, S. et al., "Self-antigen-driven Activation Induces Instability of Regulatory T Cells During an Inflammatory Autoimmune Response", Immunity, 39(5):949-62, (2013).

Baker, D. et al., "Critical Appraisal of Animal Models of Multiple Sclerosis", Mult Scler., 17(6):647-57, (2011).

Bakker, A. et al., "MHC Multimer Technology: Current Status and Future Prospects", Curr Opin Immunol., 17(4):428-33, (2005).

Barber, D. et al., "Restoring Function in Exhausted CD8 T Cells During Chronic Viral Infection", Nature, 439(7077):682-7, (2006).

Becker, T. et al., "Interleukin 15 Is Required for Proliferative Renewal of Virus-Specific Memory CD8 T Cells", J Exp Med., 195(12):1541-8, (2002).

Behan, P. et al., "The Sad Plight of Multiple Sclerosis Research (Low on Fact, High on Fiction): Critical Data to Support It Being a Neurocristopathy", Inflammopharmacology, 18(6):265-90, (2010).

Betts, R. et al., "CDS(+) T Cells in Asthma: Friend or Foe?", Pharmacol Ther., 121(2):123-31, (2009).

Bianchi, A. et al., "Parenteral Vaccination of Mice and Piglets With F4+ *Escherichia coli* Suppresses the Enteric anti-F4 Response Upon Oral Infection", Vaccine, 14(3):199-206, (1996).

Bibliographic data page from EPO website at htttps://www.espace.net.com/publication_Details/biblio?CC=WO&NR=2004078909A2&KC=..., downloaded Nov. 15, 2010, showing that W02004078909 was also published as US2007154953: 1 page total.

Bielekova, B. et al., "Encephalitogenic Potential of the Myelin Basic Protein Peptide (Amino Acids 83-99) in Multiple Sclerosis: Results of a Phase II Clinical Trial With an Altered Peptide Ligand", Nat Med., 6(10):1167-75, (2000).

Blancou, P. et al., "Immunization of HLA Class I Transgenic Mice Identifies Autoantigenic Epitopes Eliciting Dominant Responses in Type 1 Diabetes Patients", J Immunol., 178(11):7458-66, (2007).

Bossuyt, X. et al., "Serologic Markers in Inflammatory Bowel Disease", Clin Chem., 52(2):171-81, (2006).

Bottazzo, G. et al., "In Situ Characterization of Autoimmune Phenomena and Expression of HLA Molecules in the Pancreas in Diabetic Insulitis", N Engl J Med., 313(6):353-60, (1985).

Bottini, M. et al., "Luminescent Silica Nanobeads: Characterization and Evaluation as Efficient Cytoplasmatic Transporters for T-lymphocytes", J Am Chem Soc., 129(25):7814-23, (2007).

Bour-Jordan, H. et al., "B Cell Depletion: A Novel Therapy for Autoimmune Diabetes?", J Clin Invest., 117(12):3642-5, (2007).

Braud, V. et al., "Functions of Nonclassical MHC and non-MHC-encoded Class I Molecules", Curr Opin Immunol., 11(1):100-8, (1999).

Buenafe, A. et al., "Regulatory T Cells Play a Role in T-cell Receptor CDR2 Peptide Regulation of Experimental Autoimmune Encephalomyelitis", Immunology, 135(2):168-79, (2012).

Bunnell, S. et al., "T Cell Receptor Ligation Induces the Formation of Dynamically Regulated Signaling Assemblies", J Cell Biol., 158(7):1263-75, (2002).

Burke, R. et al., "The Influence of Adjuvant on the Therapeutic Efficacy of a Recombinant Genital Herpes Vaccine", J Inf Dis., 170(5):1110-9, (1994).

Burton, B. et al., "Sequential Transcriptional Changes Dictate Safe and Effective Antigen-Specific Immunotherapy", Nat Commun., 5:4741, (2014).

Cao, K. et al., "Analysis of the Frequencies of HLA-A, B, and C Alleles and Haplotypes in the Five Major Ethnic Groups of the United States Reveals High Levels of Diversity in These Loci and Contrasting Distribution Patterns in These Populations", Hum Immunol., 62(9):1009-30, (2001).

Caruso, F. et al., "Investigation of Electrostatic Interactions in Polyelectrolyte Multilayer Films: Binding of Anionic Fluorescent Probes to Layers Assembled onto Colloids", Macromol., 32(7):2317-28, (1999).

Caruso, F. et al., "Protein Multilayer Formation on Colloids Through a Stepwise Self-Assembly Technique", J Am Chem Soc., 121(25):6039-46, (1999).

Chang, J. et al., "Design, Engineering, and Production of Human Recombinant T Cell Receptor Ligands Derived From Human Leukocyte Antigen DR2", J Biol Chem., 276(26):24170-6, (2001).

Chatenoud, L., "Do NKT Cells Control Autoimmunity?", J Clin Invest., 110(6):747-8, (2002).

Chen, Q. et al., "IL-2 Controls the Stability of Foxp3 Expression in TGF-beta-induced Foxp3+ T Cells in Vivo", J Immunol., 186(11):6329-37, (2011).

Choudhuri, K. et al., "Signaling Microdomains in T Cells", FEBS Lett., 584(24):4823-31, (2010).

Cirillo, C. et al., "S100B Protein in the Gut: The Evidence for Enteroglial-Sustained Intestinal Inflammation", World J Gastroenterol., 17(10):1261-6, (2011).

Clemente Casares, J. "pMHC-Class II Nanovaccine to Treat Autoimmune Diseases", Doctor of Philosophy Thesis, Calgary University, Alberta, Canada, 391 pages, retrieved from: http://theses.ucalgary.ca/handle/11023/1589; (2014).

(56) References Cited

OTHER PUBLICATIONS

Clemente-Casares, X. et al., "Expanding Antigen-Specific Regulatory Networks to Treat Autoimmunity", Nature, 530(7591):434-40, (2016).
Clemente-Casares, X. et al., "Peptide-MHC-based Nanovaccines for the Treatment of Autoimmunity: A "One Size Fits All" Approach?", J Mol Med., 89(8):733-42, (2011).
Cnop, M. et al., "Mechanisms of Pancreatic Beta-Cell Death in Type 1 and Type 2 Diabetes: Many Differences, Few Similarities", Diabetes, 54(Suppl 2):S97-S107, (2005).
Constantinescu, C. et al., "Experimental Autoimmune Encephalomyelitis (EAE) as a Model for Multiple Sclerosis (MS)", Br J Pharmacol., 164(4):1079-106, (2011).
Corrigall, V. et al., "Autoantigens and Immune Pathways in Rheumatoid Arthritis", Grit Rev Immunol., 22(4):281-93, (2002).
Croxford, A. et al., "Mouse Models for Multiple Sclerosis: Historical Facts and Future Implications", Biochim Biophy Acta., 1812(2):177-83, (2011).
Cuiv, P. et al., "Draft Genome Sequence of Bacteroides Vulgatus PC510, a Strain Isolated From Human Feces", J Bacteriol., 193(15):4025-6, (2011 ).
Culina, S. et al., "Antigen-Based Immune Therapeutics for Type 1 Diabetes: Magic Bullets or Ordinary Blanks?", Clin Dev Immunol., 2011:286248, (2011).
Daperno, M. et al., "Results of the 2nd Part Scientific Workshop of the ECCO. II: Measures and Markers of Prediction to Achieve, Detect, and Monitor Intestinal Healing in Inflammatory Bowel Disease", J Crohns Colitis., 5(5):484-98, (2011).
Database Accession No. ADKO01000110, "Bacteroides vulgatus PC510 contig00041, whole genome shotgun sequence", Jul. 31, 2011.
Database Accession No. D4VD94, "SubName: Full=Conserved domain protein;", Jun. 15, 2010.
Dave, M. et al., "Mucosal Healing in Inflammatory Bowel Disease-A True Paradigm of Success?", Gastroenterol hepatol., 8(1):29-38, (2012).
Davies, R. et al., "Engineered Particle Surfaces", Adv Mat., 10(15):1264-70, (1998).
De Plaen, E. et al., "Immunogenic (Tum-) Variants of Mouse Tumor P815: Cloning of the Gene of Tum-Antigen P91A and Identification of the Tum-Mutation", Proc Natl Acad Sci USA, 85(7):2274-8, (1988).
Denic, A. et al., "The Relevance of Animal Models in Multiple Sclerosis Research", Pathophysiology, 18(1):21-9, (2011).
Desreumaux, P. et al., "Safety and Efficacy of Antigen-Specific Regulatory T-cell Therapy for Patients With Refractory Crohn's Disease", Gastroenterology, 143(5):1207-17, (2012).
Dieterich, W. et al., "Identification of Tissue Transglutaminase as the Autoantigen of Celiac Disease", Nat Med., 3(7):797-801, (1997).
Dilorenzo, T. et al., "Major Histocompatibility Complex Class I-restricted T Cells Are Required for All but the End Stages of Diabetes Development in Nonobese Diabetic Mice and Use a Prevalent T Cell Receptor Alpha Chain Gene Rearrangement", Proc Natl Acad Sci USA, 95(21):12538-43, (1998).
Diwan, M. et al., "Biodegradable Nanoparticle Mediated Antigen Delivery to Human Cord Blood Derived Dendritic Cells for Induction of Primary T Cell Responses", J Drug Target, 11(8-10):495-507, (2003).
Dominguez, A. et al., "Targeting the Tumor Microenvironment With anti-neu/anti-CD40 Conjugated Nanoparticles for the Induction of Antitumor Immune Responses", Vaccine, 28(5):1383-90, (2010).
Dranoff, G., "Targets of Protective Tumor Immunity", Ann NY Acad Sci., 1174:74-80, (2009).
Dressel, A. et al., "Autoantigen Recognition by Human CD8 T Cell Clones: Enhanced Agonist Response Induced by Altered Peptide Ligands", J Immunol., 159(10):4943-51, (1997).
Edelman, G. et al., "The Covalent Structure of an Entire gammaG Immunoglobulin Molecule", Proc Natl Acad Sci USA, 63(1):78-85, (1969).
Eggena, M. et al., "Identification of Histone H1 as a Cognate Antigen of the Ulcerative Colitis-Associated Marker Antibody pANCA", J Autoimmun., 14(1):83-97, (2000).
Ellman, J. et al., "Biosynthetic Method for Introducing Unnatural Amino Acids Site-Specifically Into Proteins", Methods Enzymol., 202:301-36, (1991).
Fennessy, M. et al., "A Gene in the HLA Class I Region Contributes to Susceptibility to IDDM in the Finnish Population. Childhood Diabetes in Finland (DiMe) Study Group", Diabetologia., 37(9):937-45, (1994).
Fifis, T. et al., "Short Peptide Sequences Containing MHC Class I and/or Class II Epitopes Linked to Nano-Beads Induce Strong Immunity and Inhibition of Growth of Antigen-Specific Tumour Challenge in Mice", Vaccine, 23(2):258-66, (2004).
Firestein, G., "Evolving Concepts of Rheumatoid Arthritis", Nature, 423(6937):356-61, (2003).
Flad, T. et al., "Development of an MHC-class I Peptide Selection Assay Combining Nanoparticle Technology and Matrix-Assisted Laser Desorption/Ionisation Mass Spectrometry", J Immunol Methods, 283(1-2):205-13, (2003).
Frankel, A. et al., "Characterization of Diphtheria Fusion Proteins Targeted to the Human interleukin-3 Receptor", Protein Eng., 13(8):575-81, (2000).
Friedman, A. et al., "The Smart Targeting of Nanoparticles", Curr Pharm Des., 19(35):6315-29, (2013).
Gagliani, N. et al., "Coexpression of CD49b and LAG-3 Identifies Human and Mouse T Regulatory Type 1 Cells", Nat Med., 19(6):739-46, (2013).
Garboczi, D. et al., "HLA-A2-peptide Complexes: Refolding and Crystallization of Molecules Expressed in *Escherichia coli* and Complexed With Single Antigenic Peptides", Proc Natl Acad Sci USA, 89(8):3429-33, (1992).
GenBank accession No. NM_001008228.2, accessed at https://www.ncbi.nlm.nih.gov/nuccore/281371473/?report=genbank on Jan. 16, 2018, 1 page.
GenBank accession No. NP_001008229., accessed at https://www.ncbi.nlm.nih.gov/protein/56788389/?report=genpept on Jan. 16, 2018, 3 pages.
Getts, D. et al., "Microparticles Bearing Encephalitogenic Peptides Induce T-cell Tolerance and Ameliorate Experimental Autoimmune Encephalomyelitis", Nat Biotechnol., 30(12):1217-24, (2012).
Gil, D. et al., "Recruitment of Nck by CD3 Epsilon Reveals a Ligand-Induced Conformational Change Essential for T Cell Receptor Signaling and Synapse Formation", Cell, 109(7):901-12, (2002).
Gill, R. et al., "Characterization of Primary T Cell Subsets Mediating Rejection of Pancreatic Islet Grafts", J Immunol., 143(7):2176-8, (1989).
Gimmi, C. et al., "Human T-cell Clonal Anergy Is Induced by Antigen Presentation in the Absence of B7 Costimulation", Proc Natl Acad Sci USA, 90(14):6586-90, (1993).
Giuliani, F. et al., "Additive Effect of the Combination of Glatiramer Acetate and Minocycline in a Model of MS", J Neuroimmunol., 158(1-2):213-21, (2005).
Gold, R. et al., "Understanding Pathogenesis and Therapy of Multiple Sclerosis via Animal Models: 70 Years of Merits and Culprits in Experimental Autoimmune Encephalomyelitis Research", Brain, 129(Pt 8):1953-71, (2006).
Golman, B. et al., "Fine Particle Coating by Chemical Vapor Deposition for Functional Materials", Trends Chem Engin., 6:1-16, (2000).
Gong, W. et al., "Immobilized MHC Class I Chain-Related Protein A Synergizes With IL-15 and Soluble 4-1BB Ligand to Expand NK Cells With High Cytotoxicity Ex Vivo", Cell Mol Immunol., 7(6):477-84, (2010).
Gregori, S. et al., "Re-establishing Immune Tolerance in Type 1 Diabetes via Regulatory T Cells", Novartis Found Symp., 292:174-83, (2008), (abstract).
Guarda, G. et al., "L-selectin-negative CCR7—Effector and Memory CD8+ T Cells Enter Reactive Lymph Nodes and Kill Dendritic Cells", Nat Immunol., 8(7):743-52, (2007).
Guidance for Industry, "Estimating the Maximum Safe Staring Dose in Initial Clinical Trials for Therapeutics in Adult Healthy Volunteers", U.S. DHHS, FDA, CDER, 27 pages, (2005).

(56) References Cited

OTHER PUBLICATIONS

Gunn, J. et al., "A Multimodal Targeting Nanoparticle for Selectively Labeling T Cells", Small, 4(6):712-5, (2008).
Guo, H. et al., "Protein Tolerance to Random Amino Acid Change," Proc Natl Acad Sci USA, 101(25):9205-10, (2004).
Gupta, A. et al., "Synthesis and Surface Engineering of Iron Oxide Nanoparticles for Biomedical Applications", Biomaterials, 26(18):3995-4021, (2005).
Ha, J. et al., "Immunoglobulin Fc Heterodimer Platform Technology: From Design to Applications in Therapeutic Antibodies and Proteins", Front Immunol., 7(394):1-16, (2016).
Hale, J. et al., "Distinct Memory CD4+ T Cells With Commitment to T Follicular Helper- And T Helper 1-cell Lineages Are Generated After Acute Viral Infection", Immunity, 38(4):805-17, (2013).
Hall, C. et al., "Mapping Labeled Sites in *Escherichia coli* Ribosomal RNA: Distribution of Methyl Groups and Identification of a Photoaffinity-Labeled RNA Region Putatively at the Peptidyltransferase Center", Biochemistry, 24(21):5702-11, (1985).
Hamilton-Williams, E. et al., "Transgenic Rescue Implicates beta2-microglobulin as a Diabetes Susceptibility Gene in Nonobese Diabetic (NOD) Mice", Proc Natl Acad Sci USA, 98(20):11533-8, (2001).
Han, B. et al., "Developmental Control of CD8 T Cell-Avidity Maturation in Autoimmune Diabetes", J Clin Invest., 115(7):1879-87, (2005).
Han, B. et al., "Prevention of Diabetes by Manipulation of anti-IGRP Autoimmunity: High Efficiency of a Low-Affinity Peptide", Nat Med., 11(6):645-52, (2005).
Han, G. et al., "Interleukin-17-Producing Gammadelta+ T Cells Protect NOD Mice from Type 1 Diabetes Through a Mechanism Involving Transforming Growth Factor-Beta", Immunology, 129(2):197-206, (2010).
Hanprasopwattana, A. et al., "Titania Coatings on Monodisperse Silica Spheres (Characterization Using 2-Propanol Dehydration and TEM)", Langmuir, 12(13):3173-9, (1996).
Harris, S. et al., "Prediction of Murine MHC Class I Epitopes in a Major House Dust Mite Allergen and Induction of T1-type CD8+ T Cell Responses", Int Immunol., 9(2):273-80, (1997).
Hassainya, Y. et al., "Identification of Naturally Processed HLA-A2—restricted Proinsulin Epitopes by Reverse Immunology", Diabetes, 54(7):2053-9, (2006).
Herold, K. et al., "Anti-CD3 Monoclonal Antibody in New-Onset Type 1 Diabetes Mellitus", N Eng J Med., 346(22):1692-8, (2002).
Hirsch, D. et al., "Antigen-based Immunotherapy for Autoimmune Disease: Current Status", Immunotargets Ther., 4:1-11, (2014).
Hirschfield, G. et al., "The Immunobiology and Pathophysiology of Primary Biliary Cirrhosis", Annu Rev Pathol., 8:303-30, (2013).
HLA Nomenclature (2015) (Year: 2015).
Ho, K. et al., "The Clinical Relevance of Autoantibodies in Scleroderma", Arthritis Res Ther., 5(2):80-93, (2003).
Holgate, S. et al., "Treatment Strategies for Allergy and Asthma", Nat Rev Immunol., 8(3):218-30, (2008).
Holst, J. et al., "Generation of T-cell Receptor Retrogenic Mice", Nat Protoc., 1(1):406-17, (2006).
Honeyman, M. et al., "Analysis of Families at Risk for Insulin-Dependent Diabetes Mellitus Reveals That HLA Antigens Influence Progression to Clinical Disease", Mol Med., 1(5):576-82, (1995).
Hugues, S. et al., "Generation and use of alternative multimers of peptide/MHC complexes", J Immunol Methods, 268(1):83-92, (2002).
Huppa, J. et al., "TCR-peptide-MHC Interactions in Situ Show Accelerated Kinetics and Increased Affinity", Nature, 463(7283):963-7, (2010).
International Application No. PCT/EP2011/066994; International Preliminary Report on Patentability, date of issuance Apr. 2, 2013; 5 pages.
International Application No. PCT/EP2011/066994; International Search Report and Written Opinion of the International Searching Authority, date of mailing Nov. 21, 2011; 7 pages.
International Application No. PCT/IB2013/052352; International Preliminary Report on Patentability, date of issuance Oct. 1, 2014; 6 pages.
International Application No. PCT/IB2013/052352; International Search Report and Written Opinion of the International Searching Authority, date of mailing Oct. 2, 2013; 9 pages.
International Application No. PCT/EP2011/069931; International Preliminary Report on Patentability (Ch. 2), date of issuance May 16, 2013; 21 pages.
International Application No. PCT/EP2011/069931; International Search Report and Written Opinion of the International Searching Authority, date of mailing Jul. 10, 2012; 24 pages.
International Application No. PCT/IB2013/003033; International Preliminary Report on Patentability, date of issuance Apr. 14, 2015; 6 pages.
International Application No. PCT/IB2013/003033; International Search Report and Written Opinion of the International Searching Authority, date of mailing Jul. 14, 2014; 9 pages.
International Application No. PCT/IB2014/003014; International Preliminary Report on Patentability, date of issuance May 10, 2016; 9 pages.
International Application No. PCT/IB2014/003014; International Search Report and Written Opinion of the International Searching Authority, date of mailing May 12, 2015; 14 pages.
International Application No. PCT/IB2016/000691; International Preliminary Report on Patentability, date of issuance Nov. 7, 2017; 31 pages.
International Application No. PCT/IB2016/000691; International Search Report and Written Opinion of the International Searching Authority, date of mailing Mar. 7, 2017; 44 pages.
International Application No. PCT/IB2017/001508; International Search Report and Written Opinion of the International Searching Authority, date of mailing Mar. 26, 2018; 13 pages.
International Application No. PCT/IB2017/001508; International Preliminary Report on Patentability, date of issuance May 14, 2019; 9 pages.
International Application No. PCT/IB2018/000510; International Preliminary Report on Patentability, date of issuance Oct. 8, 2019; 4 pages.
International Application No. PCT/IB2018/000510; International Search Report and Written Opinion of the International Searching Authority, date of mailing Nov. 8, 2018; 8 pages.
International Application No. PCT/IB2018/001520; International Preliminary Report on Patentability, date of issuance Jun. 2, 2020; 6 pages.
International Application No. PCT/IB2018/001520; International Search Report and Written Opinion of the International Searching Authority, date of mailing, Apr. 15, 2019; 10 pages.
International Application No. PCT/US2008/056279; International Preliminary Report on Patentability, date of issuance Sep. 8, 2009; 11 pages.
International Application No. PCT/US2008/056279; International Search Report and Written Opinion of the International Searching Authority, date of mailing Oct. 22, 2008; 14 pages.
Invernizzi, P. et al., "Classical HLA-DRB1 and DPB1 Alleles Account for HLA Associations With Primary Biliary Cirrhosis", Genes Immun., 13(6):461-8, ( 2012).
Itoh, N. et al., "Mononuclear Cell Infiltration and Its Relation to the Expression of Major Histocompatibility Complex Antigens and Adhesion Molecules in Pancreas Biopsy Specimens From Newly Diagnosed Insulin-Dependent Diabetes Mellitus Patients", J Clin Invest., 92(5):2313-22, (1993).
Japan Intractable Diseases Information Center (2015) "Crohn's Disease," http://www.nanbyou.or.jp/entry/111.
Japan Intractable Diseases Information Center (2015) "Sjogren's Syndrome," http://www.nanbyou.or.jp/entry/S1.
Jarchum, I. et al., "Identification of Novel IGRP Epitopes Targeted in Type 1 Diabetes Patients", Clin Immunol., 127(3):359-65, (2008).
Jarchum, I. et al., "In Vivo Cytotoxicity of Insulin-Specific CD8+ T-cells in HLA-A*0201 Transgenic NOD Mice", Diabetes, 56(10):2551-60, (2007).

(56) References Cited

OTHER PUBLICATIONS

Jarius, S. et al., "Mechanisms of Disease: Aquaporin-4 Antibodies in Neuromyelitis Optica", Nat Clin Pract Neurol., 4(4):202-14, (2008).
Jokerst, J. et al., "Nanoparticle PEGylation for Imaging and Therapy", Nanomedicine (Lond.), 6(4):715-28, (2011).
Judge, A. et al., "Interleukin 15 Controls Both Proliferation and Survival of a Subset of Memory-Phenotype CD8(+) T Cells", J Exp Med., 196(7):935-46, (2002).
Jun, H. et al., "A New Look at Viruses in Type 1 Diabetes", Diab Met Res., 19(1):8-31, (2003).
Jurewicz, A. et al., "MHC Class I-restricted Lysis of Human Oligodendrocytes by Myelin Basic Protein Peptide-Specific CD8 T Lymphocytes", J Immunol., 160(6):3056-9, (1998).
Kamanaka, M. et al., "Expression of interleukin-10 in Intestinal Lymphocytes Detected by an interleukin-10 Reporter Knockin Tiger Mouse", Immunity, 25(6):941-52, (2006).
Kamikura, Y. et al., "Adhesion, Costimulatory Molecule, Trafficking, Homing: Cancer Immunotherapy and Costimulatory Molecule", Ann Rev., Immunity, 162:2-13, (2004).
Kappos, L. et al., "Induction of a Non-Encephalitogenic Type 2 T Helper-Cell Autoimmune Response in Multiple Sclerosis After Administration of an Altered Peptide Ligand in a Placebo- Controlled, Randomized Phase II Trial. The Altered Peptide Ligand in Relapsing MS Study Group", Nat Med., 6(10):1176-82, (2000).
Karin, N. et al., "Reversal of Experimental Autoimmune Encephalomyelitis by a Soluble Peptide Variant of a Myelin Basic Protein Epitope: T Cell Receptor Antagonism and Reduction of Interferon Gamma and Tumor Necrosis Factor Alpha Production", J Exp Med., 180(6):2227-37, (1994).
Karlin, S. et al., "Applications and Statistics for Multiple High-Scoring Segments in Molecular Sequences", Proc Natl Acad Sci USA, 90(12):5873-7, (1993).
Karounos, D. et al., "Metabolically Inactive Insulin Analog Prevents Type I Diabetes in Prediabetic NOD Mice", J Clin Invest., 100(6):1344-8, (1997).
Kent, S. et al., "Expanded T Cells From Pancreatic Lymph Nodes of Type 1 Diabetic Subjects Recognize an Insulin Epitope", Nature, 435(7039):224-8, (2005).
Keymeulen, B. et al., "Insulin Needs After CD3-antibody Therapy in New-Onset Type 1 Diabetes", N Engl J Med., 352(25):2598-608, (2005).
Kim, S. et al., "Induction and Visualization of Mucosal Memory CD8 T Cells Following Systemic Virus Infection", J Immunol., 163(8):4125-32, (1999).
Kita, H. et al., "Quantitative and Functional Analysis of PDC-E2-specific Autoreactive Cytotoxic T Lymphocytes in Primary Biliary Cirrhosis", J Clin Invest., 109(9):1231-40, (2002).
Komai-Koma, M. et al., "TLR2 Is Expressed on Activated T Cells as a Costimulatory Receptor", Proc Natl Acad Sci USA, 181(9):3829-34, (2004).
Komatsu, N. et al., "Heterogeneity of Natural Foxp3+ T Cells: A Committed Regulatory T-cell Lineage and an Uncommitted Minor Population Retaining Plasticity", Proc Natl Acad Sci USA, 106(6):1903-8, (2009).
Komatsu, N. et al., "Pathogenic Conversion of Foxp3+ T Cells Into TH17 Cells in Autoimmune Arthritis", Nat Med., 20(1):62-8, (2014).
Kozono, H. et al., "Production of Soluble MHC Class II Proteins With Covalently Bound Single Peptides", 369(6476):151-4, (1994).
Krishnamoorthy, G. et al., "Myelin-specific T Cells Also Recognize Neuronal Autoantigen in a Transgenic Mouse Model of Multiple Sclerosis", Nat Med., 15(6):626-33, (2009).
Kukreja, A. et al., "NKT Cells and Type-1 Diabetes and the "hygiene Hypothesis" to Explain the Rising Incidence Rate", Diabet Tech Ther., 4(3):323-33, (2002).
Kulmala, P., "Prediabetes in Children: Natural History, Diagnosis, and Preventive Strategies", Pediatr Drugs, 5(4):211-21, (2003).

Kwong, B. et al., "Synthesis and Characterization of Antibody-Nanoparticle Conjugates for Locally Sequestered Tumor Immunotherapy", Abstracts of Papers Am Chem Soc., 240:61, (2010).
Kyger, M. et al., "Effective Arrestin-Specific Immunotherapy of Experimental Autoimmune Uveitis with RTL: A Prospect for Treatment of Human Uveitis", Transl Vis Sci Technol., 2(2):1-15, (2013).
Kyung-Yu, M. et al., "Targeting Strategies for Multifunctional Nanoparticles in Cancer Imaging and Therapy", Theranostics, 2(1):3-44, (2012).
Laurence, A. et al., "T(H)-17 Differentiation: Of Mice and Men", Nat Immunol., 8(9):903-5, (2007).
Leavenworth, J. et al., "Amelioration of Arthritis Through Mobilization of Peptide-Specific CD8+ Regulatory T Cells", J Clin Invest., 123(3):1382-9, (2013).
Lechner, F. et al., "Analysis of Successful Immune Responses in Persons Infected With Hepatitis C Virus", J Exp Med., 191(9):1499-510, (2000).
Lee, Y. et al., "Biodegradable Nanoparticles Containing TLR3 or TLR9 Agonists Together With Antigen Enhance MHC-restricted Presentation of the Antigen", Arch Pharm Res., 33(11):1859-66, (2010).
Levings, M. et al., "T-regulatory 1 Cells: A Novel Subset of CD4 T Cells With Immunoregulatory Properties", J Allergy Clin Immunol., 106(1 Pt 2):S109-12, (2000).
Liblau, R. et al., "Autoreactive CD8 T Cells in Organ-Specific Autoimmunity: Emerging Targets for Therapeutic Intervention", Immunity, 17(1):1-6, (2002).
Lieberman, S. et al., "A Comprehensive Guide to Antibody and T-cell Responses in Type 1 Diabetes", Tissue Antigens, 62(5):359-77, (2003).
Lieberman, S. et al., "Identification of the Beta Cell Antigen Targeted by a Prevalent Population of Pathogenic CD8+ T Cells in Autoimmune Diabetes", Proc Natl Acad Sci USA, 100(14):8384-8, (2003).
Lieberman, S. et al., "Individual Nonobese Diabetic Mice Exhibit Unique Patterns of CDS+ T Cell Reactivity to Three Islet Antigens, Including the Newly Identified Widely Expressed Dystrophia Myotonica Kinase", J Immunol., 173(11):6727-34, (2004).
Lillemeier, B. et al., "TCR and Lat Are Expressed on Separate Protein Islands on T Cell Membranes and Concatenate During Activation", Nat Immunol., 11(1):90-6 (2010).
Lleo, A. et al., "Etiopathogenesis of Primary Biliary Cirrhosis", World J Gastroenterol., 14(21):3328-37, (2008).
Longhi, M. et al., "Autoantigen-specific Regulatory T Cells, a Potential Tool for Immune-Tolerance Reconstitution in type-2 Autoimmune Hepatitis", Hepatology, 53(2):536-47, (2011).
Lowery, A. et al., "Immunonanoshells for Targeted Photothermal Ablation of Tumor Cells", Int J Nanomedicine, 1(2):149-54, (2006).
Lupas, A., "Coiled Coils: New Structures and New Functions", TIB 21, 375-82, (1996).
Ma, Z. et al., "TCR Triggering by pMHC Ligands Tethered on Surfaces via Poly(ethylene Glycol) Depends on Polymer Length", PLoS One, 9(11):e112292, (2014).
Mallone, R. et al., "CD8+ T-cell Responses Identify Beta-Cell Autoimmunity in Human Type 1 Diabetes", Diabetes, 56(3):613-21, (2007).
Mallone, R. et al., "T Cell Recognition of Autoantigens in Human Type 1 Diabetes: Clinical Perspectives", Clin Dev Immunol., 2011:513210, (2011).
Marée, A. et al., "Modeling Competition Among Autoreactive CD8+ T Cells in Autoimmune Diabetes: Implications for Antigen-Specific Therapy", Int Immunol., 18(7):1067-77, (2006).
Mars, L. et al., "CD8 T Cell Responses to Myelin Oligodendrocyte Glycoprotein-Derived Peptides in Humanized HLA-A*0201-transgenic Mice". J Immunol., 179(8):5090-8, (2007).
Marsh, S. et al., "Nomenclature for Factors of the HLA System, Update Oct. 2010", Tissue Antigens, 77(4):349-54, (2011).
Martínez-Martín, N. et al., "Cooperativity Between T Cell Receptor Complexes Revealed by Conformational Mutants of CD3epsilon", Sci Signal., 2(83):ra43, (2009).

(56) References Cited

OTHER PUBLICATIONS

Marwaha, A. et al., "Cutting Edge: Increased IL-17-secreting T Cells in Children With New-Onset Type 1 Diabetes", J Immunol., 185(7):3814-8, (2010).
Mazzarella, G., "Effector and Suppressor T Cells in Celiac Disease", World J Gastroenterol., 21(24):7349-56, (2015).
Mccarthy, D. et al., "Mouse Models of Multiple Sclerosis: Experimental Autoimmune Encephalomyelitis and Theiler's Virus-Induced Demyelinating Disease", Methods Mol Biol., 900:281-401, (2012).
Mcclymont, S. et al., "Plasticity of Human Regulatory T Cells in Healthy Subjects and Patients With Type 1 Diabetes", J Immunol., 186(7):3918-26, (2011).
Mckeithan, T., "Kinetic Proofreading in T-cell Receptor Signal Transduction", Proc Natl Acad Sci USA, 92(11):5042-6, (1995).
Mckown, K. et al., "Lack of Efficacy of Oral Bovine Type II Collagen Added to Existing Therapy in Rheumatoid Arthritis," Arthritis Rheum., 42(6):1204-8, (1999).
Mclarnon, A., "IBD: Regulatory T-cell Therapy Is a Safe and Well-Tolerated Potential Approach for Treating Refractory Crohn's Disease", Nat Rev Gastroenterol Hepatol., 9(10):559, (2012).
Mei, X. et al., Chemical Industry Press, Biotechnology Pharmaceutic Preparation: Foundation and Application: 199, (2004).
Merchant, A. et al., "An Efficient Route to Human Bispecific IgG", Nat Biotechnol., 16(7):677-81, (1998).
Mescher, M. et al., "Signals Required for Programming Effector and Memory Development by CD8+ T Cells", Immunol Rev., 211:81-92, (2006).
Mestas, J. et al., "Of Mice and Not Men: Differences Between Mouse and Human Immunology", J Immunol., 172(5):2731-8, (2004).
Metzler, B. et al., "Inhibition of Experimental Autoimmune Encephalomyelitis by Inhalation but Not Oral Administration of the Encephalitogenic Peptide: Influence of MHC Binding Affinity", Int Immunol., 5(9):1159-65, (1993).
Miguel-Sancho, N. et al., "Development of Stable, Water-Dispersible, and Biofunctionalizable Superparamagnetic Iron Oxide Nanoparticles", Chem Mat., 23(11):2795-802, (2011).
Miller, S. et al., "The Induction of Cell-Mediated Immunity and Tolerance With Protein Antigens Coupled to Syngeneic Lymphoid Cells", J Exp Med., 149(3):758-66, (1979).
Miyara, M. et al., "Functional Delineation and Differentiation Dynamics of Human CD4+ T Cells Expressing the FoxP3 Transcription Factor", Immunity, 30(6):899-911, (2009).
Mondini, S. et al., "One-Step Synthesis and Functionalization of Hydroxyl-Decorated Magnetite Nanoparticles", J Colloid Interface Sci., 322(1):173-9, (2008).
Moore, A. et al., "Tracking the Recruitment of Diabetogenic CD8+ T-cells to the Pancreas in Real Time", Diabetes, 53(6):1459-66, (2004).
Mukherjee, R. et al., "Identification of CD4+ T Cell-Specific Epitopes of Islet-Specific glucose-6-phosphatase Catalytic Subunit-Related Protein: A Novel Beta Cell Autoantigen in Type 1 Diabetes", J Immunol., 174(9):5306-15, (2005).
Musacchio, T. et al., "PEG-PE Micelles Loaded With Paclitaxel and Surface-Modified by a PBR-ligand: Synergistic Anticancer Effect", Mol Pharm., 6(2):468-79, (2009).
Nakayama, M. et al., "Prime Role for an Insulin Epitope in the Development of Type 1 Diabetes in NOD Mice", Nature, 435(7039):220-3, (2005).
Nanjundappa, R. et al., "A Gut Microbial Mimic that Hijacks Diabetogenic Autoreactivity to Suppress Colitis", Cell, 171(3):655-67, (2017).
Nelson, J. et al., "6 Types of Asthma and How They're Treated", Mother Nature Network, mnn.com, 4 pages, (2015).
Noren, C. et al., "A General Method for Site-Specific Incorporation of Unnatural Amino Acids Into Proteins", Science, 244(4901):182-8, (1989).
Oh, S. et al., "IL-15/IL-15Ralpha-mediated Avidity Maturation of Memory CD8+ T Cells", Proc Natl Acad Sci USA, 101:15154-9, (2004).
Oleszak, E. et al., "Theiler's Virus Infection: A Model for Multiple Sclerosis," Clin Microbiol Rev., 17(1):174-207, (2004).
Onoda, T. et al., "Human CD4+ Central and Effector Memory T Cells Produce IL-21: Effect on Cytokine-Driven Proliferation of CD4+ T Cell Subsets", Int Immunol., 19(10):1191-9, (2007).
Ouyang, Q. et al., "Recognition of HLA Class I-restricted Beta-Cell Epitopes in Type 1 Diabetes", Diabetes, 55(11):3068-74, (2006).
Oyewumi, M. et al., Nano-microparticles as Immune Adjuvants: Correlating Particle Sizes and the Resultant Immune Responses, Expert Rev Vaccines, 9(9):1095-107, (2010).
Pachner, A., "Experimental Models of Multiple Sclerosis", Curr Opin Neurol., 24(3):291-9, (2011).
Packard, T. et al., "COPD Is Associated With Production of Autoantibodies to a Broad Spectrum of Self-Antigens, Correlative With Disease Phenotype", Immunol Res., 55(1-3):48-57, (2013).
Pakula, A. et al., "Genetic Analysis of Protein Stability and Function", Annu Rev Genet., 23:289-310, (1989).
Palmer, J. et al., "Insulin Antibodies in Insulin-Dependent Diabetics Before Insulin Treatment", Science, 222(4630):1337-9, (1983).
Partch, R. et al., "Aerosol and Solution Modification of Particle-Polymer Interfaces", J Adhesion, 67(1-4):259-76, (1998).
Pascolo, S. et al., "HLA-A2.1-restricted Education and Cytolytic Activity of CD8(+) T Lymphocytes From beta2 Microglobulin (beta2m) HLA-A2.1 Monochain Transgenic H-2Db beta2m Double Knockout Mice", J Exp Med., 185(12):2043-51, (1997).
Patel, J. et al., "Cationic Nanoparticles for Delivery of CpG Oligodeoxynucleotide and Ovalbumin: In Vitro and In Vivo Assessment", J Biomed Nanotechnol., 3(1):97-106, (2007).
Pekarek, K. et al., "Double-walled Polymer Microspheres for Controlled Drug Release", Nature, 367(6460):258-60, (1994).
Peng, S. et al., "Synthesis and Characterization of Monodisperse Hollow Fe3O4 Nanoparticles", Angew Chem Int Ed Engl., 46(22):4155-8, (2007).
Perrault, S. et al., "Mediating Tumor Targeting Efficiency of Nanoparticles Through Design", Nano Lett, 9(5):1909-15, (2009).
Petros, R. et al., Antibody Conjugation to Print Abstracts of Papers Am Chem Soc., 233(14):14, (2007).
Pinkse, G. et al., "Autoreactive CD8 T Cells Associated With Beta Cell Destruction in Type 1 Diabetes", Proc Natl Acad Sci USA, 102(51):18425-30, (2005).
Ponder, J. et al., "Tertiary Templates for Proteins. Use of Packing Criteria in the Enumeration of Allowed Sequences for Different Structural Classes", J Mol Biol., 193(4):775-91, (1987).
Pot, C. et al., "Cutting Edge: IL-27 Induces the Transcription Factor c-Maf, Cytokine IL-21, and the Costimulatory Receptor ICOS That Coordinately Act Together to Promote Differentiation of IL-10-producing Tr1 Cells", J Immunol., 183(2):797-801, (2009).
Purton, J. et al., "Antiviral CD4+ Memory T Cells Are IL-15 Dependent ," J Exp Med., 204(4):951-61, (2007).
Quinn, M. et al., "How Do You Diagnose Rheumatoid Arthritis Early?", Best Pract Res Clin Rheumatol., 15(1):49-66, (2001).
Ransohoff, R., "Animal Models of Multiple Sclerosis: The Good, the Bad and the Bottom Line", Nat Neurosci., 15(8):1074-7, (2012).
Reijonen, H. et al., "Detection of GAD65-specific T-cells by Major Histocompatibility Complex Class II Tetramers in Type 1 Diabetic Patients and At-Risk Subjects", Diabetes, 51(5):1375-82, (2002).
Report to Congress, "Progress in Auotimmune Diseases Research", U.S. DHHS, NIH, 146 pages, (2005).
Riemekasten, G. et al., "Key Autoantigens in SLE", Rheumatology (Oxford), 44(8):975-82, (2005).
Roncarolo, M. et al., "Clinical Tolerance in Allogeneic Hematopoietic Stem Cell Transplantation", Immunol Rev., 241(1):145-63, (2011).
Roncarolo, M. et al., "Interleukin-10-secreting Type 1 Regulatory T Cells in Rodents and Humans", Immunol Rev., 212:28-50, (2006).
Rossi, M. et al., "Intravenous or Intranasal Administration of Gliadin Is Able to Down-Regulate the Specific Immune Response in Mice", Scand J Immunol., 50(2):177-82, (1999). (1999).
Routsias, J. et al., "Autoimmune Response and Target Autoantigens in Sjogren's Syndrome", Eur J Clin Invest., 40(11):1026-36, (2010).

(56) References Cited

OTHER PUBLICATIONS

Saengruengrit, C. et al., "The Combined Magnetic Field and Iron oxide-PLGA Composite Particles: Effective Protein Antigen Delivery and Immune Stimulation in Dendritic Cells", J Colloid Interface Sci., 520:101-11, (2018).
Sahin, U. et al., "Human Neoplasms Elicit Multiple Specific Immune Responses in the Autologous Host", Proc Natl Acad Sci USA, 92(25):11810-3, (1995).
Sakaguchi, S. et al., "Foxp3+ CD25+ CD4+ Natural Regulatory T Cells in Dominant Self-Tolerance and Autoimmune Disease", Immunol Rev., 212:8-27, (2006).
Santamaria, P. et al., "Beta-cell-cytotoxic CD8+ T Cells From Nonobese Diabetic Mice Use Highly Homologous T Cell Receptor Alpha-Chain CDR3 Sequences", J Immunol., 154(5):2494-503, (1995).
Santamaria, P. et al., "Characterization of T Lymphocytes Infiltrating Human Pancreas Allograft Affected by Isletitis and Recurrent Diabetes", Diabetes, 41(1):53-61, (1992).
Santamaria, P. et al., "Skewed T-cell Receptor Usage and Junctional Heterogeneity Among Isletitis Alpha Beta and Gamma Delta T-cells in Human IDDM [Corrected]", Diabetes, 43(4):599-606, (1994).
Santamaria, P., "Effector Lymphocytes in Autoimmunity", Curr Opin Immunol., 13(6):663-9, (2001).
Santamaria, P., "The Long and Winding Road to Understanding and Conquering Type 1 Diabetes", Immunity, 32(4):437-45, (2010).
Saragovi, H. et al., "Small Molecule and Protein-Based Neurotrophic Ligands: Agonists and Antagonists as Therapeutic Agents", Exp Opin Ther Patents, 9(6):737-51, (1999).
Saraiva, M. et al., "Interleukin-10 Production by Th1 Cells Requires interleukin-12-induced STAT4 Transcription Factor and ERK MAP Kinase Activation by High Antigen Dose", Immunity, 31(2):209-19, (2009).
Sato, "Diabetes and Cytokines. Roles of Cytokines in Diabetes Mellitus, Separate Volume", J Clin Exp Med., cytokine-state of arts, 5 pages, (2004).
Sato, K. et al., "Marked Induction of c-Maf Protein During Th17 Cell Differentiation and Its Implication in Memory Th Cell Development", J Biol Chem.. 286(17):14963-71, (2011).
Scaldaferri, F. et al., "Mucosal Biomarkers in Inflammatory Bowel Disease: Key Pathogenic Players or Disease Predictors?" World J Gastroenterol., 16(21 ):2616-25,(2010).
Schamel, W. et al., "Organization of the Resting TCR in Nanoscale Oligomers", Immunol Rev., 251(1):13-20, (2013).
Schirle, M. et al., "Combining Computer Algorithms With Experimental Approaches Permits the Rapid and Accurate Identification of T Cell Epitopes From Defined Antigens", J Immunol Meth., 257(1-2):1-16, (2001).
Schlesinger, S. et al., "Alphavirus Vectors for Gene Expression and Vaccines", Curr Opin Biotechnol., 10(5):434-9, (Abstract only), (1999 ).
Schlichtholz, B. et al., The Immune Response to p53 in Breast Cancer Patients Is Directed Against Immunodominant Epitopes Unrelated to the Mutational Hot Spot, Cancer Res., 52(22):6380-4, (1992).
Schneider, K. et al., "The End of the Era of Generosity? Global Health Amid Economic Crisis", Philos Ethics Humanit Med., 4:1, (2009).
Schnotgen, F. et al., "A Directional Strategy for Monitoring Cre-mediated Recombination at the Cellular Level in the Mouse", Nat Biotechnol., 21(5):562-6, (2003).
Schreiber, H. et al., "Using Carbon Magnetic Nanoparticles to Target, Track, and Manipulate Dendritic Cells", J Immunol Methods, 356(1-2):47-59, (2010).
Scott, R. et al., "Synthesis, Characterization, and Applications of Dendrimer-Encapsulated Nanoparticles", J Phys Chem B., 109(2):692-704, (2005).
Serra, P. et al., "Nanoparticle-based Approaches to Immune Tolerance for the Treatment of Autoimmune Diseases", Eur J Immunol., 48(5):751-6, (2018).

Serreze, D. et al., "Autoreactive Diabetogenic T-cells in NOD Mice Can Efficiently Expand From a Greatly Reduced Precursor Pool", Diabetes, 50(9):1992-2000, (2001).
Shanks, N. et al., "Are Animal Models Predictive for Humans?", Philos Ethics Humanit Med., 4(2):1-20, (2009).
Shao, K. et al., "Nanoparticle-Based Immunotherapy for Cancer", ACS Nano., 9(1):16-30, (2015).
Sherman, E. et al., "Functional Nanoscale Organization of Signaling Molecules Downstream of the T Cell Antigen Receptor", Immunity, 35(5):705-20, (2011).
Shimoda, S. et al., "Identification and Precursor Frequency Analysis of a Common T Cell Epitope Motif in Mitochondrial Autoantigens in Primary Biliary Cirrhosis", J Clin Invest., 102(10):1831-40, (1998).
Shukla, S. et al., "Emerging Nanotechnologies for Cancer Immunotherapy", Exp Bioi Med (Maywood)., 241(10):1116-26, (2016).
Sibley. R. et al., "Recurrent Diabetes Mellitus in the Pancreas Iso- And Allograft. A Light and Electron Microscopic and Immunohistochemical Analysis of Four Cases", Lab Invest., 53(2):132-44, (1985).
Singha, S. et al., "Peptide-MHC-based Nanomedicines for Autoimmunity Function as T-cell Receptor Microclustering Devices", Nat Nanotechnol., 12(7):701-10, (2017).
Sollid, L. et al., "Nomenclature and Listing of Celiac Disease Relevant Gluten T-cell Epitopes Restricted by HLA-DQ Molecules", Immunogenetics, 64(6):455-60, (2012).
Somoza, N. et al., "Pancreas in Recent Onset Insulin-Dependent Diabetes Mellitus. Changes in HLA, Adhesion Molecules and Autoantigens, Restricted T Cell Receptor V Beta Usage, and Cytokine Profile", J Immunol., 153(3):1360-77, (1994).
Spada, F. et al., "Self-recognition of CD1 by Gamma/Delta T Cells: Implications for Innate Immunity", J Exp Med., 191(6):937-48, (2000).
Spensieri, F. et al., "Human Circulating influenza-CD4+ ICOS1+ IL-21+ T Cells Expand After Vaccination, Exert Helper Function, and Predict Antibody Responses", Proc Natl Acad Sci USA, 110(35):14330-5, (2013).
Sprent, J. et al., "T Cell Death and Memory", Science, 293(5528):245-8, (2001).
Sprent, J. et al., "T Cell Memory", Annu Rev Immunol., 20:551-79, (2002).
Standifer, N. et al., "Identification of Novel HLA-A*0201-restricted Epitopes in Recent-Onset Type 1 Diabetic Subjects and Antibody-Positive Relatives", Diabetes, 55(11):3061-7, (2006).
Steenblock, E. et al., "A Comprehensive Platform for Ex Vivo T-cell Expansion Based on Biodegradable Polymeric Artificial Antigen-Presenting Cells", Mol Ther., 16(4):765-72, (2008). (2008).
Stratmann, T. et al., "Susceptible MHC Alleles, Not Background Genes, Select an Autoimmune T Cell Reactivity", J Clin Invest., 112(6):902-14, (2003).
Stratmann, T. et al., "The I-Ag7 MHC Class II Molecule Linked to Murine Diabetes Is a Promiscuous Peptide Binder", J Immunol., 165(6):3214-25, (2000).
Sukhorukov, G. et al., Stepwise Polyelectrolyte Assembly on Particle Surfaces: A Novel Approach to Colloid Design, Polymers Adv Tech., 9(10-11):759-67, (1998).
Sutton, I. et al., "Primary Biliary Cirrhosis: Seeking the Silent Partner of Autoimmunity", Gut, 50(6):743-6, (2002).
Szczerkowska-Dobosz, A., "Human Leukocyte Antigens as Psoriasis Inheritance and Susceptibility Markers", Arch Immunol Ther Exp (Warsz)., 53(5):428-33, (2005).
Tait, B. et al., "HLA Antigens and Age at Diagnosis of Insulin-Dependent Diabetes Mellitus", Hum Immunol., 42(2):116-24, (1995).
Takahashi, F. et al., "Isolation and Characterization of a Colonic Autoantigen Specifically Recognized by Colon Tissue-Bound Immunoglobulin G From Idiopathic Ulcerative Colitis", J Clin Invest., 76(1):311-8, (1985).
Takaki, T. et al., "HLA-A*0201-restricted T Cells From Humanized NOD Mice Recognize Autoantigens of Potential Clinical Relevance to Type 1 Diabetes", J Immunol., 176(5):3257-65, (2006).

(56) References Cited

OTHER PUBLICATIONS

Tan, J. et al., "Interleukin (IL)-15 and IL-7 Jointly Regulate Homeostatic Proliferation of Memory Phenotype CD8+ Cells but Are Not Required for Memory Phenotype CD4+ Cells", J Exp Med., 195(12):1523-32, (2002).
Tanimura, K. et al., "β2-Glycoprotein I/HLA Class II Complexes Are Novel Autoantigens in Antiphospholipid Syndrome", Blood, 125(18):2835-44, (2015).
Tigges, M. et al., "Human Herpes Simplex Virus (HSV)-specific CD8+ CTL Clones Recognize HSV-2-infected Fibroblasts After Treatment With IFN-gamma or When Virion Host Shutoff Functions Are Disabled", J Immunol., 156(10):3901-10, (1996).
Toes, R. et al., "Peptide Vaccination Can Lead to Enhanced Tumor Growth Through Specific T-cell Tolerance Induction", Proc Natl Acad Sci USA, 93(15):7855-60, (1996).
Toma, A. et al., "Recognition of a Subregion of Human Proinsulin by Class I-restricted T Cells in Type 1 Diabetic Patients", Proc Natl Acad Sci USA, 102(30):10581-6, (2005).
Trenttham, D. et al., "Effects of Oral Administration of Type II Collagen on Rheumatoid Arthritis", Science, 261(5129):1727-30, (1993).
Trudeau, J. et al., "Prediction of Spontaneous Autoimmune Diabetes in NOD Mice by Quantification of Autoreactive T Cells in Peripheral Blood", J Clin Invest., 111(2):217-23, (2003).
Tsai, S. et al., "CD8+ T Cells in Type 1 Diabetes", Adv Immunol., 100:79-124, (2008).
Tsai, S. et al., "Reversal of Autoimmunity by Boosting Memory-Like Autoregulatory T Cells", Immunity, 32(4):568-80, (2010).
Tsuchida, T. et al., "Autoreactive CD8+ T-cell Responses to Human Myelin Protein-Derived Peptides", Proc Natl Acad Sci USA, 91(23):10859-63, (1994).
Tufveson, G. et al., "New Immunosuppressants: Testing and Development in Animal Models and the Clinic: With Special Reference to DSG", Immunological Rev., 136:99-109, (1993).
U.S. Appl. No. 15/807,415; Final Office Action, dated Dec. 30, 2020; 33 pages.
U.S. Appl. No. 12/044,435; Advisory Action, dated Aug. 23, 2011; 4 pages.
U.S. Appl. No. 12/044,435; Applicant-Initiated Interview Summary, dated Dec. 13, 2012; 4 pages.
U.S. Appl. No. 12/044,435; Applicant-Initiated Interview Summary, dated Jul. 16, 2012; 3 pages.
U.S. Appl. No. 12/044,435; Applicant-Initiated Interview Summary, dated Nov. 7, 2011; 3 pages.
U.S. Appl. No. 12/044,435; Applicant-Initiated Interview Summary, dated Sep. 12, 2012; 6 pages.
U.S. Appl. No. 12/044,435; Examiner-Initiated Interview Summary, dated Mar. 18, 2011; 4 pages.
U.S. Appl. No. 12/044,435; Final Office Action, dated Jun. 8, 2011; 24 pages.
U.S. Appl. No. 12/044,435; Non-Final Office Action, dated May 2, 2012; 12 pages.
U.S. Appl. No. 12/044,435; Non-Final Office Action, dated Nov. 24, 2010; 39 pages.
U.S. Appl. No. 12/044,435; Notice of Allowance, dated Sep. 12, 2012; 8 pages.
U.S. Appl. No. 12/044,435; Supplemental Notice of Allowability, dated Dec. 13, 2012; 2 pages.
U.S. Appl. No. 12/848,055; 1.132 Declaration, dated May 21, 2013; 7 pages.
U.S. Appl. No. 12/848,055; Advisory Action, dated May 5, 2014; 3 pages.
U.S. Appl. No. 12/848,055; Applicant-Initiated Interview Summary, dated Nov. 5, 2012; 6 pages.
U.S. Appl. No. 12/848,055; Final Office Action, dated Aug. 23, 2012; 13 pages.
U.S. Appl. No. 12/848,055; Final Office Action, dated Dec. 24, 2014; 19 pages.
U.S. Appl. No. 12/848,055; Final Office Action, dated Jul. 12, 2013; 17 pages.
U.S. Appl. No. 12/848,055; Non-Final Office Action, dated Apr. 4, 2012; 22 pages.
U.S. Appl. No. 12/848,055; Non-Final Office Action, dated Dec. 19, 2012; 14 pages.
U.S. Appl. No. 12/848,055; Non-Final Office Action, dated Jun. 6, 2014; 24 pages.
U.S. Appl. No. 12/848,055; Non-Final Office Action, dated May 13, 2016; 27 pages.
U.S. Appl. No. 12/848,055; Notice of Appeal, dated Jan. 7, 2014; 2 pages.
U.S. Appl. No. 12/848,055; Notice of Appeal, dated Jun. 22, 2015; 2 pages.
U.S. Appl. No. 12/848,055; Notice of Appeal, dated Nov. 11, 2016; 2 pages.
U.S. Appl. No. 13/249,105; 1.132 Declaration, dated Jun. 2, 2017; 26 pages.
U.S. Appl. No. 13/249,105; 1.132 Declaration, dated Sep. 4, 2015; 13 pages.
U.S. Appl. No. 13/249,105; Applicant Summary of Interview, dated Mar. 6, 2017; 2 pages.
U.S. Appl. No. 13/249,105; Applicant Summary of Interview, dated Oct. 9, 2015; 1 page.
U.S. Appl. No. 13/249,105; Applicant-Initiated Interview Summary, dated Aug. 6, 2015; 3 pages.
U.S. Appl. No. 13/249,105; Applicant-Initiated Interview Summary, dated Feb. 7, 2017; 3 pages.
U.S. Appl. No. 13/249,105; Applicant-Initiated Interview Summary, dated Sep. 11, 2015; 3 pages.
U.S. Appl. No. 13/249,105; Final Office Action, dated Apr. 11, 2018; 32 pages.
U.S. Appl. No. 13/249,105; Final Office Action, dated Nov. 30, 2015; 20 pages.
U.S. Appl. No. 13/249,105; Non-Final Office Action, dated Apr. 3, 2015; 31 pages.
U.S. Appl. No. 13/249,105; Non-Final Office Action, dated Sep. 8, 2017; 16 pages.
U.S. Appl. No. 13/249,105; Notice of Appeal, dated May 31, 2016; 2 pages.
U.S. Appl. No. 13/294,109; 1.132 Declaration, dated Dec. 11, 2014; 12 pages.
U.S. Appl. No. 13/294,109; 1.132 Declaration, dated Nov. 5, 2015; 21 pages.
U.S. Appl. No. 13/294,109; Examiner-Initiated Interview Summary, dated Apr. 4, 2016; 3 pages.
U.S. Appl. No. 13/294,109; Final Office Action, dated Jan. 12, 2015; 13 pages.
U.S. Appl. No. 13/294,109; Final Office Action, dated Nov. 13, 2013; 14 pages.
U.S. Appl. No. 13/294,109; Non-Final Office Action, dated Jun. 4, 2013; 23 pages.
U.S. Appl. No. 13/294,109; Notice of Allowance, dated Apr. 4, 2016; 15 pages.
U.S. Appl. No. 13/294,109; Notice of Allowance, dated Sep. 29, 2016; 31 pages.
U.S. Appl. No. 13/294,109; Notice of Appeal, dated Jul. 10, 2015; 4 pages.
U.S. Appl. No. 13/712,832; Non-Final Office Action, dated Feb. 27, 2015; 34 pages.
U.S. Appl. No. 13/830,521; 1.132 Declaration, dated Apr. 4, 2016; 33 pages.
U.S. Appl. No. 13/830,521; 1.132 Declaration, dated Dec. 24, 2014; 8 pages.
U.S. Appl. No. 13/830,521; Applicant-Initiated Interview Summary, dated Dec. 19, 2016; 2 pages.
U.S. Appl. No. 13/830,521; Applicant-Initiated Interview Summary, dated May 27, 2015; 3 pages.
U.S. Appl. No. 13/830,521; Final Office Action, dated Mar. 5, 2015; 15 pages.
U.S. Appl. No. 13/830,521; Non-Final Office Action, dated Jul. 25, 2014; 36 pages.
U.S. Appl. No. 13/830,521; Non-Final Office Action, dated Jun. 28, 2016; 13 pages.

(56) References Cited

OTHER PUBLICATIONS

U.S. Appl. No. 13/830,521; Notice of Appeal, dated Sep. 4, 2015; 2 pages.
U.S. Appl. No. 13/842,302; 1.132 Declaration, dated Feb. 17, 2016; 46 pages.
U.S. Appl. No. 13/842,302; 1.132 Declaration, dated Feb. 23, 2016; 2 pages.
U.S. Appl. No. 13/842,302; Advisory Action, dated Jul. 10, 2019; 6 pages.
U.S. Appl. No. 13/842,302; Applicant-Initiated Interview Summary, dated Aug. 15, 2018; 4 pages.
U.S. Appl. No. 13/842,302; Applicant-Initiated Interview Summary, dated Jan. 25, 2017; 4 pages.
U.S. Appl. No. 13/842,302; Applicant-Initiated Interview Summary, dated Jun. 23, 2015; 5 pages.
U.S. Appl. No. 13/842,302; Examiner-Initiated Interview Summary, dated Oct. 22, 2020; 1 page.
U.S. Appl. No. 13/842,302; Final Office Action, dated Dec. 28, 2018; 21 pages.
U.S. Appl. No. 13/842,302; Final Office Action, dated Feb. 18, 2015; 25 pages.
U.S. Appl. No. 13/842,302; Final Office Action, dated May 3, 2017; 31 pages.
U.S. Appl. No. 13/842,302; Non-Final Office Action, dated Apr. 29, 2020; 22 pages.
U.S. Appl. No. 13/842,302; Non-Final Office Action, dated Apr. 30, 2014; 29 pages.
U.S. Appl. No. 13/842,302; Non-Final Office Action, dated Apr. 30, 2018; 46 pages.
U.S. Appl. No. 13/842,302; Non-Final Office Action, dated Jul. 6, 2016; 28 pages.
U.S. Appl. No. 13/842,302; Notice of Allowance, dated Oct. 22, 2020; 31 pages.
U.S. Appl. No. 13/842,302; Notice of Appeal, dated Aug. 17, 2015; 2 pages.
U.S. Appl. No. 14/531,707; Applicant-Initiated Interview Summary, dated Jan. 31, 2018; 3 pages.
U.S. Appl. No. 14/531,707; Examiner-Initiated Interview Summary, dated Jun. 18, 2018; 1 page.
U.S. Appl. No. 14/531,707; Non-Final Office Action, dated Oct. 3, 2017; 14 pages.
U.S. Appl. No. 14/531,707; Notice of Allowance, dated Jul. 20, 2018; 4 pages.
U.S. Appl. No. 14/531,707; Notice of Allowance, dated Jun. 18, 2018; 58 pages.
U.S. Appl. No. 14/684,153; Applicant-Initiated Interview Summary, dated Dec. 20, 2016; 2 pages.
U.S. Appl. No. 14/684,153; Non-Final Office Action, dated Jun. 30, 2016; 32 pages.
U.S. Appl. No. 14/684,153; Notice of Allowance, dated Jan. 26, 2017; 7 pages.
U.S. Appl. No. 14/723,268; Final Office Action, dated Mar. 30, 2016; 15 pages.
U.S. Appl. No. 14/723,268; Non-Final Office Action, dated Oct. 16, 2015; 23 pages.
U.S. Appl. No. 14/723,268; Notice of Appeal, dated Sep. 29, 2016; 2 pages.
U.S. Appl. No. 15/348,959; Applicant-Initiated Inteview Summary, dated Aug. 30, 2017; 2 pages.
U.S. Appl. No. 15/348,959; Applicant-Initiated Inteview Summary, dated Jul. 3, 2019; 2 pages.
U.S. Appl. No. 15/348,959; Applicant-Initiated Inteview Summary, dated Mar. 29, 2018; 3 pages.
U.S. Appl. No. 15/348,959; Examiner-Initiated Inteview Summary, dated Jul. 3, 2019; 2 pages.
U.S. Appl. No. 15/348,959; Final Office Action, dated Jan. 12, 2018; 30 pages.
U.S. Appl. No. 15/348,959; First-Action Inteview Office Action, dated Aug. 30, 2017; 25 pages.
U.S. Appl. No. 15/348,959; Non-Final Office Action, dated Feb. 21, 2019; 7 pages.
U.S. Appl. No. 15/348,959; Notice of Allowance, dated Jul. 3, 2019; 12 pages.
U.S. Appl. No. 15/348,959; Pre-Interview First Office Action, dated Apr. 13, 2017; 20 pages.
U.S. Appl. No. 15/433,898; Non-Final Office Action, dated Sep. 28, 2017; 31 pages.
U.S. Appl. No. 15/433,898; Notice of Allowance, dated May 17, 2018; 34 pages.
U.S. Appl. No. 15/433,898; Notice of Allowance, dated May 31, 2018; 3 pages.
U.S. Appl. No. 15/572,137; Non-Final Office Action, dated Jul. 8, 2020; 77 pages.
U.S. Appl. No. 15/610,550; Applicant-Initiated Interview Summary, dated Apr. 3, 2020; 3 pages.
U.S. Appl. No. 15/610,550; Final Office Action, dated Jun. 19, 2020; 16 pages.
U.S. Appl. No. 15/610,550; Non-Final Office Action, dated Nov. 4, 2019; 50 pages.
U.S. Appl. No. 15/807,415; Non-Final Office Action, dated Jul. 29, 2020; 74 pages.
U.S. Appl. No. 15/999,192; Non-Final Office Action, dated Apr. 15, 2020; 71 pages.
U.S. Appl. No. 15/999,192; Notice of Allowance, dated Oct. 13, 2020; 15 pages.
U.S. Appl. No. 16/200,199; Non-Final Office Action, dated Aug. 27, 2020; 54 pages.
U.S. Appl. No. 16/200,199; Notice of Allowance, dated Jan. 13, 2021; 11 pages.
U.S. Appl. No. 17/097,682; Application as filed, dated Nov. 13, 2020; 117 pages.
U.S. Appl. No. 17/128,776; Application as filed, dated Dec. 21, 2020; 57 pages.
Ugel, S. et al., "In Vivo Administration of Artificial Antigen-Presenting Cells Activates Low-Avidity T Cells for Treatment of Cancer", Cancer Res., 69(24):9376-84, (2009).
Unger, W. et al., "Human Clonal CD8 Autoreactivity to an IGRP Islet Epitope Shared Between Mice and Men", Ann NY Acad Sci., 1103:192-5, (2007).
UniProtKB: D4VD94 from www.uniprot.org/uniprot/D4VD94; (2010).
Vadasz, Z. et al., "B-regulatory Cells in Autoimmunity and Immune Mediated Inflammation", FEBS Lett., 587(13):2074-8, (2013).
Vakil, R. et al., "Effect of Cholesterol on the Release of Amphotericin B From PEG-phospholipid Micelles", Mol Pharm., 5(1):98-104, (2008).
Van Belle, T et al., "Type 1 Diabetes: Etiology, Immunology, and Therapeutic Strategies", Physiol Rev., 91(1):79-118, (2011).
Van Boekel, M. et al., "Autoantibody Systems in Rheumatoid Arthritis: Specificity, Sensitivity and Diagnostic Value", Arthritis Res., 4(2):87-93, (2002).
Van Driel, I. et al., "Role of Regulatory T Cells in Gastrointestinal Inflammatory Disease", J Gastroenterol Hepatol., 23(2):171-7, (2008).
Vandenbark, A. et al., "Recombinant TCR Ligand Induces Tolerance to Myelin Oligodendrocyte Glycoprotein 35-55 Peptide and Reverses Clinical and Histological Signs of Chronic Experimental Autoimmune Encephalomyelitis in HLA-DR2 Transgenic Mice", J Immunol., 171(1):127-33, (2003).
Verdaguer, J. et al., "Acceleration of Spontaneous Diabetes in TCR-beta-transgenic Nonobese Diabetic Mice by Beta-Cell Cytotoxic CD8+ T Cells Expressing Identical Endogenous TCR-alpha Chains", J Immunol., 157(10):4726-35, (1996).
Verdaguer, J. et al., "Spontaneous Autoimmune Diabetes in Monoclonal T Cell Nonobese Diabetic Mice", J Exp Med., 186(10):1663-76, (1997).
Verdù, E. et al., "Oral Administration of Antigens From Intestinal Flora Anaerobic Bacteria Reduces the Severity of Experimental Acute Colitis in BALB/c Mice", Clin Exp Immunol., 120(1):46-50, (2000).
Vincent, M. et al., "Understanding the Function of CD1-restricted T Cells", Nat Immunol., 4(6):517-23, (2003).

(56) References Cited

OTHER PUBLICATIONS

Wainwright, S. et al., "HLA-F Is a Predominantly Empty, Intracellular, TAP-associated MHC Class Ib Protein With a Restricted Expression Pattern", J Immunol., 164(1):319-28, (2000).

Walter, U. et al., "CD8+ T Cells in Autoimmunity", Curr Opin Immunol., 17(6):624-31, (2005).

Wang, J. et al., "In Situ Recognition of Autoantigen as an Essential Gatekeeper in Autoimmune CD8+ T Cell Inflammation ", Proc Natl Acad Sci USA, 107(20):9317-22, (2010).

Wang, X. et al., "Induction of Potent CD8 T-Cell Responses by Novel Biodegradable Nanoparticles Carrying Human Immunodeficiency Virus Type 1 gp120," J Virol., 81(18):10009-16, (2007).

Wang, Y. et al., "One-Pot Reaction to Synthesize Superparamagnetic Iron Oxide Nanoparticles by Adding Phenol as Reducing Agent and Stabilizer", J Nanoparticle Res., 14:755, (2012).

Warnock, G. et al., "Normoglycaemia After Transplantation of Freshly Isolated and Cryopreserved Pancreatic Islets in Type 1 (Insulin-Dependent) Diabetes Mellitus", Diabetologia, 34(1): 55-8, (1991).

Wei, C. et al., "Facile Synthesis of Superparamagnetic Magnetite Nanoparticles in Liquid Polyols", J Colloid Interface Sci., 305(2):366-70, (2007).

Weiner, H. et al., "Double-blind Pilot Trial of Oral Tolerization With Myelin Antigens in Multiple Sclerosis", Science, 259(5099):1321-4, (1993).

Weiss, G. et al., "Covalent HLA-B27/peptide Complex Induced by Specific Recognition of an Aziridine Mimic of Arginine", Proc Natl Acad Sci USA, 93(20):10945-8, (1996).

Wekerle, H. et al., "Animal Models of Multiple Sclerosis", Drug Discov Today: Disease Models, 3(4):359-67, (2006).

Wen, Z., "Surface Effect of the Nanoparticles", Intro Nat Sci., Nanjing University Press, pp. 373-374, (2007).

Williams, M. et al., "Developing and Maintaining Protective CD8+ Memory T Cells", Immunol Rev., 211:146-53, (2006).

Wilson, J. et al., "pH-Responsive Nanoparticle Vaccines for Dual-Delivery of Antigens and Immunostimulatory Oligonucleotides", ASC Nano., 7(5):3912-25, (2013).

Winer, S. et al., "Autoimmune Islet Destruction in Spontaneous Type 1 Diabetes Is Not Beta-Cell Exclusive", Nat Med., 9(2):198-205, (2003).

Wong, F. et al., "Identification of an MHC Class I-restricted Autoantigen in Type 1 Diabetes by Screening an Organ-Specific cDNA Library", Nat Med., 5(9):1026-31, (1999).

Wraith, D. et al., "Antigen Recognition in Autoimmune Encephalomyelitis and the Potential for Peptide-Mediated Immunotherapy", Cell, 59(2):247-55, (1989).

Wu, W. et al., "Magnetic Iron Oxide Nanoparticles: Synthesis and Surface Functionalization Strategies", Nanoscale Res Lett., 3(11):397-415, (2008).

Wucherpfennig, K. et al., "Structural Basis for Major Histocompatibility Complex (MHC)-linked Susceptibility to Autoimmunity: Charged Residues of a Single MHC Binding Pocket Confer Selective Presentation of Self-Peptides in Pemphigus Vulgaris", Proc Natl Acad Sci USA, 92(25):11935-9, (1995).

Xie, J. et al., "Controlled PEGylation of Monodisperse Fe3O4 Nanoparticles for Reduced Non Specific Uptake by Macrophage Cells", Adv Mat., 19(20):3163-6, (2007).

Xie, J. et al., "One-Pot Synthesis of Monodisperse Iron Oxide Nanoparticles for Potential Biomedical Applications", Pure Appl Chem., 78(5):1003-14, (2006).

Xu, C. et al., "Monodisperse Magnetic Nanoparticles for Biomedical Applications", Polymer Int., 56(7):821-6, (2007).

Xu, H., "13.3.3 Relationship Between Gene Transduction and Nanoparticle Size", Nano Med., 35S, 4 pages, (2004).

Xu, Z. et al., "Oleylamine as Both Reducing Agent and Stabilizer in a Facile Synthesis of Magnetite Nano Particles", Chem Mat., 21:1778-80, (2009).

Yadav, V. et al., "Recombinant T-Cell Receptor Ligand (RTL) for Treatment of Multiple Sclerosis: A Double-Blind, Placebo-Controlled, Phase 1, Dose-Escalation Study", Autoimmune Dis., 2012:954739, (2012).

Yamanouchi, J. et al., "Interleukin-2 Gene Variation Impairs Regulatory T Cell Function and Causes Autoimmunity", Nat Genet., 39(3):329-37, (2007).

Yanaba, K. et al., "The Development and Function of Regulatory B Cells Expressing IL-10 (B10 Cells) Requires Antigen Receptor Diversity and TLR Signals", J Immunol., 182(12):7459-72, (2009).

Yang, J. et al., "CD4+ T Cells From Type 1 Diabetic and Healthy Subjects Exhibit Different Thresholds of Activation to a Naturally Processed Proinsulin Epitope", J Autoimmun., 31(1):30-41, (2008).

Yang, J. et al., "Islet-specific glucose-6-phosphatase Catalytic Subunit-Related Protein-Reactive CD4+ T Cells in Human Subjects", J Immunol., 176(5):2781-9, (2006).

Yang, X. et al., "Opposing Regulation of the Locus Encoding IL-17 Through Direct, Reciprocal Actions of STAT3 and STAT5", Nat Immunol., 12(3):247-54, (2011).

Yeste, A. et al., "Nanoparticle-mediated Codelivery of Myelin Antigen and a Tolerogenic Small Molecule Suppresses Experimental Autoimmune Encephalomyelitis", Proc Natl Acad Sci USA, 109(28):11270-5, (2012).

Ying, H. et al., "Cancer Therapy Using a Self-Replicating RNA Vaccine", Nat Med., 5(7):823-7, (1999).

Yokosuka, T. et al., "Newly Generated T Cell Receptor Microclusters Initiate and Sustain T Cell Activation by Recruitment of Zap70 and SLP-76", Nat Immunol., 6(12):1253-62, (2005).

Yoshida, K. et al., "Evidence for Shared Recognition of a Peptide Ligand by a Diverse Panel of Non-Obese Diabetic Mice-Derived, Islet-Specific, Diabetogenic T Cell Clones", Int Immunol., 14(12)1439-47, (2002).

Yoshizaki, A. et al., "Regulatory B Cells Control T-cell Autoimmunity Through IL-21-dependent Cognate Interactions", Nature, 491(7423):264-8, (2012).

Yu, Y. et al., "Cutting Edge: Single-Chain Trimers of MHC Class I Molecules Form Stable Structures That Potently Stimulate Antigen-Specific T Cells and B Cells", J Immunol., 168(7):3145-9, (2002).

Zajac, A. et al., "Viral Immune Evasion Due to Persistence of Activated T Cells Without Effector Function", J Exp Med., 188(12):2205-13, (1998).

Zang, Y. et al., "Increased CD8+ Cytotoxic T Cell Responses to Myelin Basic Protein in Multiple Sclerosis", J Immunol., 172(8):5120-7, (2004).

Zhang, S. et al., "HMGB1, an Innate Alarmin, in the Pathogenesis of Type 1 Diabetes", Int J Clin Exp Pathol., 3(1):24-38, (2010).

Zhong, L. et al., "NSOM/QD-based Direct Visualization of CD3-induced and CD28-enhanced Nanospatial Coclustering of TCR and Coreceptor in Nanodomains in T Cell Activation", PLoS One, 4(6):e5945, (2009).

Zhou, L. et al., "Plasticity of CD4+ T Cell Lineage Differentiation", Immunity, 30(5):646-55, (2009).

Zhou, X. et al., "Instability of the Transcription Factor Foxp3 Leads to the Generation of Pathogenic Memory T Cells in Vivo", Nat Immunol., 10(9):1000-7, (2009).

Zufferey, R. et al., "Woodchuck Hepatitis Virus Posttranscriptional Regulatory Element Enhances Expression of Transgenes Delivered by Retroviral Vectors", J Virol., 73(4):2886-92, (1999).

"Homology", Definition of homology by Merriam-Webster dictionary, 13 pages, (2019).

Celik, A. et al., "The diversity of the HLA-E-restricted peptide repertoire explains the immunological impact of the Arg107Gly mismatch", Immunogenetics, 68(1):29-41, (2016).

Chen, C. et al., "Induction of autoantigen-specific Th2 and Tr1 regulatory T cells and modulation of autoimmune diabetes", J Immunol., 171(2):733-44, (2003).

Cochran, J. et al., "The relationship of MHC-peptide binding and T cell activation probed using chemically defined MHC class II oligomers", Immunity, 12(3):241-50, (2000).

GenBank Accession No. AAC08954, "T cell receptor beta chain [*Homo sapiens*] ", retrieved from https://www.ncbi.nlm.nih.gov/protein/AAC08954; (2001).

(56) References Cited

OTHER PUBLICATIONS

GenBank Accession No. AAC14923.1, "T cell receptor alpha chain [*Homo sapiens*]", retrieved from https://www.ncbi.nlm.nih.gov/protein/AAC14923.1?report=genbank&log$=protalign&blast, (1998).
Kalandadze, A. et al., "Replacement of the Hydrophopic Transmembrane Region by a Leucine Zipper Dimerization Motif Allows the Assembly and Secretion of Soluble DR αβ Heterodimers", J Biol Chem., 271(33):20156-20162, (1996).
Kalergis, A. et al., "A simplified procedure for the preparation of MHC/peptide tetramers: chemical biotinylation of an unpaired cysteine engineered at the C-terminus of MHC-I", J Immunol Meth., 234(1-2):61-70, (2000).
Koonin, E. et al., "Chapter 2 Evolutionary Concept in Genetic and Genomics", NCBI Bookshelf, Bookshelf ID: NBK20255, 23 pages, (2003).
Mallone, R. et al., "Functional avidity directs T-cell fate in autoreactive CD4+ T cells", Blood, 106(8):2798-805, (2005).
Matern, B. et al., "Insights into the polymorphism in HLA-DRA and its evolutionary relationship with HLA haplotypes", HLA, 95(2):117-27, (2020).
Nishioka, Y. et al., "CD1d-Restricted Type II NKT Cells Reactive With Endogenous Hydrophobic Peptides", Front Immunol., 9:548, 6 pages, (2018).
Pfister, D. et al., "Process for protein PEGylation", J Control Release, 180:134-49, (2014).
Rakoff-Nahoum, S. et al., "Role of toll-like receptors in spontaneous commensal-dependent colitis", Immunity, 25(2):319-29, (2006).
Schaefer, W. et al., "Heavy and light chain pairing of bivalent quadroma and knobs-into-holes antibodies analyzed by UHR-ESI-QTOF mass spectrometry", MAbs., 8(1):49-55, (2016).
Schumacher, T. et al., "Neoantigens in cancer immunotherapy", Science, 348(6230):69-74, (2015).
Serra, P. et al., "Peptide-MHC-Based Nanomedicines for the Treatment of Autoimmunity: Engineering, Mechanisms, and Diseases", Front Immunol., 11:621774, (2021).
Shaefer, W. et al., "Heavy and light chain pairing of bivalent quadroma and knobs-into-holes antibodies analyzed by UHR-ESI-QTOF mass spectrometry", MAbs., 8(1):49-55, (2015).
Shimoda, S. et al., "HLA DRB4 0101-restricted immunodominant T cell autoepitope of pyruvate dehydrogenase complex in primary biliary cirrhosis: evidence of molecular mimicry in human autoimmune diseases", J Exp Med., 181(5):1835-45, (1995).
Singh, N. et al., "Emerging Concepts in TCR Specificity: Rationalizing and (Maybe) Predicting Outcomes", J Immunol., 199(7):2203-13, (2017).
Umeshappa, C. et al., "Suppression of A Broad Spectrum of Liver Autoimmune Pathologies by Single Peptide-MHC-Based Nanomedicines", Nat Commun., 10(1):2150, (2019).
U.S. Appl. No. 15/572,137; Final Office Action, dated Feb. 8, 2022; 17 pages.
U.S. Appl. No. 15/572,137; Non-Final Office Action, dated Jul. 23, 2021; 16 pages.
U.S. Appl. No. 15/572,137; Non-Final Office Action, dated Sep. 28, 2022; 26 pages.
U.S. Appl. No. 15/572,137; Notice of Allowance, dated Nov. 22, 2023; 66 pages.
U.S. Appl. No. 15/807,415; Applicant-Initiated Interview Summary, date of interview Aug. 23, 2023; 2 pages.
U.S. Appl. No. 15/807,415; Final Office Action, dated Aug. 30, 2022; 26 pages.
U.S. Appl. No. 15/807,415; Non-Final Office Action, dated Aug. 19, 2021; 17 pages.
U.S. Appl. No. 15/807,415; Non-Final Office Action, dated May 25, 2023; 64 pages.
U.S. Appl. No. 16/132,000; Examiner-Initiated Interview Summary, dated Jan. 7, 2022; 1 page.
U.S. Appl. No. 16/132,000; Notice of Allowance, dated Jan. 21, 2022; 15 pages.
U.S. Appl. No. 16/156,326; Final Office Action, dated Apr. 20, 2022; 40 pages.
U.S. Appl. No. 16/603,180; Final Office Action, dated Mar. 1, 2023; 29 pages.
U.S. Appl. No. 16/603,180; Non-Final Office Action, dated Jul. 19, 2022; 54 pages.
U.S. Appl. No. 16/767,392; Non-Final Office Action, dated Nov. 8, 2023; 62 pages.
U.S. Appl. No. 16/767,392; Notice of Allowance, dated Jul. 10, 2024; 12 pages.
U.S. Appl. No. 17/097,682; Non-Final Office Action, dated Oct. 18, 2023; 60 pages.
U.S. Appl. No. 17/128,776; Non-Final Office Action, dated Dec. 8, 2023; 42 pages.
U.S. Appl. No. 17/228,014; Application as filed, dated Apr. 12, 2021; 63 pages.
U.S. Appl. No. 18/048,339; Application as filed, dated Oct. 20, 2022; 83 pages.
Wieczorek, M. et al., "Major Histocompatibility Complex (MHC) Class I and MHC Class II Proteins: Conformational Plasticity in Antigen Presentation", Front Immunol., 8(292):1-16, (2017).
Yang, Y. et al., "Antigen-specific nanomedicines for the treatment of autoimmune disease: target cell types, mechanisms and outcomes", Curr Opin Biotechnol., 74: 285-92, (2022).
Hjemmer, B. et al., "Minimal Peptide Length Requirements for CD4(+) T Cell Clones—Implications for Molecular Mimicry and T Cell Survival", Int Immunol., 12(3):375-83, (2000).
Serra, P. et al., "Increased Yields and Biological Potency of Knob-Into-Hole-Based Soluble MHC Class II Molecules", Nat Commun., 10(1):4917, (2019).
U.S. Appl. No. 15/572,137; Final Office Action, dated Feb. 25, 2021; 23 pages.
AU Patent Application No. 2016203231; Examination Report No. 2, dated Nov. 30, 2017; 3 pages.
AU Patent Application No. 2016225913; Examination Report No. 1, dated Sep. 22, 2017; 4 pages.
CA Patent Application No. 2,817,710; Office Action, dated Oct. 19, 2017; 4 pages.
CN Patent Application No. 201380022126.2; Office Action No. 4, dated Jul. 24, 2017; 2 pages.
CO Patent Application No. NC2017/0011437; Office Action, dated Nov. 19, 2017; 3 pages.
EP Patent Application No. 13856460.4; Communication, dated Nov. 15, 2017; 6 pages.
EP Patent Application No. 13856460.4; Extended European Search Report, mailed Feb. 26, 2016; 9 pages.
EP Patent Application No. 14184505.7; Communication, mailed Oct. 22, 2015; 4 pages.
EP Patent Application No. 17173410.6; Extended European Search Report, dated Dec. 15, 2017; 8 pages.
IL Patent Application No. 249165; Office Action, dated Dec. 17, 2017; 5 pages.
JP Patent Application No. 2015-536240; Office Action, dated Aug. 16, 2017; 6 pages.
JP Patent Application No. 2016-159414; Office Action, dated Oct. 30, 2017; 4 pages.
JP Patent Application No. 2017-014194; Office Action, dated Sep. 13, 2017; 6 pages.
Lieo, A. et al., "Role of cholangiocytes in primary biliary cirrhosis", Semin Liver Dis., 34(3):273-84, (2014).
MX Patent Application No. MX/a/2013/003559; Office Action No. 3, dated Jul. 3, 2017; 5 pages.
MX Patent Application No. MX/a/2014/011623; Office Action, dated Jul. 28, 2017; 10 pages.
NZ Patent Application No. 706970; First Examination Report, dated Nov. 8, 2017; 4 pages.
RU Patent Application No. 2014141984; Second Office Action, dated Nov. 23, 2017; 6 pages.
RU Patent Application No. 2015116509; Office Action, dated Nov. 29, 2017; 9 pages.
U.S. Appl. No. 16/767,392; Applicant-Initiated Interview Summary, date of interview Nov. 18, 2024; 1 page.
U.S. Appl. No. 16/767,392; Corrected Notice of Allowability, dated Nov. 22, 2024; 2 pages.

(56) References Cited

OTHER PUBLICATIONS

U.S. Appl. No. 16/767,392; Examiner-Initiated Interview Summary, date of interview Dec. 20, 2024; 1 page.
U.S. Appl. No. 16/767,392; Notice of Allowability, dated Oct. 23, 2024; 16 pages.
U.S. Appl. No. 16/767,392; Notice of Allowance, dated Jan. 15, 2025; 8 pages.

* cited by examiner

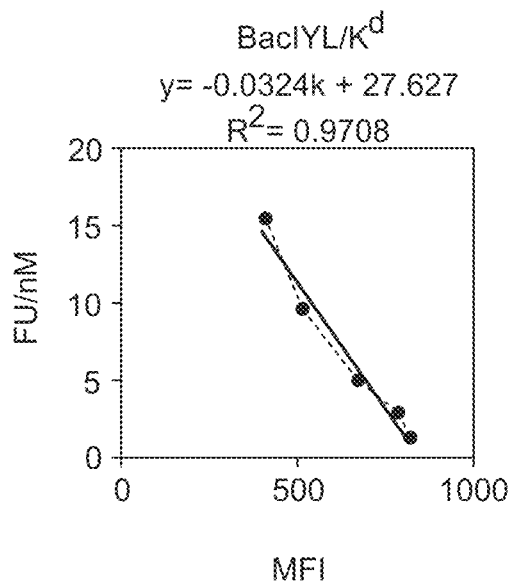
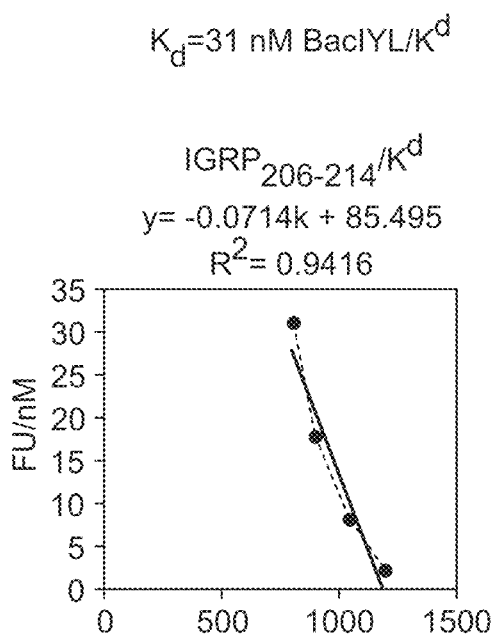
FIG. 1C

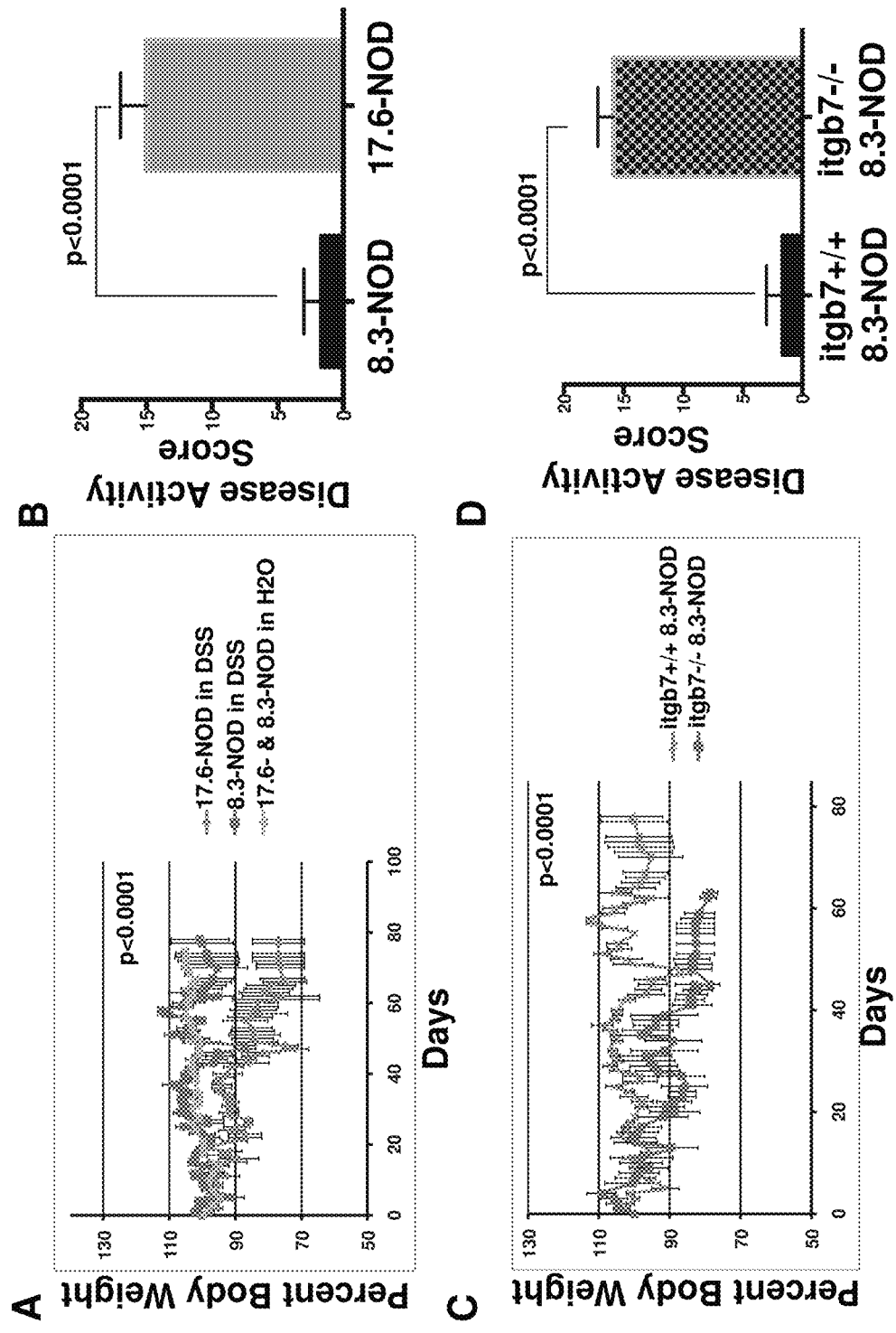
FIG. 4A-D

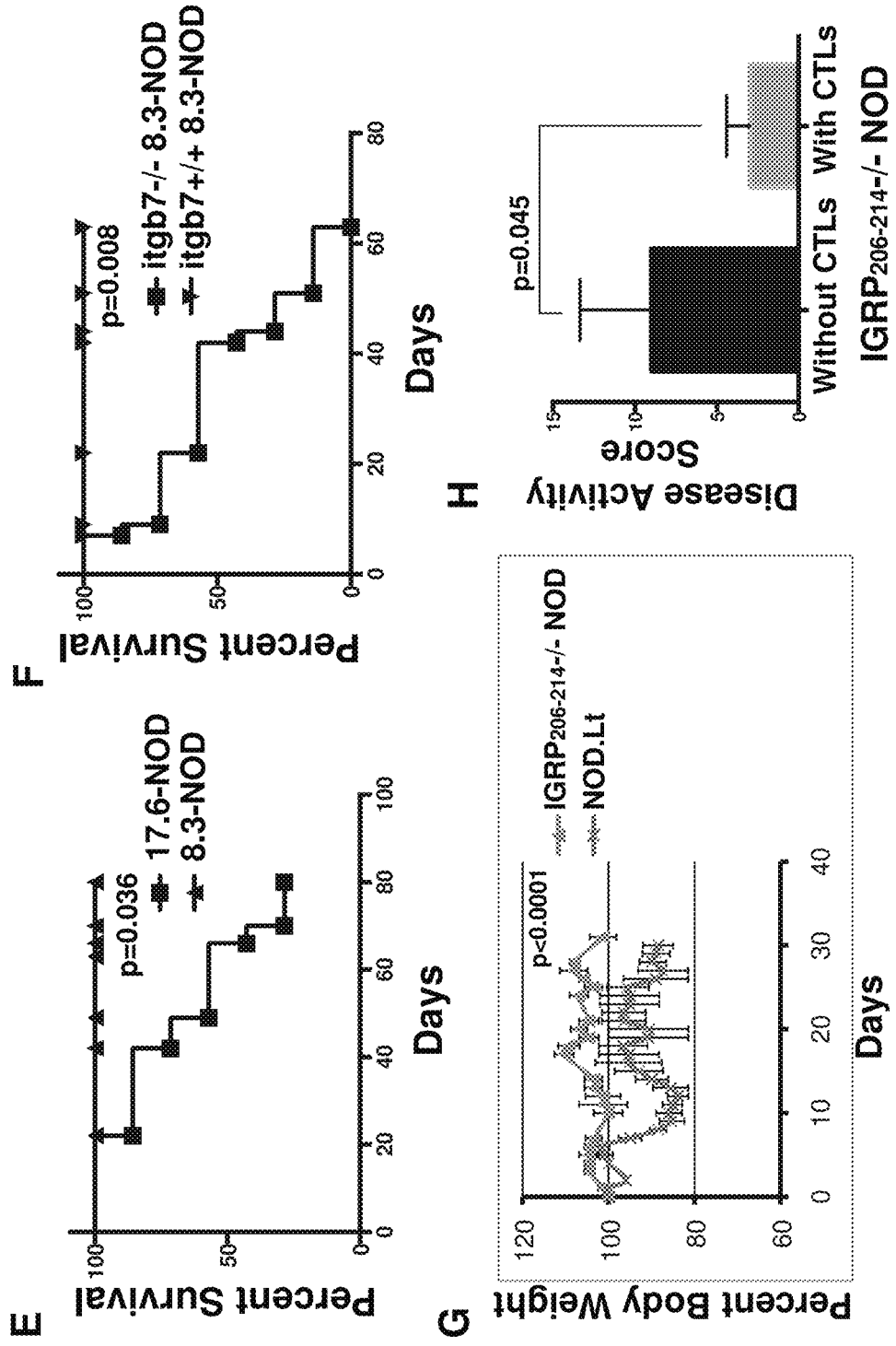
FIG. 4E-H

```
                NcoI
                ~~~~
            M   A   I   I   Y   L   I   L   L   F   T   A   V   R   G   T  ·
841         ATGGCT  ATCATCTACC  TCATCCTCCT  GTTCACCGCT  GTGCGGGGCA
            TACCGA  TAGTAGATGG  AGTAGGAGGA  CAAGTGGCGA  CACGCCCCGT
                                                        SpeI
                                                        ~~
        ·   N   V   Y   L   K   P   E   C   W   S   R   E   G   A   G   G   G   G   S   L  ·
901         CCAATGTTTA  CCTCAAACCG  GAGTGCTGGA  GCCGTGAGGG  GGCAGGAGGT  GGAGGCTCAC
            GGTTACAAAT  GGAGTTTGGC  CTCACGACCT  CGGCACTCCC  CCGTCCTCCA  CCTCCGAGTG
            SpeI
            ~~~~
        ·   V   P   R   G   S   G   G   G   S   G   D   S   E   R   H   F   V   Y   Q  ·
961         TAGTGCCCCG  AGGCTCTGGA  GGTGGAGGCT  CTGGAGACTC  CGAAAGGCAT  TTCGTGTACC
            ATCACGGGGC  TCCGAGACCT  CCACCTCCGA  GACCTCTGAG  GCTTTCCGTA  AAGCACATGG

·   F   M   G   E   C   Y   F   T   N   G   T   Q   R   I   R   Y   V   T   R   Y  ·
1021        AGTTCATGGG  CGAGTGCTAC  TTCACCAACG  GGACGCAGCG  CATACGATAT  GTGACCAGAT
            TCAAGTACCC  GCTCACGATG  AAGTGGTTGC  CCTGCGTCGC  GTATGCTATA  CACTGGTCTA

·   I   Y   N   R   E   E   Y   V   R   Y   D   S   D   V   G   E   H   R   A   V  ·
1081        ACATCTACAA  CCGGGAGGAG  TACGTGCGCT  ACGACAGCGA  CGTGGGCGAG  CACCGCGCGG
            TGTAGATGTT  GGCCCTCCTC  ATGCACGCGA  TGCTGTCGCT  GCACCCGCTC  GTGGCGCGCC

·   T   E   L   G   R   P   D   A   E   Y   W   N   S   Q   P   E   I   L   E   R  ·
1141        TGACCGAGCT  GGGGCGGCCA  GACGCCGAGT  ACTGGAACAG  CCAGCCGGAG  ATCCTGGAGC
            ACTGGCTCGA  CCCCGCCGGT  CTGCGGCTCA  TGACCTTGTC  GGTCGGCCTC  TAGGACCTCG

·   T   R   A   E   L   D   T   V   C   R   H   N   Y   E   G   P   E   T   H   T  ·
1201        GAACGCGGGC  CGAGCTGGAC  ACGGTGTGCA  GACACAACTA  CGAGGGGCCG  GAGACCCACA
            CTTGCGCCCG  GCTCGACCTG  TGCCACACGT  CTGTGTTGAT  GCTCCCCGGC  CTCTGGGTGT

·   S   L   R   R   L   E   Q   P   N   V   V   I   S   L   S   R   T   E   A   L  ·
1261        CCTCCCTGCG  GCGGCTTGAA  CAGCCCAATG  TCGTCATCTC  CCTGTCCAGG  ACAGAGGCCC
            GGAGGGACGC  CGCCGAACTT  GTCGGGTTAC  AGCAGTAGAG  GGACAGGTCC  TGTCTCCGGG

·   N   H   H   N   T   L   V   C   S   V   T   D   F   Y   P   A   K   I   K   V  ·
1321        TCAACCACCA  CAACACTCTG  GTCTGCTCAG  TGACAGATTT  CTACCCAGCC  AAGATCAAAG
            AGTTGGTGGT  GTTGTGAGAC  CAGACGAGTC  ACTGTCTAAA  GATGGGTCGG  TTCTAGTTTC

·   R   W   F   R   N   G   Q   E   E   T   V   G   V   S   S   T   Q   L   I   R  ·
1381        TGCGCTGGTT  CCGGAATGGC  CAGGAGGAGA  CGGTGGGGGT  CTCATCCACA  CAGCTTATTA
            ACGCGACCAA  GGCCTTACCG  GTCCTCCTCT  GCCACCCCCA  GAGTAGGTGT  GTCGAATAAT

·   N   G   D   W   T   F   Q   V   L   V   M   L   E   M   T   P   R   R   G   E  ·
1441        GGAATGGGGA  CTGGACCTTC  CAGGTCCTGG  TCATGCTGGA  GATGACCCCT  CGGCGGGGAG
            CCTTACCCCT  GACCTGGAAG  GTCCAGGACC  AGTACGACCT  CTACTGGGGA  GCCGCCCCTC
```

FIG. 8

```
                · V  Y  T    C  H  V    E  H  P    S  L  K  S    P  I  T    V  E  W  R ·
1501    AGGTCTACAC CTGTCACGTG GAGCATCCCA GCCTGAAGAG CCCCATCACT GTGGAGTGGA
        TCCAGATGTG GACAGTGCAC CTCGTAGGGT CGGACTTCTC GGGGTAGTGA CACCTCACCT

· A  Q  S    E  S  A    W  S  K    G  G  G    G  G  G    R  I  A ·
1561    GGGCACAGTC TGAGTCTGCC TGGAGCAAGG GAGGCGGAGG CGGTGGCGGA GGACGGATCG
        CCCGTGTCAG ACTCAGACGG ACCTCGTTCC CTCCGCCTCC GCCACCGCCT CCTGCCTAGC

R  L  E    E  K  V    K  T  L  K    A  Q  N    S  E  L    A  S  T  A ·
1621    CTCGGCTAGA GGAAAAAGTG AAAACCTTGA AAGCGCAAAA CTCCGAGCTG GCGTCCACGG
        GAGCCGATCT CCTTTTTCAC TTTTGGAACT TTCGCGTTTT GAGGCTCGAC CGCAGGTGCC
                                                                       XhoI
                                                                       ~~~~
          N  M  L    R  E  Q    V  A  Q  L    K  Q  K    V  M  N    H  *
1681    CCAACATGCT CAGGGAACAG GTGGCACAGC TTAAGCAGAA AGTCATGAAC CACTGACTCG
        GGTTGTACGA GTCCCTTGTC CACCGTGTCG AATTCGTCTT TCAGTACTTG GTGACTGAGC

XbaI
        ~~~~~~
1741    AGTCTAGA
        TCAGATCT
```

FIG. 8 (Continued)

```
                    NcoI
                    ~~~~
             M   A   I   I   Y   L   I   L   L   F   T   A   V   R   G   E  ·
 841         ATGGCT ATCATCTACC TCATCCTCCT GTTCACCGCT GTGCGGGGCG
             TACCGA TAGTAGATGG AGTAGGAGGA CAAGTGGCGA CACGCCCCGC

·  D   D   I   E   A   D   H   V   G   T   Y   G   I   S   V   Y   Q   S   P   G  ·
 901      AAGACGACAT TGAGGCCGAC CACGTAGGCA CCTATGGTAT AAGTGTATAT CAGTCTCCTG
          TTCTGCTGTA ACTCCGGCTG GTGCATCCGT GGATACCATA TTCACATATA GTCAGAGGAC

·  D   I   G   Q   Y   T   F   E   F   D   G   D   E   L   F   Y   V   D   L   D  ·
 961      GAGACATTGG CCAGTACACA TTTGAATTTG ATGGTGATGA GTTGTTCTAT GTGGACTTGG
          CTCTGTAACC GGTCATGTGT AAACTTAAAC TACCACTACT CAACAAGATA CACCTGAACC

HindIII
                                                ~~~~~~~
       ·  K   K   E   T   V   W   M   L   P   E   F   G   Q   L   A   S   F   D   P   Q  ·
1021      ATAAGAAGGA GACTGTCTGG ATGCTTCCTG AGTTTGGCCA ATTGGCAAGC TTTGACCCCC
          TATTCTTCCT CTGACAGACC TACGAAGGAC TCAAACCGGT TAACCGTTCG AAACTGGGGG ·  G   G   L   Q   N   I   A   V   V   K   H   N   L   G   V   L   T   K   R   S  ·
1081      AAGGTGGACT GCAAAACATA GCTGTAGTAA AACACAACTT GGGAGTCTTG ACTAAGAGGT
          TTCCACCTGA CGTTTTGTAT CGACATCATT TTGTGTTGAA CCCTCAGAAC TGATTCTCCA ·  N   S   T   P   A   T   N   E   A   P   Q   A   T   V   F   P   K   S   P   V  ·
1141      CAAATTCCAC CCCAGCTACC AATGAGGCTC CTCAAGCGAC TGTGTTCCCC AAGTCCCCTG
          GTTTAAGGTG GGGTCGATGG TTACTCCGAG GAGTTCGCTG ACACAAGGGG TTCAGGGGAC ·  L   L   G   Q   P   N   T   L   I   C   F   V   D   N   I   F   P   P   V   I  ·
1201      TGCTGCTGGG TCAGCCCAAC ACCCTCATCT GCTTTGTGGA CAACATCTTC CCTCCTGTGA
          ACGACGACCC AGTCGGGTTG TGGGAGTAGA CGAAACACCT GTTGTAGAAG GGAGGACACT ·  N   I   T   W   L   R   N   S   K   S   V   A   D   G   V   Y   E   T   S   F  ·
1261      TCAACATCAC ATGGCTCAGA AATAGCAAGT CAGTCGCAGA CGGTGTTTAT GAGACCAGCT
          AGTTGTAGTG TACCGAGTCT TTATCGTTCA GTCAGCGTCT GCCACAAATA CTCTGGTCGA ·  F   V   N   R   D   Y   S   F   H   K   L   S   Y   L   T   F   I   P   S   D  ·
1321      TCTTCGTCAA CCGTGACTAT TCCTTCCACA AGCTGTCTTA TCTCACCTTC ATCCCTTCTG
          AGAAGCAGTT GGCACTGATA AGGAAGGTGT TCGACAGAAT AGAGTGGAAG TAGGGAAGAC ·  D   D   I   Y   D   C   K   V   E   H   W   G   L   E   E   P   V   L   K   H  ·
1381      ACGATGACAT TTATGACTGC AAGGTGGAAC ACTGGGGCCT GGAGGAGCCG GTTCTGAAAC
          TGCTACTGTA AATACTGACG TTCCACCTTG TGACCCCGGA CCTCCTCGGC CAAGACTTTG ·  W   E   P   E   I   P   A   P   M   S   E   L   T   E   S   G   G   G   G  ·
1441      ACTGGGAACC TGAGATTCCA GCCCCCATGT CAGAGCTGAC AGAGTCCGGA GGCGGAGGCG
          TGACCCTTGG ACTCTAAGGT CGGGGGTACA GTCTCGACTG TCTCAGGCCT CCGCCTCCGC
```

FIG. 10

```
              . L   T   D   T   L   Q   A   E   T   D   Q   L   E   D   E   K   S   A   L   Q .
      1501    GACTGACAGA TACACTCCAA GCGGAGACAG ATCAACTTGA AGACGAGAAG TCTGCGTTGC
              CTGACTGTCT ATGTGAGGTT CGCCTCTGTC TAGTTGAACT TCTGCTCTTC AGACGCAACG

. T   E   I   A   N   L   L   K   E   K   E   K   L   E   F   I   L   A   A   H .
      1561    AGACCGAGAT TGCCAATCTA CTGAAAGAGA AGGAAAAACT GGAGTTTATT TGGCAGCCC
              TCTGGCTCTA ACGGTTAGAT GACTTTCTCT TCCTTTTTGA CCTCAAATAA AACCGTCGGG

. G   S   G   S   G   S   G   S   L   G   G   I   F   E   A   M   K   M   E   L .
      1621    ACGGTAGTGG TAGTGGTAGT GGATCTCTGG GTGGTATCTT CGAGGCTATG AAGATGGAGC
              TGCCATCACC ATCACCATCA CCTAGAGACC CACCATAGAA GCTCCGATAC TTCTACCTCG

XbaI
                                                          ~~~~~~~
                R   D   H   H   H   H   H   H   *
      1681    TGCGCGATCA TCACCATCAC CATCACTGAT CTAGA
              ACGCGCTAGT AGTGGTAGTG GTAGTGACTA GATCT
```

FIG. 10 (Continued)

```
                    NcoI
                    ~~~~
            M   A   I   I   Y   L   I   L   L   F   T   A   V   R   G   L ·
841    ATGGCT  ATCATCTACC  TCATCCTCCT  GTTCACCGCT  GTGCGGGGCT
       TACCGA  TAGTAGATGG  AGTAGGAGGA  CAAGTGGCGA  CACGCCCCGA
                                                          SpeI
                                                          ~~
       ·  G   Y   W   K   R   G   I   P   A   T   L   S   L   L   G   G   G   S   L ·
901    TGGGGTATTG  GAAGCGCGGA  ATACCTGCCA  CACTCTCACT  ACTGGGAGGT  GGAGGCTCAC
       ACCCCATAAC  CTTCGCGCCT  TATGGACGGT  GTGAGAGTGA  TGACCCTCCA  CCTCCGAGTG
       SpeI
       ~~~~
       ·  V   P   R   G   S   G   G   G   G   S   G   D   S   E   R   H   F   V   Y   Q ·
961    TAGTGCCCCG  AGGCTCTGGA  GGTGGAGGCT  CTGGAGACTC  CGAAAGGCAT  TCGTGTACC
       ATCACGGGGC  TCCGAGACCT  CCACCTCCGA  GACCTCTGAG  GCTTTCCGTA  AGCACATGG

·  F   M   G   E   C   Y   F   T   N   G   T   Q   R   I   R   Y   V   T   R   Y ·
1021   AGTTCATGGG  CGAGTGCTAC  TTCACCAACG  GGACGCAGCG  CATACGATAT  GTGACCAGAT
       TCAAGTACCC  GCTCACGATG  AAGTGGTTGC  CCTGCGTCGC  GTATGCTATA  CACTGGTCTA

·  I   Y   N   R   E   E   Y   V   R   Y   D   S   D   V   G   E   H   R   A   V ·
1081   ACATCTACAA  CCGGGAGGAG  TACGTGCGCT  ACGACAGCGA  CGTGGGCGAG  CACCGCGCGG
       TGTAGATGTT  GGCCCTCCTC  ATGCACGCGA  TGCTGTCGCT  GCACCCGCTC  GTGGCGCGCC

·  T   E   L   G   R   P   D   A   E   Y   W   N   S   Q   P   E   I   L   E   R ·
1141   TGACCGAGCT  GGGGCGGCCA  GACGCCGAGT  ACTGGAACAG  CCAGCCGGAG  ATCCTGGAGC
       ACTGGCTCGA  CCCCGCCGGT  CTGCGGCTCA  TGACCTTGTC  GGTCGGCCTC  TAGGACCTCG

·  T   R   A   E   L   D   T   V   C   R   H   N   Y   E   G   P   E   T   H   T ·
1201   GAACGCGGGC  CGAGCTGGAC  ACGGTGTGCA  GACACAACTA  CGAGGGGCCG  GAGACCCACA
       CTTGCGCCCG  GCTCGACCTG  TGCCACACGT  CTGTGTTGAT  GCTCCCCGGC  CTCTGGGTGT

·  S   L   R   R   L   E   Q   P   N   V   V   I   S   L   S   R   T   E   A   L ·
1261   CCTCCCTGCG  GCGGCTTGAA  CAGCCCAATG  TCGTCATCTC  CCTGTCCAGG  ACAGAGGCCC
       GGAGGGACGC  CGCCGAACTT  GTCGGGTTAC  AGCAGTAGAG  GGACAGGTCC  TGTCTCCGGG

·  N   H   H   N   T   L   V   C   S   V   T   D   F   Y   P   A   K   I   K   V ·
1321   TCAACCACCA  CAACACTCTG  GTCTGCTCAG  TGACAGATTT  CTACCCAGCC  AAGATCAAAG
       AGTTGGTGGT  GTTGTGAGAC  CAGACGAGTC  ACTGTCTAAA  GATGGGTCGG  TTCTAGTTTC

·  R   W   F   R   N   G   Q   E   E   T   V   G   V   S   S   T   Q   L   I   R ·
1381   TGCGCTGGTT  CCGGAATGGC  CAGGAGGAGA  CGGTGGGGGT  CTCATCCACA  CAGCTTATTA
       ACGCGACCAA  GGCCTTACCG  GTCCTCCTCT  GCCACCCCCA  GAGTAGGTGT  GTCGAATAAT
```

FIG. 12

```
                · N   G   D   W   T   F   Q   V   L   V   M   L   E   M   T   P   R   R   G   E ·
1441   GGAATGGGGA CTGGACCTTC CAGGTCCTGG TCATGCTGGA GATGACCCCT CGGCGGGGAG
       CCTTACCCCT GACCTGGAAG GTCCAGGACC AGTACGACCT CTACTGGGGA GCCGCCCCTC

· V   Y   T   C   H   V   E   H   P   S   L   K   S   P   I   T   V   E   W   R ·
1501   AGGTCTACAC CTGTCACGTG GAGCATCCCA GCCTGAAGAG CCCCATCACT GTGGAGTGGA
       TCCAGATGTG GACAGTGCAC CTCGTAGGGT CGGACTTCTC GGGGTAGTGA CACCTCACCT

· A   Q   S   E   S   A   W   S   K   G   G   G   G   G   G   R   I   A ·
1561   GGGCACAGTC TGAGTCTGCC TGGAGCAAGG GAGGCGGAGG CGGTGGCGGA GGACGGATCG
       CCCGTGTCAG ACTCAGACGG ACCTCGTTCC CTCCGCCTCC GCCACCGCCT CCTGCCTAGC

R   L   E   E   K   V   K   T   L   K   A   Q   N   S   E   L   A   S   T   A ·
1621   CTCGGCTAGA GGAAAAAGTG AAAACCTTGA AAGCGCAAAA CTCCGAGCTG GCGTCCACGG
       GAGCCGATCT CCTTTTTCAC TTTTGGAACT TTCGCGTTTT GAGGCTCGAC CGCAGGTGCC

XhoI
                                                                              ~~~~
                  N   M   L   R   E   Q   V   A   Q   L   K   Q   K   V   M   N   H   *
1681   CCAACATGCT CAGGGAACAG GTGGCACAGC TTAAGCAGAA AGTCATGAAC CACTGACTCG
       GGTTGTACGA GTCCCTTGTC CACCGTGTCG AATTCGTCTT TCAGTACTTG GTGACTGAGC

XbaI
       ~~~~~~
1741   AGTCTAGA
       TCAGATCT
```

FIG. 12 (Continued)

```
              KpnI
              ~~~~~~
    XbaI      NcoI
    ~~~~      ~~~~~~
              M   A   I   I   Y   L   I   L   L   F   T   A   V   R   G   T  ·
841 TAGATCGGGG TACCATGGCT ATCATCTACC TCATCCTCCT GTTCACCGCT GTGCGGGGCA
    ATCTAGCCCC ATGGTACCGA TAGTAGATGG AGTAGGAGGA CAAGTGGCGA CACGCCCCGT

·  Q   I   Y   S   E   V   L   S   S   T   I   V   R   D   G   G   G   G   S   L  ·
901 CACAGATTTA TTCGGAGGTA CTTTCCAGCA CCATTGTGCG TGACGGAGGT GGAGGCTCAC
    GTGTCTAAAT AAGCCTCCAT GAAAGGTCGT GGTAACACGC ACTGCCTCCA CCTCCGAGTG

·  V   P   R   G   S   G   G   G   G   S   G   D   S   E   R   H   F   V   Y   Q  ·
961 TAGTGCCCCG AGGCTCTGGA GGTGGAGGCT CTGGAGACTC CGAAAGGCAT TTCGTGTACC
    ATCACGGGGC TCCGAGACCT CCACCTCCGA GACCTCTGAG GCTTTCCGTA AAGCACATGG

·  F   M   G   E   C   Y   F   T   N   G   T   Q   R   I   R   Y   V   T   R   Y  ·
1021 AGTTCATGGG CGAGTGCTAC TTCACCAACG GGACGCAGCG CATACGATAT GTGACCAGAT
     TCAAGTACCC GCTCACGATG AAGTGGTTGC CCTGCGTCGC GTATGCTATA CACTGGTCTA

·  I   Y   N   R   E   E   Y   V   R   Y   D   S   D   V   G   E   H   R   A   V  ·
1081 ACATCTACAA CCGGGAGGAG TACGTGCGCT ACGACAGCGA CGTGGGCGAG CACCGCGCGG
     TGTAGATGTT GGCCCTCCTC ATGCACGCGA TGCTGTCGCT GCACCCGCTC GTGGCGCGCC

·  T   E   L   G   R   P   D   A   E   Y   W   N   S   Q   P   E   I   L   E   R  ·
1141 TGACCGAGCT GGGGCGGCCA GACGCCGAGT ACTGGAACAG CCAGCCGGAG ATCCTGGAGC
     ACTGGCTCGA CCCCGCCGGT CTGCGGCTCA TGACCTTGTC GGTCGGCCTC TAGGACCTCG

·  T   R   A   E   L   D   T   V   C   R   H   N   Y   E   G   P   E   T   H   T  ·
1201 GAACGCGGGC CGAGCTGGAC ACGGTGTGCA GACACAACTA CGAGGGGCCG GAGACCCACA
     CTTGCGCCCG GCTCGACCTG TGCCACACGT CTGTGTTGAT GCTCCCCGGC CTCTGGGTGT

·  S   L   R   R   L   E   Q   P   N   V   V   I   S   L   S   R   T   E   A   L  ·
1261 CCTCCCTGCG GCGGCTTGAA CAGCCCAATG TCGTCATCTC CCTGTCCAGG ACAGAGGCCC
     GGAGGGACGC CGCCGAACTT GTCGGGTTAC AGCAGTAGAG GGACAGGTCC TGTCTCCGGG

·  N   H   H   N   T   L   V   C   S   V   T   D   F   Y   P   A   K   I   K   V  ·
1321 TCAACCACCA CAACACTCTG GTCTGCTCAG TGACAGATTT CTACCCAGCC AAGATCAAAG
     AGTTGGTGGT GTTGTGAGAC CAGACGAGTC ACTGTCTAAA GATGGGTCGG TTCTAGTTTC

·  R   W   F   R   N   G   Q   E   E   T   V   G   V   S   S   T   Q   L   I   R  ·
1381 TGCGCTGGTT CCGGAATGGC CAGGAGGAGA CGGTGGGGGT CTCATCCACA CAGCTTATTA
     ACGCGACCAA GGCCTTACCG GTCCTCCTCT GCCACCCCCA GAGTAGGTGT GTCGAATAAT
```

FIG. 14

```
           · N   G   D   W   T   F   Q   V   L   V   M   L   E   M   T   P   R   R   G   E ·
      1441 GGAATGGGGA CTGGACCTTC CAGGTCCTGG TCATGCTGGA GATGACCCCT CGGCGGGGAG
           CCTTACCCCT GACCTGGAAG GTCCAGGACC AGTACGACCT CTACTGGGGA GCCGCCCCTC

· V   Y   T   C   H   V   E   H   P   S   L   K   S   P   I   T   V   E   W   R ·
      1501 AGGTCTACAC CTGTCACGTG GAGCATCCCA GCCTGAAGAG CCCCATCACT GTGGAGTGGA
           TCCAGATGTG GACAGTGCAC CTCGTAGGGT CGGACTTCTC GGGGTAGTGA CACCTCACCT

· A   Q   S   E   S   A   W   S   K   G   G   G   G   G   G   G   R   I   A ·
      1561 GGGCACAGTC TGAGTCTGCC TGGAGCAAGG GAGGCGGAGG CGGTGGCGGA GGACGGATCG
           CCCGTGTCAG ACTCAGACGG ACCTCGTTCC CTCCGCCTCC GCCACCGCCT CCTGCCTAGC

· R   L   E   E   K   V   K   T   L   K   A   Q   N   S   E   L   A   S   T   A ·
      1621 CTCGGCTAGA GGAAAAAGTG AAAACCTTGA AAGCGCAAAA CTCCGAGCTG GCGTCCACGG
           GAGCCGATCT CCTTTTTCAC TTTTGGAACT TTCGCGTTTT GAGGCTCGAC CGCAGGTGCC
                                                                    XhoI
                                                                    ~~~~
           · N   M   L   R   E   Q   V   A   Q   L   K   Q   K   V   M   N   H   *
      1681 CCAACATGCT CAGGGAACAG GTGGCACAGC TTAAGCAGAA AGTCATGAAC CACTGACTCG
           GGTTGTACGA GTCCCTTGTC CACCGTGTCG AATTCGTCTT TCAGTACTTG GTGACTGAGC
```

FIG. 14 (Continued)

```
                    KpnI
                   ~~~~~~
     XbaI         NcoI
     ~~~~        ~~~~~~
              M   A   I   I   Y   L   I   L   L   F   T   A   V   R   G   I  ·
 841 TAGATCGGGG TACCATGGCT ATCATCTACC TCATCCTCCT GTTCACCGCT GTGCGGGGCA
     ATCTAGCCCC ATGGTACCGA TAGTAGATGG AGTAGGAGGA CAAGTGGCGA CACGCCCCGT

·  N   H   P   Q   S   N   E   L   N   A   M   L   Y   E   G   G   G   S   L  ·
 901 TTAACCACCC CCAATCTAAC GAACTCAACG CAATGCTCTA TGAAGGAGGT GGAGGCTCAC
     AATTGGTGGG GGTTAGATTG CTTGAGTTGC GTTACGAGAT ACTTCCTCCA CCTCCGAGTG

·  V   P   R   G   S   G   G   G   S   G   D   S   E   R   H   F   V   Y   Q  ·
 961 TAGTGCCCCG AGGCTCTGGA GGTGGAGGCT CTGGAGACTC CGAAAGGCAT TTCGTGTACC
     ATCACGGGGC TCCGAGACCT CCACCTCCGA GACCTCTGAG GCTTTCCGTA AAGCACATGG

·  F   M   G   E   C   Y   F   T   N   G   T   Q   R   I   R   Y   V   T   R   Y  ·
1021 AGTTCATGGG CGAGTGCTAC TTCACCAACG GGACGCAGCG CATACGATAT GTGACCAGAT
     TCAAGTACCC GCTCACGATG AAGTGGTTGC CCTGCGTCGC GTATGCTATA CACTGGTCTA

·  I   Y   N   R   E   E   Y   V   R   Y   D   S   D   V   G   E   H   R   A   V  ·
1081 ACATCTACAA CCGGGAGGAG TACGTGCGCT ACGACAGCGA CGTGGGCGAG CACCGCGCGG
     TGTAGATGTT GGCCCTCCTC ATGCACGCGA TGCTGTCGCT GCACCCGCTC GTGGCGCGCC

·  T   E   L   G   R   P   D   A   E   Y   W   N   S   Q   P   E   I   L   E   R  ·
1141 TGACCGAGCT GGGGCGGCCA GACGCCGAGT ACTGGAACAG CCAGCCGGAG ATCCTGGAGC
     ACTGGCTCGA CCCCGCCGGT CTGCGGCTCA TGACCTTGTC GGTCGGCCTC TAGGACCTCG

·  T   R   A   E   L   D   T   V   C   R   H   N   Y   E   G   P   E   T   H   T  ·
1201 GAACGCGGGC CGAGCTGGAC ACGGTGTGCA GACACAACTA CGAGGGGCCG GAGACCCACA
     CTTGCGCCCG GCTCGACCTG TGCCACACGT CTGTGTTGAT GCTCCCCGGC CTCTGGGTGT

·  S   L   R   R   L   E   Q   P   N   V   V   I   S   L   S   R   T   E   A   L  ·
1261 CCTCCCTGCG GCGGCTTGAA CAGCCCAATG TCGTCATCTC CCTGTCCAGG ACAGAGGCCC
     GGAGGGACGC CGCCGAACTT GTCGGGTTAC AGCAGTAGAG GGACAGGTCC TGTCTCCGGG

·  N   H   H   N   T   L   V   C   S   V   T   D   F   Y   P   A   K   I   K   V  ·
1321 TCAACCACCA CAACACTCTG GTCTGCTCAG TGACAGATTT CTACCCAGCC AAGATCAAAG
     AGTTGGTGGT GTTGTGAGAC CAGACGAGTC ACTGTCTAAA GATGGGTCGG TTCTAGTTTC

·  R   W   F   R   N   G   Q   E   E   T   V   G   V   S   S   T   Q   L   I   R  ·
1381 TGCGCTGGTT CCGGAATGGC CAGGAGGAGA CGGTGGGGGT CTCATCCACA CAGCTTATTA
     ACGCGACCAA GGCCTTACCG GTCCTCCTCT GCCACCCCCA GAGTAGGTGT GTCGAATAAT

·  N   G   D   W   T   F   Q   V   L   V   M   L   E   M   T   P   R   R   G   E  ·
1441 GGAATGGGGA CTGGACCTTC CAGGTCCTGG TCATGCTGGA GATGACCCCT CGGCGGGGAG
     CCTTACCCCT GACCTGGAAG GTCCAGGACC AGTACGACCT CTACTGGGGA GCCGCCCCTC
```

FIG. 16

```
         · V   Y   T     C   H   V     E   H   P     L   K   S     P   I   T     V   E   W   R ·
    1501 AGGTCTACAC CTGTCACGTG GAGCATCCCA GCCTGAAGAG CCCCATCACT GTGGAGTGGA
         TCCAGATGTG GACAGTGCAC CTCGTAGGGT CGGACTTCTC GGGGTAGTGA CACCTCACCT

· A   Q   S     E   S   A     W   S   K     G   G   G     G   G   G     R   I   A ·
    1561 GGGCACAGTC TGAGTCTGCC TGGAGCAAGG GAGGCGGAGG CGGTGGCGGA GGACGGATCG
         CCCGTGTCAG ACTCAGACGG ACCTCGTTCC CTCCGCCTCC GCCACCGCCT CCTGCCTAGC

· R   L   E     E   K   V     K   T   L     K   A   Q     N   S   E     L   A   S   T   A ·
    1621 CTCGGCTAGA GGAAAAAGTG AAAACCTTGA AAGCGCAAAA CTCCGAGCTG GCGTCCACGG
         GAGCCGATCT CCTTTTTCAC TTTTGGAACT TTCGCGTTTT GAGGCTCGAC CGCAGGTGCC
                                                                       XhoI
                                                                       ~~~~
         · N   M   L     R   E   Q     V   A   Q     L   K   Q   K     V   M   N   H   * 
    1681 CCAACATGCT CAGGGAACAG GTGGCACAGC TTAAGCAGAA AGTCATGAAC CACTGACTCG
         GGTTGTACGA GTCCCTTGTC CACCGTGTCG AATTCGTCTT TCAGTACTTG GTGACTGAGC
```

```
                          M   A   I   I   Y   L   I   L   L   F   T   A   V   R   G   I  ·
841 TAGATCGGGG TACCATGGCT ATCATCTACC TCATCCTCCT GTTCACCGCT GTGCGGGGCA
    ATCTAGCCCC ATGGTACCGA TAGTAGATGG AGTAGGAGGA CAAGTGGCGA CACGCCCCGT

·  P   A   T   L   S   L   L   K   D   A   V   K   K   K   G   G   G   G   S   L  ·
901 TACCTGCCAC ACTCTCACTA CTGAAGGATG CTGTCAAGAA GAAAGGAGGT GGAGGCTCAC
    ATGGACGGTG TGAGAGTGAT GACTTCCTAC GACAGTTCTT CTTTCCTCCA CCTCCGAGTG

·  V   P   R   G   S   G   G   G   S   G   D   S   E   R   H   F   V   Y   Q  ·
961 TAGTGCCCCG AGGCTCTGGA GGTGGAGGCT CTGGAGACTC CGAAAGGCAT TTCGTGTACC
    ATCACGGGGC TCCGAGACCT CCACCTCCGA GACCTCTGAG GCTTTCCGTA AAGCACATGG

·  F   M   G   E   C   Y   F   T   N   G   T   Q   R   I   R   Y   V   T   R   Y  ·
1021 AGTTCATGGG CGAGTGCTAC TTCACCAACG GGACGCAGCG CATACGATAT GTGACCAGAT
     TCAAGTACCC GCTCACGATG AAGTGGTTGC CCTGCGTCGC GTATGCTATA CACTGGTCTA

·  I   Y   N   R   E   E   Y   V   R   Y   D   S   D   V   G   E   H   R   A   V  ·
1081 ACATCTACAA CCGGGAGGAG TACGTGCGCT ACGACAGCGA CGTGGGCGAG CACCGCGCGG
     TGTAGATGTT GGCCCTCCTC ATGCACGCGA TGCTGTCGCT GCACCCGCTC GTGGCGCGCC

·  T   E   L   G   R   P   D   A   E   Y   W   N   S   Q   P   E   I   L   E   R  ·
1141 TGACCGAGCT GGGGCGGCCA GACGCCGAGT ACTGGAACAG CCAGCCGGAG ATCCTGGAGC
     ACTGGCTCGA CCCCGCCGGT CTGCGGCTCA TGACCTTGTC GGTCGGCCTC TAGGACCTCG

·  T   R   A   E   L   D   T   V   C   R   H   N   Y   E   G   P   E   T   H   T  ·
1201 GAACGCGGGC CGAGCTGGAC ACGGTGTGCA GACACAACTA CGAGGGGCCG GAGACCCACA
     CTTGCGCCCG GCTCGACCTG TGCCACACGT CTGTGTTGAT GCTCCCCGGC CTCTGGGTGT

·  S   L   R   R   L   E   Q   P   N   V   V   I   S   L   S   R   T   E   A   L  ·
1261 CCTCCCTGCG GCGGCTTGAA CAGCCCAATG TCGTCATCTC CCTGTCCAGG ACAGAGGCCC
     GGAGGGACGC CGCCGAACTT GTCGGGTTAC AGCAGTAGAG GGACAGGTCC TGTCTCCGGG

·  N   H   H   N   T   L   V   C   S   V   T   D   F   Y   P   A   K   I   K   V  ·
1321 TCAACCACCA CAACACTCTG GTCTGCTCAG TGACAGATTT CTACCCAGCC AAGATCAAAG
     AGTTGGTGGT GTTGTGAGAC CAGACGAGTC ACTGTCTAAA GATGGGTCGG TTCTAGTTTC

·  R   W   F   R   N   G   Q   E   E   T   V   G   V   S   S   T   Q   L   I   R  ·
1381 TGCGCTGGTT CCGGAATGGC CAGGAGGAGA CGGTGGGGGT CTCATCCACA CAGCTTATTA
     ACGCGACCAA GGCCTTACCG GTCCTCCTCT GCCACCCCCA GAGTAGGTGT GTCGAATAAT

·  N   G   D   W   T   F   Q   V   L   V   M   L   E   M   T   P   R   R   G   E  ·
1441 GGAATGGGGA CTGGACCTTC CAGGTCCTGG TCATGCTGGA GATGACCCCT CGGCGGGGAG
     CCTTACCCCT GACCTGGAAG GTCCAGGACC AGTACGACCT CTACTGGGGA GCCGCCCCTC

·  V   Y   T   C   H   V   E   H   P   S   L   K   S   P   I   T   V   E   W   R  ·
1501 AGGTCTACAC CTGTCACGTG GAGCATCCCA GCCTGAAGAG CCCCATCACT GTGGAGTGGA
     TCCAGATGTG GACAGTGCAC CTCGTAGGGT CGGACTTCTC GGGGTAGTGA CACCTCACCT
```

FIG. 18

```
      ·  A   Q   S   E   S   A   W   S   K   G   G   G   G   G   G   G   R   I   A  ·
1561  GGGCACAGTC TGAGTCTGCC TGGAGCAAGG GAGGCGGAGG CGGTGGCGGA GGACGGATCG
      CCCGTGTCAG ACTCAGACGG ACCTCGTTCC CTCCGCCTCC GCCACCGCCT CCTGCCTAGC

·  R   L   E   E   K   V   K   T   L   K   A   Q   N   S   E   L   A   S   T   A  ·
1621  CTCGGCTAGA GGAAAAAGTG AAAACCTTGA AAGCGCAAAA CTCCGAGCTG GCGTCCACGG
      GAGCCGATCT CCTTTTTCAC TTTTGGAACT TTCGCGTTTT GAGGCTCGAC CGCAGGTGCC
                                                                  XhoI
                                                                  ~~~~
      ·  N   M   L   R   E   Q   V   A   Q   L   K   Q   K   V   M   N   H   *
1681  CCAACATGCT CAGGGAACAG GTGGCACAGC TTAAGCAGAA AGTCATGAAC CACTGACTCG
      GGTTGTACGA GTCCCTTGTC CACCGTGTCG AATTCGTCTT TCAGTACTTG GTGACTGAGC
```

FIG. 18 (Continued)

METHODS AND COMPOSITIONS FOR TREATING INFLAMMATION

CROSS-REFERENCE TO RELATED APPLICATION

This application is a continuation of U.S. application Ser. No. 13/842,302, filed Mar. 15, 2013, which claims priority under 35 U.S.C. § 119(e) to U.S. Provisional Application Ser. No. 61/615,743, filed Mar. 26, 2012, the contents of which are incorporated herein by reference in their entireties.

FIELD OF DISCLOSURE

This disclosure is directed to compositions and methods related to immunotherapy and medicine. In particular, this disclosure is related to therapeutics for the treatment of inflammation.e.g., inflammation of the gastrointestinal tract.

BACKGROUND

Inflammatory bowel disease (IBD) is the name of a group of disorders that cause the intestines to become inflamed (red and swollen). More than 600,000 Americans have some kind of inflammatory bowel disease every year. This group of diseases is often chronic in nature and associated with symptoms such as abdominal pain, vomiting, diarrhea, rectal bleeding, severe internal cramps/muscle spasms in the region of the pelvis, and weight loss. The symptoms associated with IBD can limit the quality of life and affect those afflicted on a daily basis.

Treatment modalities of IBD mainly include immunosuppressives that lower the overall immunity of the patient. Such treatment is risky and often puts the patient at risk for infection and disease due to compromised immunity.

There is a need in the art for target therapies that treat the disease but do not compromise the overall immunity of the patient. This disclosure satisfies this need and provides related advantages as well.

SUMMARY

In response to a need in the art, described herein are therapeutic methods and compositions that activate and amplify pre-existing endogenous mechanisms directed to suppressing chronic inflammation responses. In one aspect, compositions and methods are provided for treating inflammation of the gastrointestinal tract.

One aspect relates to a method for inducing an anti-inflammatory response in a cell or tissue by administering an effective amount of an antigen-MHC-nanoparticle complex; wherein the antigen is an antigen derived from a microbe that resides within or infects the gastrointestinal tract or is a GI-associated antigen. Also provided is an antigen-MHC-nanoparticle complex for use in inducing an anti-inflammatory response in a cell or tissue, wherein the antigen is an antigen derived from a microbe that resides within or infects the gastrointestinal tract or is a GI-associated antigen. Also provided is the use of an antigen-MHC-nanoparticle complex in the manufacture of a medicament useful for inducing an anti-inflammatory response in a cell or tissue, wherein the antigen is an antigen derived from a microbe that resides within or infects the gastrointestinal tract or is a GI-associated antigen.

In another aspect, a method is provided for treating inflammation in a patient in need thereof by administering an effective amount of an antigen-MHC-nanoparticle complex; wherein the antigen is an antigen derived from a microbe that resides within or infects the gastrointestinal tract or is a GI-associated antigen. Also provided is an antigen-MHC-nanoparticle complex for use in treating inflammation in a patient in need thereof, wherein the antigen is an antigen derived from a microbe that resides within or infects the gastrointestinal tract or is a GI-associated antigen. Also provided is the use of an antigen-MHC-nanoparticle complex in the manufacture of a medicament for treating inflammation in the gastrointestinal tract in a patient in need thereof, wherein the antigen is an antigen derived from a microbe that resides within or infects the gastrointestinal tract or is a GI-associated antigen.

In yet a further aspect, a method for accumulating anti-inflammatory T cells in a patient in need thereof is provided by administering an effective amount of an antigen-MHC-nanoparticle complex; wherein the antigen is an antigen derived from a microbe that resides within or infect the gastrointestinal tract or is a GI-associated antigen. Also provided is an antigen-MHC-nanoparticle complex for use in accumulating anti-inflammatory T cells in a patient in need thereof, wherein the antigen is an antigen derived from a microbe that resides within or infects the gastrointestinal tract or is a GI-associated antigen. Also provided is the use of an antigen-MHC-nanoparticle complex in the manufacture of a medicament useful for accumulating anti-inflammatory T cells in a patient in need thereof, wherein the antigen is an antigen derived from a microbe that resides within or infects the gastrointestinal tract or is a GI-associated antigen.

Other aspects relate to a complex comprising, consisting essentially or yet further consisting of, a nanoparticle, a MHC protein, and an antigen derived from a microbe that resides within or infects of the gastrointestinal tract or is a GI-associated antigen. Also provided are compositions comprising, consisting essentially of, or yet further consisting of, the antigen-MHC-nanoparticle as described herein and a carrier.

Also provided is a kit comprising, or alternatively consisting essentially of, or yet further consisting of, a composition as described herein and instructions to use the compositions for their intended purpose.

DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1A-1C demonstrate that BacIYL binds to $H\text{-}2K^d$ with high affinity and the resulting pMHC complex binds to $IGRP_{206\text{-}214}$-specific T-cells. A, Peptide-induced stabilization of $K^d$ molecules on RMA-SK$^d$ cells. TUM is a positive control and Gp33 is a negative (Db-binding) control. B and C, BacIYL/$K^d$ tetramers bind specifically to 8.3-CD8+ T-cells, albeit with lower avidity than NRP-V7/$K^d$ tetramers.

FIG. 4A-4H shows that a BacIYL$_{36-44}$-reactive CD8+ T-cell response affords protection from DSS-induced colitis. A and B show weight curves (A) and disease activity scores (B) of 8.3-NOD, 17.6-NOD upon DSS treatment vs. untreated mice. FIGS. C and D show weight curves (C) and disease activity scores (D) of 8.3-NOD vs. Itβ$^{-/-}$8.3-NOD mice upon DSS treatment. FIGS. E and F show the survival curves for the mice studied in A-D. FIG. G demonstrates that IGRP$_{206-214}$$^{-/-}$ NOD, but not NOD mice are resistant to weight loss in response to colitis induced by 4% DSS. FIG. H shows that adoptive transfer of BacIYL$_{36-44}$-crossreactive CD8+ CTL to IGRP$_{206-214}$$^{-/-}$ NOD mice resulted in a significant reduction of disease activity scores as compared to their non-CTL-transfused counterparts.

FIG. 5A shows weight curves, and FIG. 5B shows disease activity scores 17.6-NOD mice in response to DSS treatment plus 8.3-CTL transfer, to DSS treatment alone, and to no treatment at all. Note how adoptive transfer of BacIYL$_{36-44}$-crossreactive CD8+ CTL to 17.6-NOD mice significantly reduced disease activity scores and weight loss in response to DSS treatment, as compared to their non-CTL-transfused counterparts.

FIG. 8 shows the protein and DNA sequences of BacInt$_{40\_54}$-I-Abeta (b)-C-Jun construct. The sequences of individual components in the fusion protein are HA leader (underline) followed by BacInt$_{40-54}$ peptide sequence (double underline), I-Abeta_(b) (dotted underline) and C-Jun sequences. GS linkers are not highlighted.

FIG. 10 shows the protein and DNA sequences of I-Aalpha (b)-C-Fos construct. The sequences of individual components in the fusion protein are HA leader (underline) followed by I-Aalpha (b) (double underline), C-Fos (dotted underline), FA (shaded) and 6 X His sequences. GS linkers are not highlighted.

FIG. 12 shows the protein and DNA sequences of BacInt$_{81-95}$-I-Abeta (b)-C-Jun construct. The sequences of individual components in the fusion protein are HA leader (underline) followed by BacInt$_{81-95}$ peptide sequence (double underline), I-Abeta_(b) (dotted underline) and C-Jun (shaded) sequences. GS linkers are not highlighted.

FIG. 14 shows the protein and DNA sequences of BacInt$_{365\_379}$-I-Abeta (b)-C-Jun construct. The sequences of individual components in the fusion protein are HA leader (underline) followed by BacInt$_{365\_379}$ peptide sequence (double underline), I-Abeta_(b) (dotted underline) and C-Jun (shaded) sequences. GS linkers are not highlighted.

FIG. 16 shows the protein and DNA sequences of BacInt$_{57-71}$-I-Abeta (b)-C-Jun construct. The sequences of individual components in the fusion protein are highlighted: HA leader (underline) followed by BacInt$_{57-71}$ peptide sequence (double underline), I-Abeta_(b) (dotted underline) and C-Jun (shaded) sequences. GS linkers are not highlighted.

Figure 17:
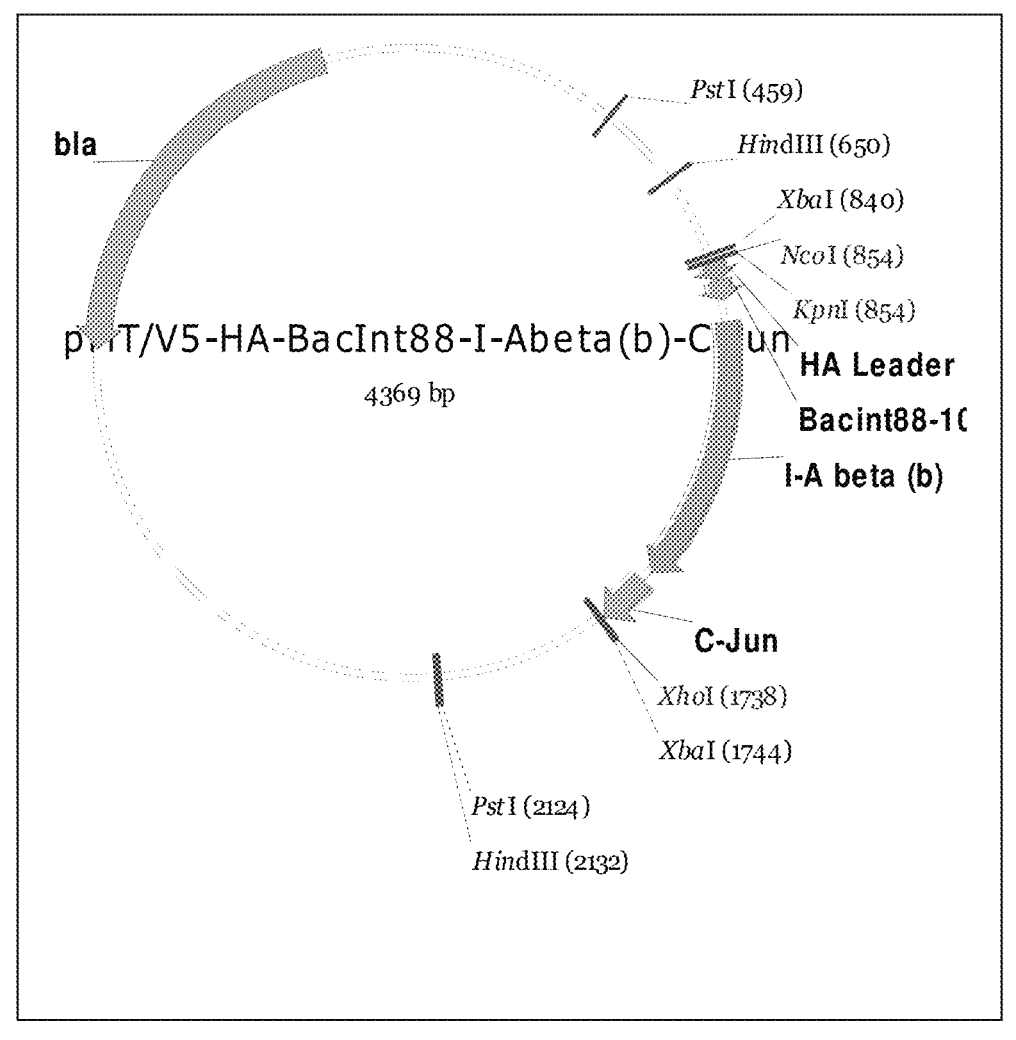

FIG. 17 depicts a map of BacInt$_{88-102}$-I-Ab-C-Jun in pMT/V5. DNA construct between Nco I (854) to Xho I (1738) sites encodes HA-BacInt$_{88-102}$-I-Abeta (b)-C-Jun fusion protein (293 a.a). The fusion protein includes 15 a.a HA leader sequence followed by BacInt$_{88-102}$ (IPA) peptide (15 a.a.). DNA sequence encoding peptide was linked to I-Abeta (b) (199 a.a.) through a 16 a.a GS linker. C-terminal of I-Abeta (b) was linked to C-Jun sequence (40 a.a,) thorough a 8 a.a GS linker.

FIG. 18 shows the protein and DNA sequences of BacInt$_{88-102}$-I-Abeta (b)-C-Jun construct. The sequences of individual components in the fusion protein are highlighted:

HA leader (underline) followed by BacInt$_{88-102}$ peptide sequence (double underline), I-Abeta_(b) (dotted underline) and i (shaded) sequences. GS linkers are not highlighted.

Figure 19:
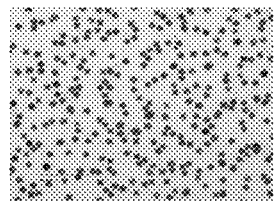

FIG. 19 shows representative TEM image of pMHC-coated gold NPs (~14 nm) concentrated at high densities (~5×10$^{13}$/ml) and monodispersed. Mag: 50,000X.

Figure 20:
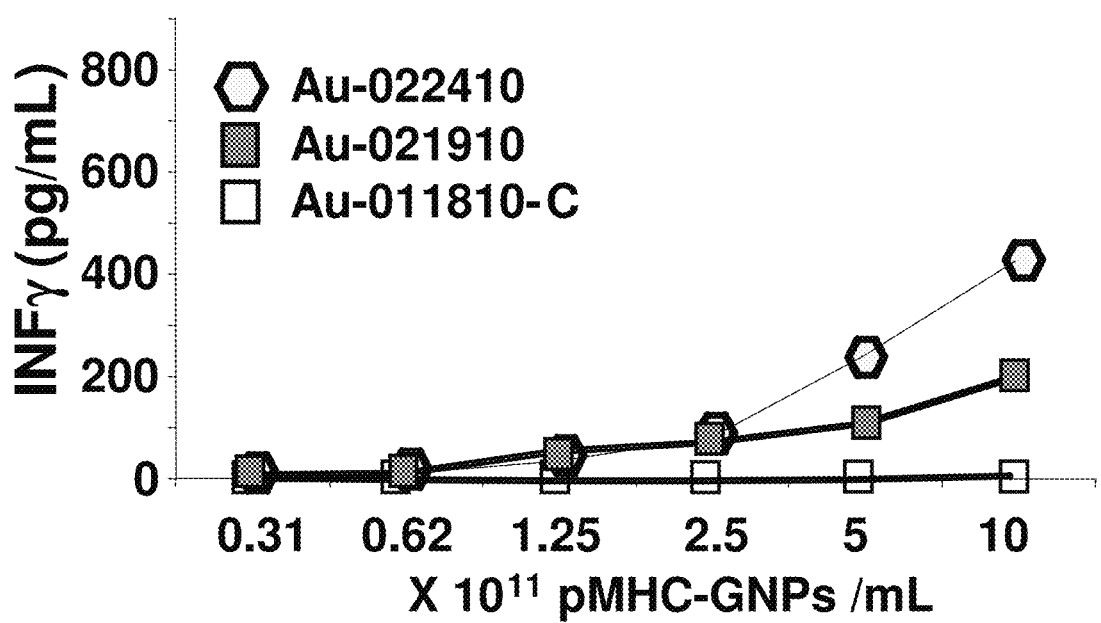

FIG. 20 shows the effects of pMHC (GNP) dose and pMHC valency on the agonistic properties of pMHC-coated GNPs. The Figure compares the amounts of IFNγ secreted by cognate 8.3-CD8+ T-cells in response to two different pMHC-GNP samples (both consisting of ~2×10$^{13}$ GNPs of 14 nm in diameter/ml). Au-022410 and Au-21910 carried ~250 and ~120 pMHCs/GNP, respectively. Au-011810-C carried ~120 control pMHCs/GNP.

Figure 21:
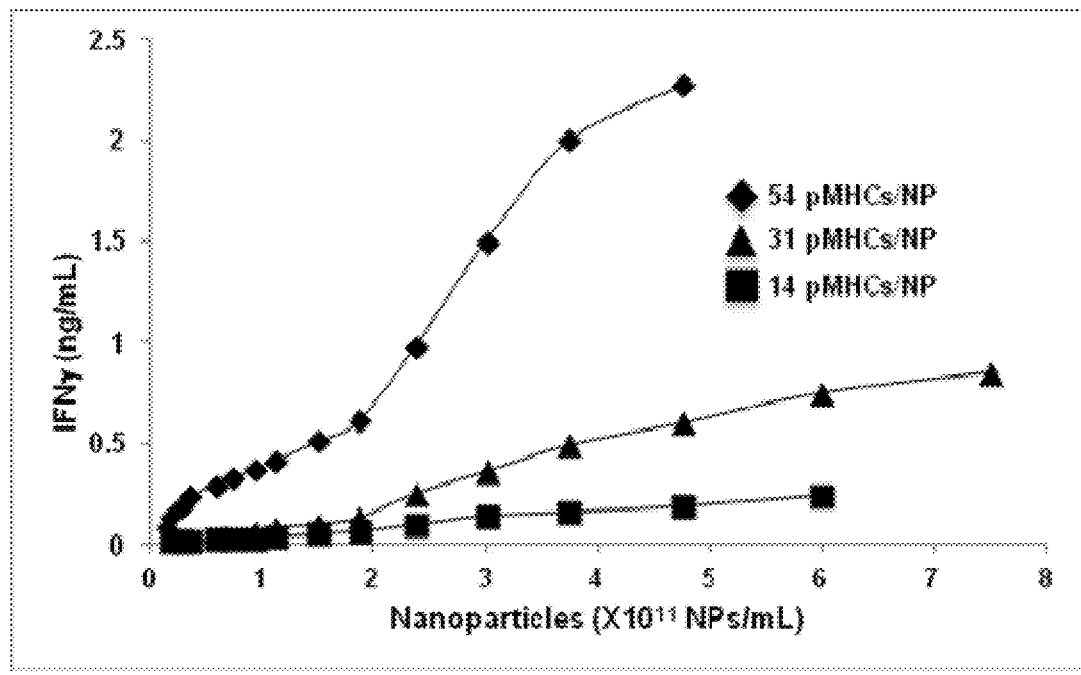

FIG. 21 demonstrates the pMHC-NP-induced secretion of IFNγ by 8.3-CD8+ T cells as a function of pMHC valency. 8.3-CD8+ T-cells (2.5×10$^5$ cells/ml) were cultured with increasing numbers of NPs coated with three different IGRP$_{206-214}$/K$^d$ valencies.

Figure 22:
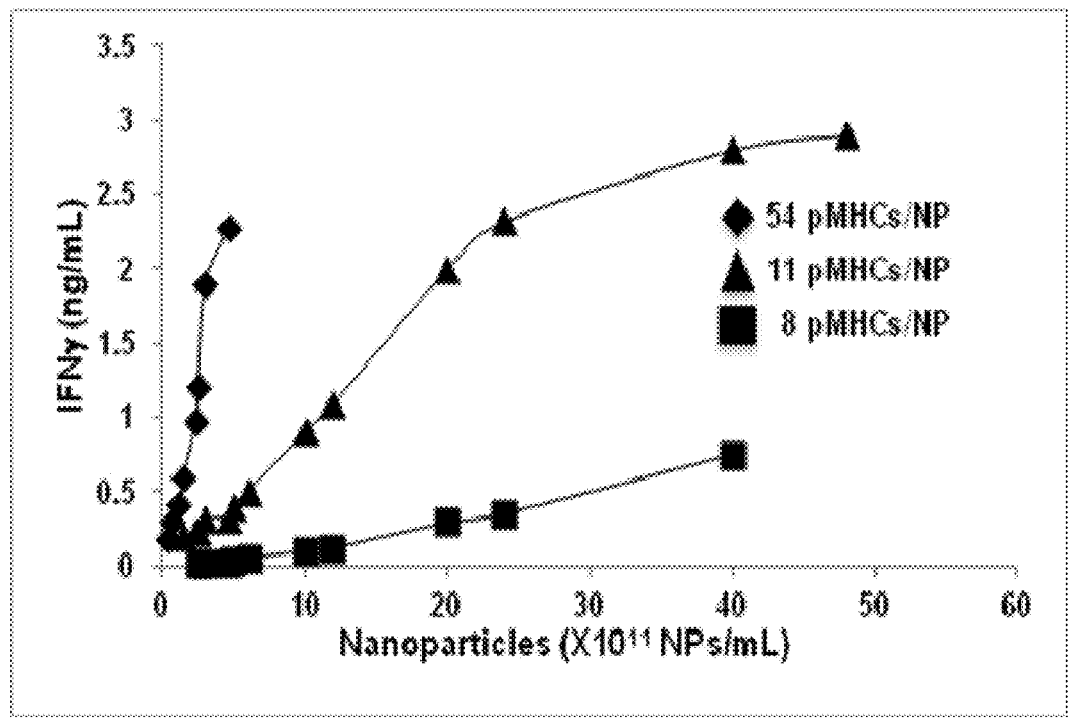

FIG. 22 shows that the lower agonistic activity of pMHC-NPs can be compensated by increasing the pMHC-NP density but only above a threshold of pMHC valency. Graph compares the agonistic activity of three different pMHC-NP preparations (carrying three different valencies of pMHC) over a range of NP densities. Note that NPs carrying 8 pMHCs, unlike those carrying 11 pMHCs, cannot adequately trigger IFNγ secretion even at high pMHC-NP densities, as compared to NPs carrying 54 pMHCs.

Figure 23:
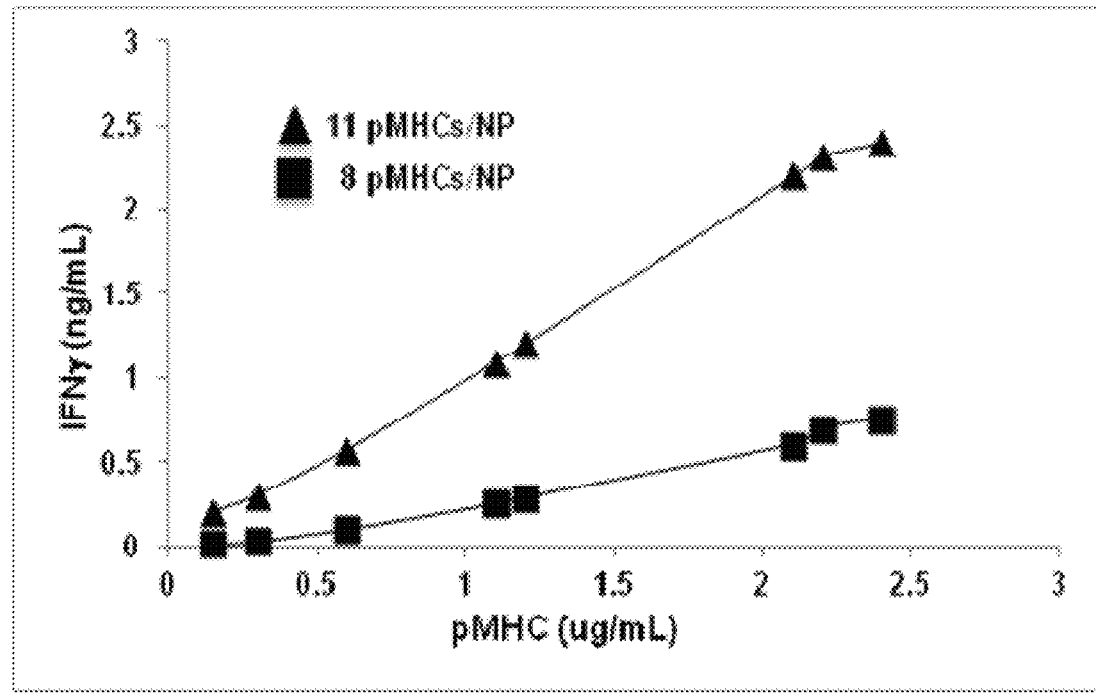

FIG. 23 shows the effects of pMHC valency threshold on the agonistic properties of pMHC-NPs as a function of total pMHC input.

Figure 24:
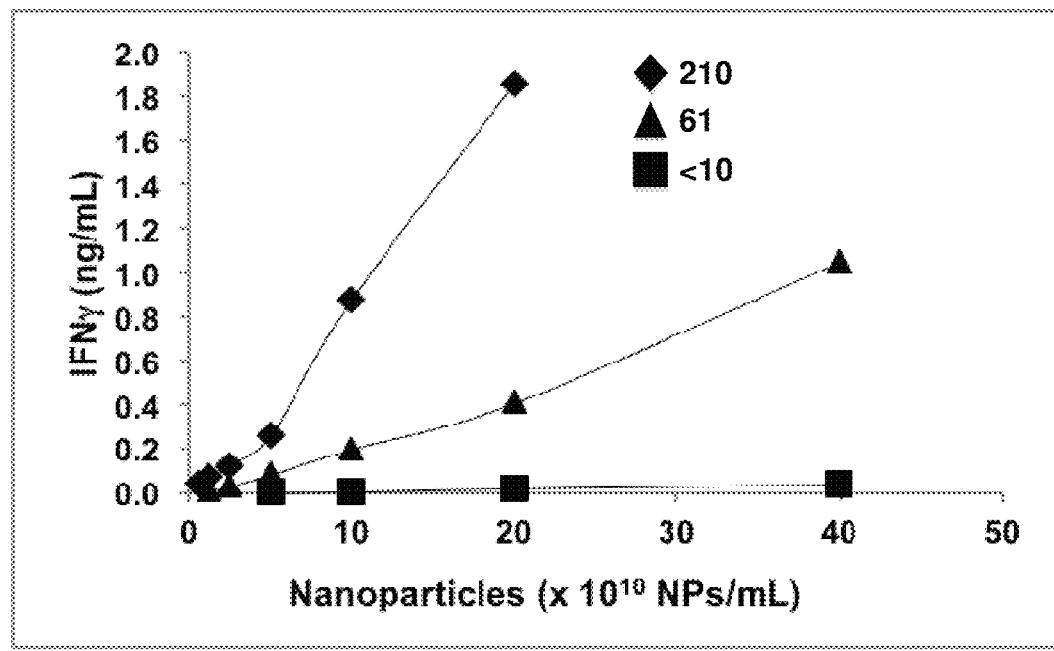

FIG. 24 shows the effects of pMHC valency on the agonistic activity of pMHC-NPs produced with larger iron oxide NP cores.

Figure 25:
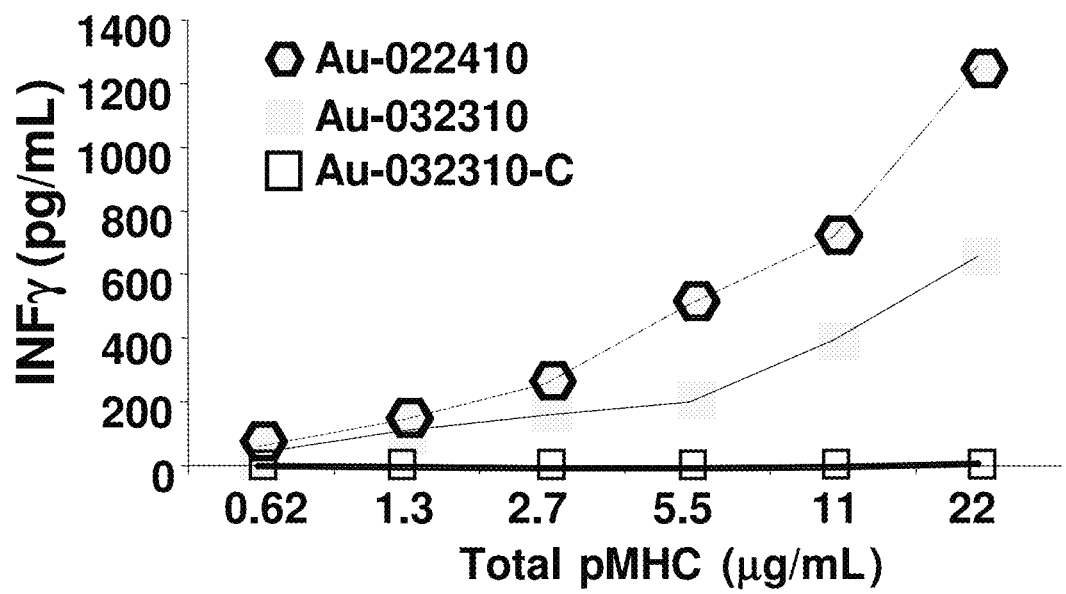

FIG. 25 shows the effect of size on agonistic activity. Au-0224-15 were 14 nm GNPs coated with a relatively low pMHC valency but prepared at a high density; Au-0323-40 were 40 nm GNPs coated with high pMHC valency but at low density. Au-0224-15 had superior agonistic activity than the Au-0323-40 sample.

Figure 26:
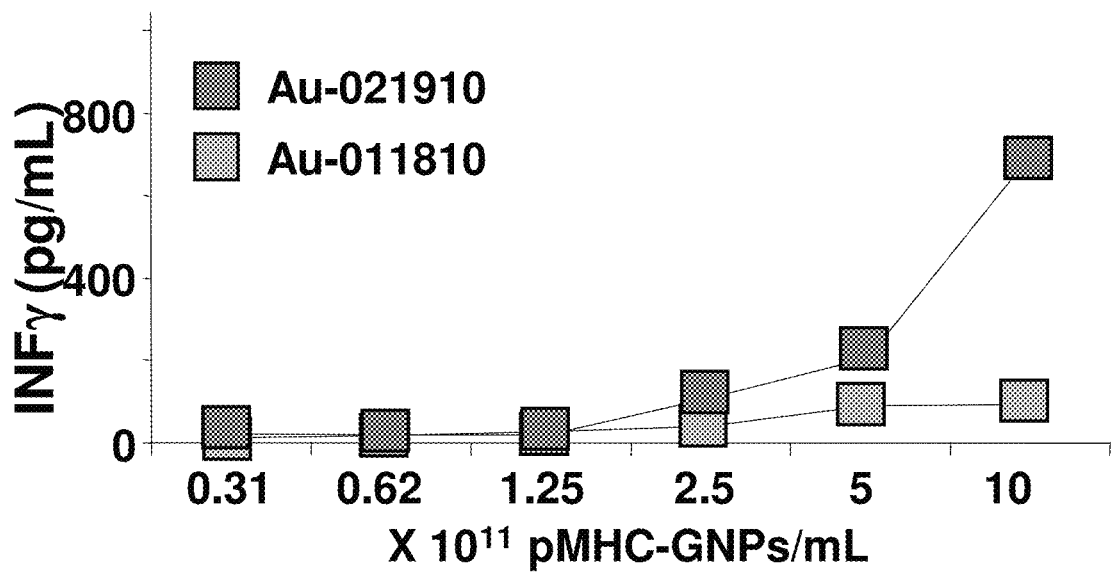

FIG. 26 shows the effect of protective PEGs on the function of pMHC-GNPs. Au-021910 consisted of ~2×10$^{13}$ GNPs of 14 nm in diameter/ml protected by 2 kD thiol-PEGs and coated with ~120 pMHCs/GNP. Au-012810 GNPs (also ~2×10$^{13}$ 14 nm GNPs/ml) were protected by 5 kD thiol-PEGs and were coated with ~175 pMHCs/GNP. Sample Au-021910 had superior agonistic activity.

Figure 27:
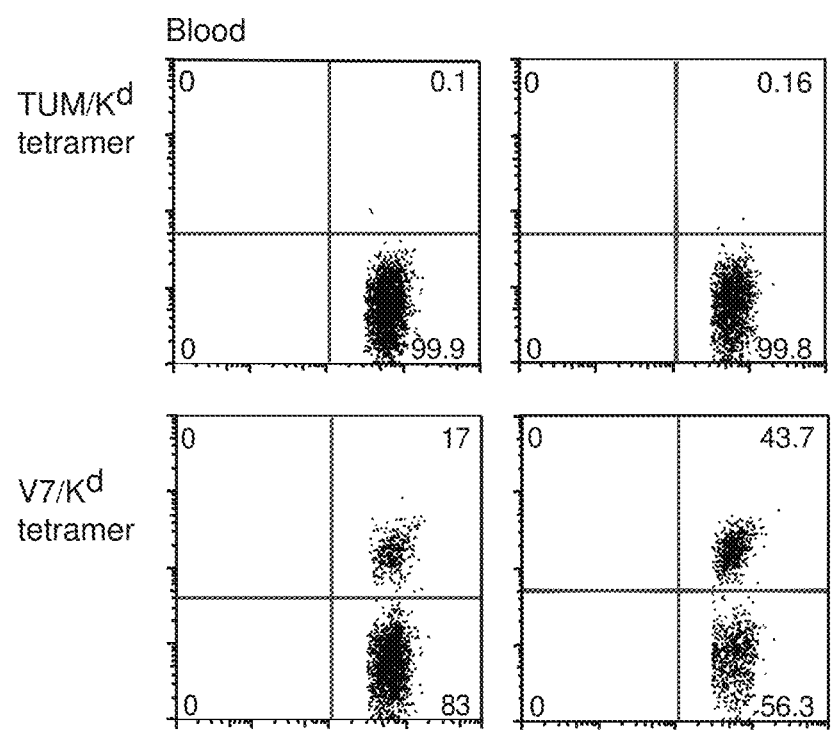

FIG. 27 shows the Efficient expansion of NRP-V7-reactive CD8+ T-cells by NRP-V7/Kd-coated gold NPs. 3×10$^{12}$ NPs (~10 nm in size) carrying 25 µg of pMHC (150 pMHC/NP) were used. Pre-diabetic 10 wk-old NOD mice were treated with two weekly injections of NRP-V7/kd-coated gold NPs for 5 weeks. TUM/Kd tetramer is a negative control. Each column of panels corresponds to a different mouse.

Figure 28:
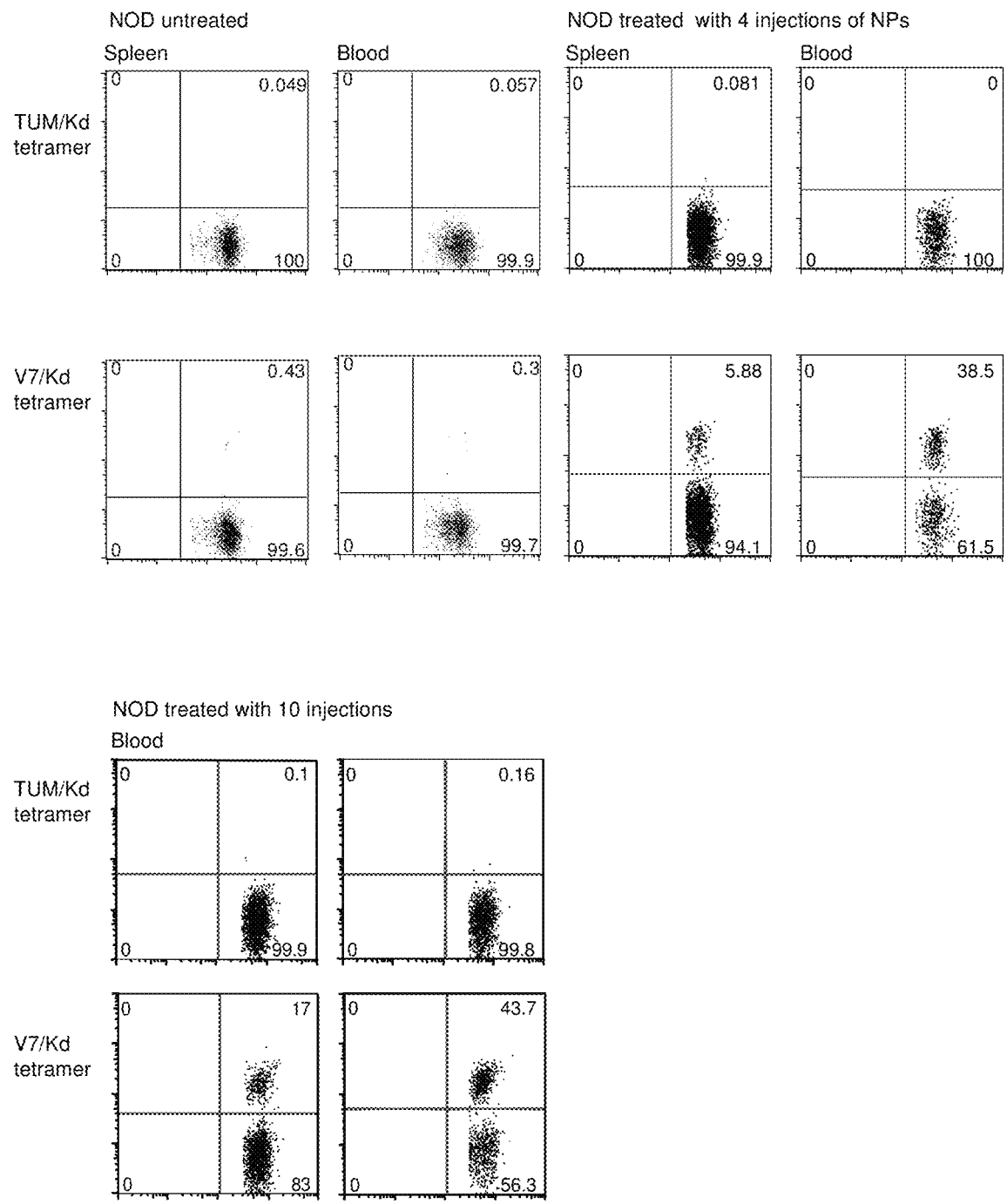

FIG. 28 depicts the large expansion of cognate CD8+ T-cells in mice treated with pMHC-coated NPs. 3×10$^{12}$ IGRP$_{206-214}$/K$^d$-NPs (~10 nm in size) carrying 25 µg of pMHC (150 pMHC/NP) were used. Upper panel: profile of a mouse sacrificed after 4 doses. Bottom panel: profile of two different mice after 10 injections (blood only; alive at the time of this submission).

DETAILED DESCRIPTION

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

It must be noted that as used herein and in the appended claims, the singular forms "a", "an", and "the" include plural referents unless the context clearly dictates otherwise. Thus, for example, reference to "an excipient" includes a plurality of excipients.

I. DEFINITIONS

Unless defined otherwise, all technical and scientific terms used herein have the same meaning as commonly understood by one of ordinary skill in the art to which this invention belongs. As used herein the following terms have the following meanings.

As used herein, the term "comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed invention such as the ability to treat inflammatory bowel disease in a subject in need of such treatment and/or inducing an anti-inflammatory response. "Consisting of" shall mean excluding more than trace elements of other ingredients and substantial method steps. Embodiments defined by each of these transition terms are within the scope of this invention.

By "biocompatible", it is meant that the components of the delivery system will not cause tissue injury or injury to the human biological system. To impart biocompatibility, polymers and excipients that have had history of safe use in humans or with GRAS (Generally Accepted As Safe) status, will be used preferentially. By biocompatibility, it is meant that the ingredients and excipients used in the composition will ultimately be "bioabsorbed" or cleared by the body with no adverse effects to the body. For a composition to be biocompatible, and be regarded as non-toxic, it must not cause toxicity to cells. Similarly, the term "bioabsorbable" refers to nanoparticles made from materials which undergo bioabsorption in vivo over a period of time such that long term accumulation of the material in the patient is avoided. In a preferred embodiment, the biocompatible nanoparticle is bioabsorbed over a period of less than 2 years, preferably less than 1 year and even more preferably less than 6 months. The rate of bioabsorption is related to the size of the particle, the material used, and other factors well recognized by the skilled artisan. A mixture of bioabsorbable, biocompatible materials can be used to form the nanoparticles used in this invention. In one embodiment, iron oxide and a biocompatible, bioabsorbable polymer can be combined. For example, iron oxide and PGLA can be combined to form a nanoparticle An antigen-MHC-nanosphere complex refers to presentation of a peptide, carbohydrate, lipid, or other antigenic segment, fragment, or epitope of an antigenic molecule or protein (i.e., self peptide or autoantigen) on a surface, such as a biocompatible biodegradable nanosphere. "Antigen" as used herein refers to all, part, fragment, or segment of a molecule that can induce an immune response in a subject or an expansion of anti-pathogenic cells.

The term "about" when used before a numerical designation, e.g., temperature, time, amount, and concentration, including range, indicates approximations which may vary by (+) or (−) 10%, 5%, or 1%.

A "mimic" is an analog of a given ligand or peptide, wherein the analog is substantially similar to the ligand. "Substantially similar" means that the analog has a binding profile similar to the ligand except the mimic has one or more functional groups or modifications that collectively accounts for less than about 50%, less than about 40%, less than about 30%, less than about 20%, less than about 10%, or less than about 5% of the molecular weight of the ligand.

The term "immune cell" refers to a cell of the immune system. Cells of the immune system include, for example, adult splenocytes, T lymphocytes, B lymphocytes, and cells of bone marrow origin, such as antigen presenting cells of a mammal, that have activity towards the organism from which the immune cell is derived. Also included are cells of the innate immune system such as, for example, natural killer cells, mast cells, eosinophils, basophils, and phagocytic cells such as macrophages, neutorphils, and dendritic cells.

The term "anti-inflammatory T cell" refers to a T cell that promotes an anti-inflammatory response. The anti-inflammatory function of the T cell may be accomplished through production and/or secretion of anti-inflammatory proteins, cytokines, chemokines, and the like. Anti-inflammatory proteins are also intended to encompass anti-proliferative signals that suppress immune responses. Anti-inflammatory proteins include IL-4, IL-10, IL-13, IFN-α, TGF-β, IL-Ira, G-CSF, and soluble receptors for TNF and IL-6. Also included are anti-inflammatory cells that have an inflammatory phenotype but kill antigen-presenting cells orchestrating a particular autoimmune response. In certain embodiments, these cells make IFNγ and TNFα, among other cytokines. In certain embodiments, the anti-inflammatory T cell is one that recognizes the gut bacterial epitope with low avidity. In further embodiments, the anti-inflammatory T cell is a cytotoxic T cell.

The term "IL-10" or "Interleukin-10" refers to a cytokine encoded by the IL-10 gene. The IL-10 sequence is represented by the GenBank Accession No.: NM_000572.2 (mRNA) and NP_000563.1 (protein).

The term "TGF-0" or "Transforming growth factor beta" refers to a protein that can have an anti-inflammatory effect. TGF-P is a secreted protein that exists in at least three isoforms called TGF-β1, TGF-β2 and TGF-β3. It was also the original name for TGF-β1, which was the founding member of this family. The TGF-P family is part of a superfamily of proteins known as the transforming growth factor beta superfamily, which includes inhibins, activin, anti-mullerian hormone, bone morphogenetic protein, decapentaplegic and Vg-1.

The term "gastrointestinal tract" refers to both the upper and lower gastrointestinal tract. The upper gastrointestinal tract consists of the esophagus, stomach, and duodenum. The lower gastrointestinal tract includes the small intestine and the large intestine.

The term "microbe" refers to a unicellular microscopic organism. Microorgansims include, for example, bacteria, fungi, archaea, and protists.

A "an effective amount" is an amount sufficient to achieve the intended purpose, non-limiting examples of such include: initiation of the immune response, modulation of the immune response, suppression of an inflammatory response and modulation of T cell activity or T cell populations. In one aspect, the effective amount is one that functions to achieve a stated therapeutic purpose, e.g., a therapeutically effective amount. As described herein in detail, the effective amount, or dosage, depends on the purpose and the composition, component and can be determined according to the present disclosure.

The use of the word "a" or "an" when used in conjunction with the term "comprising" in the claims and/or the specification may mean "one," but it is also consistent with the meaning of "one or more," "at least one," and "one or more than one."

The term "Integrase" refers to a protein expressed in *Bacteroides*. The GenBank Accession No. corresponding to the sequence of Integrase is YP_001300081.1. This sequence is represented by SEQ ID No. 2. SEQ ID No. 3 represents an encoding DNA sequence of Integrase. SEQ ID No. 1 corresponds to an epitope in the integrase protein. This epitope is IYLKTNVYL (SEQ ID No. 1). *Bacteroides* strains that are known to have the IYLKTNVYL (SEQ ID No, 1) epitope include, for example, *Bacteroides* sp. 9_1_42FAA, *Bacteroides* sp. D4, *Bacteroides* sp. 3_1_33FAA, *Bacteroides* dorei 5_1_36/D4, *Bacteroides* dorei DSM 17855, *Bacteroides* vulgatus ATCC 8482, *Bacteroides* sp. 4_3_47FA A, *Bacteroides* vulgatus PC510.

By "nanosphere," "NP," or "nanoparticle" herein is meant a small discrete particle that is administered singularly or pluraly to a subject, cell specimen or tissue specimen as appropriate. In certain embodiments, the nanospheres are substantially spherical in shape. The term "substantially spherical," as used herein, means that the shape of the particles does not deviate from a sphere by more than about 10%. In certain embodiments, the nanoparticle is not a liposome or viral particle. In further embodiments, the nanoparticle is solid. Various known antigen or peptide complexes of the invention may be applied to the particles. The nanospheres of this invention range in size from about 1 nm to about 1 μm and, preferably, from about 10 nm to about 1 μm and in some aspects refers to the average or median diameter of a plurality of nanospheres when a plurality of nanospheres are intended. Smaller nanosize particles can be obtained, for example, by the process of fractionation whereby the larger particles are allowed to settle in an aqueous solution. The upper portion of the solution is then recovered by methods known to those of skill in the art. This upper portion is enriched in smaller size particles. The process can be repeated until a desired average size is generated.

The use of the term "or" in the claims is used to mean "and/or" unless explicitly indicated to refer to alternatives only or the alternatives are mutually exclusive, although the disclosure supports a definition that refers to only alternatives and "and/or."

As used herein the phrase "immune response" or its equivalent "immunological response" refers to the development of a cell-mediated response (mediated by antigen-specific T cells or their secretion products) directed against gastrointestinal tract-microbe-specific antigens or a related epitope of antigens specific to microbes of the gastrointestinal tract. A cellular immune response is elicited by the presentation of polypeptide epitopes in association with Class I or Class II MHC molecules, to activate antigen-specific CD4+ T helper cells and/or CD8+ cytotoxic T cells. The response may also involve activation of other components.

The terms "inflammatory response" and "inflammation" as used herein indicate the complex biological response of vascular tissues of an individual to harmful stimuli, such as pathogens, damaged cells, or irritants, and includes secretion of cytokines and more particularly of pro-inflammatory cytokines, i.e. cytokines which are produced predominantly by activated immune cells and are involved in the amplification of inflammatory reactions. Exemplary pro-inflammatory cytokines include but are not limited to IL-1, IL-6, TNF-α, IL-17, IL21, IL23, and TGF-P. Exemplary inflammations include acute inflammation and chronic inflammation. Acute inflammation indicates a short-term process characterized by the classic signs of inflammation (swelling, redness, pain, heat, and loss of function) due to the infiltration of the tissues by plasma and leukocytes. An acute inflammation typically occurs as long as the injurious stimulus is present and ceases once the stimulus has been removed, broken down, or walled off by scarring (fibrosis). Chronic inflammation indicates a condition characterized by concurrent active inflammation, tissue destruction, and attempts at repair. Chronic inflammation is not characterized by the classic signs of acute inflammation listed above. Instead, chronically inflamed tissue is characterized by the infiltration of mononuclear immune cells (monocytes, macrophages, lymphocytes, and plasma cells), tissue destruction, and attempts at healing, which include angiogenesis and fibrosis. An inflammation can be inhibited in the sense of the present disclosure by affecting and in particular inhibiting anyone of the events that form the complex biological response associated with an inflammation in an individual.

The terms "epitope" and "antigenic determinant" are used interchangeably to refer to a site on an antigen to which B and/or T cells respond or recognize. B-cell epitopes can be formed both from contiguous amino acids or noncontiguous amino acids juxtaposed by tertiary folding of a protein. Epitopes formed from contiguous amino acids are typically retained on exposure to denaturing solvents whereas epitopes formed by tertiary folding are typically lost on treatment with denaturing solvents. An epitope typically includes at least 3, and more usually, at least 5 or 8-10 amino acids in a unique spatial conformation. Methods of determining spatial conformation of epitopes include, for example, x-ray crystallography and 2-dimensional nuclear magnetic resonance. See, e.g., Glenn E. Morris, Epitope Mapping Protocols (1996). T-cells recognize continuous epitopes of about nine amino acids for CD8 cells or about 13-15 amino acids for CD4 cells. T cells that recognize the epitope can be identified by in vitro assays that measure antigen-dependent proliferation, as determined by $^3$H-thymidine incorporation by primed T cells in response to an epitope (Burke et al., J. Inf. Dis., 170:1110-1119, 1994), by antigen-dependent killing (cytotoxic T lymphocyte assay, Tigges et al., J. Immunol., 156(10):3901-3910, 1996) or by cytokine secretion. The presence of a cell-mediated immunological response can be determined by proliferation assays (CD4$^+$ T cells) or CTL (cytotoxic T lymphocyte) assays.

Optionally, an antigen or preferably an epitope of an antigen, can be chemically conjugated to, or expressed as, a fusion protein with other proteins, such as MHC and MHC related proteins.

As used herein, the terms "patient" and "subject" are used synonymously and refer to a mammal. In some embodiments the patient is a human. In other embodiments the patient or subject is a mammal commonly used in a laboratory such as a mouse, rat, simian, canine, feline, bovine, equine, or ovine.

As used in this application, the term "polynucleotide" refers to a nucleic acid molecule that either is recombinant or has been isolated free of total genomic nucleic acid. Included within the term "polynucleotide" are oligonucleotides (nucleic acids 100 residues or less in length), recombinant vectors, including, for example, plasmids, cosmids, phage, viruses, and the like. Polynucleotides include, in certain aspects, regulatory sequences, isolated substantially away from their naturally occurring genes or protein encoding sequences. Polynucleotides may be RNA, DNA, analogs thereof, or a combination thereof. A nucleic acid encoding all or part of a polypeptide may contain a contiguous nucleic acid sequence encoding all or a portion of such a polypeptide of the following lengths: 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 441, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1095, 1100, 1500, 2000, 2500, 3000, 3500, 4000, 4500, 5000, 5500, 6000, 6500, 7000, 7500, 8000, 9000, 10000, or more nucleotides, nucleosides, or base pairs. It also is contemplated that a particular polypeptide from a given species may be encoded by nucleic acids containing natural variations that having slightly different nucleic acid sequences but, nonetheless, encode the same or substantially similar protein, polypeptide, or peptide.

A polynucleotide is composed of a specific sequence of four nucleotide bases: adenine (A); cytosine (C); guanine (G); thymine (T); and uracil (U) for thymine when the polynucleotide is RNA. Thus, the term "polynucleotide sequence" is the alphabetical representation of a polynucleotide molecule. This alphabetical representation can be input into databases in a computer having a central processing unit and used for bioinformatics applications such as functional genomics and homology searching.

The term "isolated" or "recombinant" as used herein with respect to nucleic acids, such as DNA or RNA, refers to molecules separated from other DNAs or RNAs, respectively that are present in the natural source of the macromolecule as well as polypeptides. The term "isolated or recombinant nucleic acid" is meant to include nucleic acid fragments which are not naturally occurring as fragments and would not be found in the natural state. The term "isolated" is also used herein to refer to polynucleotides, polypeptides and proteins that are isolated from other cellular proteins and is meant to encompass both purified and recombinant polypeptides. In other embodiments, the term "isolated or recombinant" means separated from constituents, cellular and otherwise, in which the cell, tissue, polynucleotide, peptide, polypeptide, protein, antibody or fragment(s) thereof, which are normally associated in nature. For example, an isolated cell is a cell that is separated from tissue or cells of dissimilar phenotype or genotype. An isolated polynucleotide is separated from the 3' and 5' contiguous nucleotides with which it is normally associated in its native or natural environment, e.g., on the chromosome. As is apparent to those of skill in the art, a non-naturally occurring polynucleotide, peptide, polypeptide, protein, antibody or fragment(s) thereof, does not require "isolation" to distinguish it from its naturally occurring counterpart.

A polynucleotide or polynucleotide region (or a polypeptide or polypeptide region) having a certain percentage (for example, 80%, 85%, 90%, or 95%) of "sequence identity" to another sequence means that, when aligned, that percentage of bases (or amino acids) are the same in comparing the two sequences. The alignment and the percent homology or sequence identity can be determined using software programs known in the art, for example those described in Current Protocols in Molecular Biology (Ausubel et al., eds. 1987) Supplement 30, section 7.7.18, Table 7.7.1. Preferably, default parameters are used for alignment. A preferred alignment program is BLAST, using default parameters. In particular, preferred programs are BLASTN and BLASTP, using the following default parameters: Genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+SwissProtein+SPupdate+PIR. Details of these programs can be found at the following Internet address: ncbi.nlm.nih.gov/cgi-bin/BLAST.

It is to be inferred without explicit recitation and unless otherwise intended, that when the present invention relates to a polypeptide, protein, polynucleotide or antibody, an equivalent or a biologically equivalent of such is intended within the scope of this invention. As used herein, the term "biological equivalent thereof" is intended to be synonymous with "equivalent thereof" when referring to a reference protein, antibody, fragment, polypeptide or nucleic acid, intends those having minimal homology while still maintaining desired structure or functionality. Unless specifically recited herein, it is contemplated that any polynucleotide, polypeptide or protein mentioned herein also includes equivalents thereof. In one aspect, an equivalent polynucleotide is one that hybridizes under stringent conditions to the polynucleotide or complement of the polynucleotide as described herein for use in the described methods. In another aspect, an equivalent antibody or antigen binding polypeptide intends one that binds with at least 70%, or alternatively at least 75%, or alternatively at least 80%, or alternatively at least 85%, or alternatively at least 90%, or alternatively at least 95% affinity or higher affinity to a reference antibody or antigen binding fragment. In another aspect, the equivalent thereof competes with the binding of the antibody or antigen binding fragment to its antigen under a competitive ELISA assay. In another aspect, an equivalent intends at least about 80% homology or identity and alternatively, at least about 85%, or alternatively at least about 90%, or alternatively at least about 95%, or alternatively 98% percent homology or identity and exhibits substantially equivalent biological activity to the reference protein, polypeptide or nucleic acid.

"Hybridization" refers to a reaction in which one or more polynucleotides react to form a complex that is stabilized via hydrogen bonding between the bases of the nucleotide residues. The hydrogen bonding may occur by Watson-Crick base pairing, Hoogstein binding, or in any other sequence-specific manner. The complex may comprise two strands forming a duplex structure, three or more strands forming a multi-stranded complex, a single self-hybridizing strand, or any combination of these. A hybridization reaction may constitute a step in a more extensive process, such as the initiation of a PC reaction, or the enzymatic cleavage of a polynucleotide by a ribozyme.

Examples of stringent hybridization conditions include: incubation temperatures of about 25° C. to about 37° C.; hybridization buffer concentrations of about 6×SSC to about 10×SSC; formamide concentrations of about 0% to about 25%; and wash solutions from about 4×SSC to about 8×SSC. Examples of moderate hybridization conditions include: incubation temperatures of about 40° C. to about 50° C.; buffer concentrations of about 9×SSC to about 2×SSC; formamide concentrations of about 30% to about 50%; and wash solutions of about 5×SSC to about 2×SSC. Examples of high stringency conditions include: incubation temperatures of about 55° C. to about 68° C.; buffer concentrations of about 1×SSC to about 0.1×SSC; formamide concentrations of about 55% to about 75%; and wash solutions of about 1×SSC, 0.1×SSC, or deionized water. In general, hybridization incubation times are from 5 minutes to 24 hours, with 1, 2, or more washing steps, and wash incubation times are about 1, 2, or 15 minutes. SSC is 0.15 M NaCl and 15 mM citrate buffer. It is understood that equivalents of SSC using other buffer systems can be employed.

"Homology" or "identity" or "similarity" refers to sequence similarity between two peptides or between two nucleic acid molecules. Homology can be determined by comparing a position in each sequence which may be aligned for purposes of comparison. When a position in the compared sequence is occupied by the same base or amino acid, then the molecules are homologous at that position. A degree of homology between sequences is a function of the number of matching or homologous positions shared by the sequences. An "unrelated" or "non-homologous" sequence shares less than 40% identity, or alternatively less than 25% identity, with one of the sequences of the present invention.

"Homology" or "identity" or "similarity" can also refer to two nucleic acid molecules that hybridize under stringent conditions.

As used herein, the terms "treating," "treatment" and the like are used herein to mean obtaining a desired pharmacologic and/or physiologic effect. The effect may be prophylactic in terms of completely or partially preventing a disorder or sign or symptom thereof, and/or may be therapeutic in terms of a partial or complete cure for a disorder and/or adverse effect attributable to the disorder. In one aspect, treatment indicates a reduction in inflammation in a patient. Methods to measure such include without limitation vasodilation, production of inflammation markers, and leukocyte infiltration cessation. Markers for inflammation include, for example, IL-6, IL-8, IL-18, TNF-alpha, and CRP. Any appropriate method to measure and monitor such markers are known in the art.

To prevent intends to prevent a disorder or effect in vitro or in vivo in a system or subject that is predisposed to the disorder or effect.

A "composition" is intended to mean a combination of active agent and another compound or composition, inert (for example, a detectable agent or label) or active, such as an adjuvant.

A "pharmaceutical composition" is intended to include the combination of an active agent with a carrier, inert or active, making the composition suitable for diagnostic or therapeutic use in vitro, in vivo or ex vivo.

The term "functionally equivalent codon" is used herein to refer to codons that encode the same amino acid, such as the six codons for arginine or serine, and also refers to codons that encode biologically equivalent amino acids (see below Table).

| Codon Table | | | |
|---|---|---|---|
| Amino Acids | | | Codons |
| Alanine | Ala | A | GCA GCC GCG GCU |
| Cysteine | Cys | C | UGC UGU |
| Aspartic acid | Asp | D | GAC GAU |

-continued

Codon Table

| Amino Acids | | | Codons |
|---|---|---|---|
| Glutamic acid | Glu | E | GAA GAG |
| Phenylalanine | Phe | F | UUC UUU |
| Glycine | Gly | G | GGA GGC GGG GGU |
| Histidine | His | H | CAC CAU |
| Isoleucine | Ile | I | AUA AUC AUU |
| Lysine | Lys | K | AAA AAG |
| Leucine | Leu | L | UUA UUG CUA CUC CUG CUU |
| Methionine | Met | M | AUG |
| Asparagine | Asn | N | AAC AAU |
| Proline | Pro | P | CCA CCC CCG CCU |
| Glutamine | Gln | Q | CAA CAG |
| Arginine | Arg | R | AGA AGG CGA CGC CGG CGU |
| Serine | Ser | S | AGC AGU UCA UCC UCG UCU |
| Threonine | Thr | T | ACA ACC ACG ACI |
| Valine | Val | V | GUA GUC GUG GUU |
| Tryptophan | Trp | W | UGG |
| Tyrosine | Tyr | Y | UAC UAU |

As used herein, a "protein" or "polypeptide" or "peptide" refers to a molecule comprising at least five amino acid residues.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Descriptive Embodiments

It was previously unknown that antigenic peptides from the symbiotic bacteria of the gastrointestinal tract were specifically recognized by endogenous host T-cells upon being processed by professional antigen-presenting cells (APCs, such as dendritic cells or DCs), and that this antigen-driven interaction between a cognate T-cell and the APC can inhibit IBD. Without being bound by theory, Applicants believe that proteins from the bacteria that reside in or infect the gastrointestinal tract are processed by the proteasome or in the endosome and the resulting peptides shuttled to the endoplasmic reticulum for binding to endogenous MHC class I or class II molecules, which are then transported to the APC's plasma membrane, which then activates cognate T-cells.

Applicants believe that this is the first disclosure that antigens of gastrointestinal-associated bacteria are processed and presented to cognate endogenous T-cells with the capacity to suppress inflammatory bowel disease, and therefore, Applicants believe that these antigens could be used as a target to foster the recruitment and accumulation of autoregulatory (anti-inflammatory) T-cells to, for example, the gut in inflammatory bowel disease. Antigen-MHC-nanoparticle complexes have previously been shown to expand therapeutic populations of T cells in other diseases (see for e.g. US Patent Pub. No.: 2009/0155292), but it was unknown that this technology could suppress inflammation, in for example, the gastrointestinal tract or treat inflammatory bowel diseases. Compositions and methods described herein are useful for the suppression of inflammation and for the treatment of diseases associated therewith.

II. METHODS

The methods as described herein comprise, or alternatively consist essentially of, or yet further consist of the administration of an effective amount of an antigen-MHC-nanoparticle complex to a cell, tissue or subject for the purpose of one or more of: (1) inducing an anti-inflammatory response in a cell or tissue; (2) treating or reducing inflammation in a patient in need thereof; (3) accumulating autoregulatory, anti-inflammatory T cells in a patient in need thereof and/or (4) transfering cytotoxic T-lymphocytes targeting gut bacterial epitopes in a patient in need thereof. In one embodiment, the cytotoxic T-lymphocytes recognize the gut bacterial epitope with low avidity.

In one embodiment, inflammation of the gastrointestinal tract is reduced or treated. Methods to determine and monitor the therapy are known in the art and briefly described herein. When delivered in vitro, administration is by contacting the composition with the tissue or cell by any appropriate method, e.g., by administration to cell or tissue culture medium and is useful as a screen to determine if the therapy is appropriate for an individual or to screen for alternative therapies to be used as a substitute or in combination with the disclosed compositions. When administered in vivo, administration is by systemic or local administration. In vivo, the methods can be practiced on a non-human animal to screen alternative therapies to be used as a substitute or in combination with the disclosed compositions prior to human administration. In a human or non-human mammal, they are also useful to treat the disease or disorder.

In certain embodiments, the patient to be treated by the methods of this disclosure suffers from a gastrointestinal disease having as a symptom or condition thereof inflammation of the GI tissue. Non-limiting examples of gastrointestinal diseases include inflammatory bowel disease, colitis, Crohn's disease, allergic reactions in the gastrointestinal tract, food allergies, eosinophilic diseases in the gastrointestinal system, irritable bowel syndrome, celiac disease and gastric haemorrhagia. In one embodiment, the disease is selected from the group of: inflammatory bowel disease, colitis, Crohn's disease, allergic inflammation of the gastrointestinal tract, and celiac disease. In a related embodiment, the disease is inflammatory bowel disease.

Methods described herein are useful for inducing an anti-inflammatory response in a cell or tissue. In one embodiment, the cell is a cell or tissue of the gastrointestinal tract. The upper gastrointestinal tract consists of the esophagus, stomach, and duodenum. The exact demarcation between "upper" and "lower" can vary. Upon gross dissection, the duodenum may appear to be a unified organ, but it is often divided into two parts based upon function, arterial supply, or embryology. The lower gastrointestinal tract includes the small intestine and the large intestine. The small intestine has three parts: the duodenum, jejunum, and ileum. In the duodenum, the digestive enzymes from the pancreas and the gallbladder (bile) mix together. Digestive enzymes break down proteins and bile and emulsify fats into micelles. The duodenum contains Brunner's glands which produce bicarbonate, and pancreatic juice which contains bicarbonate to neutralize hydrochloric acid of the stomach. The jejunum is the midsection of the Intestine, connecting the duodenum to the ileum. It contains the plicae circulares, and villi to increase the surface area of that part of the GI Tract. The ileum has villi, where all soluble molecules are absorbed into the blood (capillaries and lacteals). The large intestine has three parts: the cecum, colon, and rectum. The vermiform appendix is attached to the cecum. The colon includes the ascending colon, transverse colon, descending colon and sigmoid flexure. The main function of the colon is to absorb water, but it also contains bacteria that produce beneficial vitamins.

In another embodiment, the anti-inflammatory response is induced in an immune cell or tissue containing such. Immune cells include, for example, adult splenocytes, T lymphocytes, B lymphocytes, and cells of bone marrow origin, such as defective antigen presenting cells of a mammal, that have activity towards the organism from which the immune cell is derived.

The MHC of the antigen-MHC-nanoparticle complex can be MHC I, MHC II, or non-classical MHC. MHC proteins are described herein. In one embodiment, the MHC of the antigen-MHC-nanoparticle complex is a MHC class I. In another embodiment, the MHC is a MHC class II. In other embodiments, the MHC component of the antigen-MHC-nanoparticle complex is MHC class II or a non-classical MHC molecule as described herein.

In one of its method aspects, there is provided a method for accumulating anti-inflammatory (gut microbe-specific or gastrointestinal-microbe specific) T cells in a patient in need thereof. In one embodiment, the T cells are accumulated in the gastrointestinal tract of the patient. In another embodiment, the T cell is a conventional CD8+ T-cell recognizing any gastrointestinal tract microbial antigen. In a further embodiment, the T cell is a memory-like autoregulatory CD8+ T cell. In yet a further embodiment, the T cell is a CD4+ T cell. In a related embodiment, the T cell secretes IL-10 or TGFβ.

Details regarding modes of administration in vitro and in vivo are described within.

III. ANTIGEN-MHC-NANOPARTICLE COMPLEXES

Certain aspects relate to processes for producing gut antigen-specific anti-IBD medicaments that specifically target gut inflammation without compromising systemic immunity. Example 2 describes the production of antigen-MHC-nanoparticle complexes. Antigen-MHC-nanoparticle complexes useful in this invention comprise an antigen derived from a microbe of the gastrointestinal tract. It is contemplated that administering nanoparticles coated with gut-specific antigen-MHC complexes to a patient will result in a an expansion of circulating gut antigen-specific T cells that are from about 0.5% to about 90% of total circulating T cells, or from about 1% to about 80%, or from about 5% to about 80%, or from about 10% to about 80%, or from about 10% to about 50%, or from about 50% to about 90%, or from about 20% to about 50%, or from about 30% to about 60%, or from about 35% to about 65%, or from about 40% to about 70%, or from about 45% to about 75%, or from about 50% to about 80%, or from about 25% to about 55%, or from about 0.5% to about 1%, or from about 1% to about 2.5%, or from about 2.5% to about 5%, or from about 0.1% to about 5%, or from about 1% to about 5%, or from about 0.1% to about 10%,

A. Polypeptides and Polynucleotides

Further aspects relate to an isolated or purified polypeptide comprising, or consisting essentially of, or yet further consisting of, the amino acid sequence of SEQ ID No. 1 or a polypeptide having at least about 80% sequence identity, or alternatively at least 85%, or alternatively at least 90%, or alternatively at least 95%, or alternatively at least 98% sequence identity to SEQ ID No. 1. Also provided are isolated and purified polynucleotides encoding the polypeptide corresponding to SEQ ID No. 1, at least about 80% sequence identify to SEQ ID No. 1, or alternatively at least 85%, or alternatively at least 90%, or alternatively at least 95%, or alternatively at least 98% sequence identity to SEQ ID No. 1 or an equivalent, or a polynucleotide that hybridizes under stringent conditions to the polynucleotide, its equivalent or its complement and isolated or purified polypeptides encoded by these polynucleotides.

Other aspects relate to an isolated or purified polypeptide comprising, or consisting essentially of, or yet further consisting of, the amino acid sequence of SEQ ID Nos. 4, 5, 6, 7, or 8 or a polypeptide having at least about 80% sequence identity at least about 80% sequence identify to SEQ ID No. 4-8, or alternatively at least 85%, or alternatively at least 90%, or alternatively at least 95%, or alternatively at least 98% sequence identity to SEQ ID Nos. 4-8. Also provided are isolated and purified polynucleotides encoding the polypeptide corresponding to SEQ ID Nos. 4-8, or an equivalent, or a polynucleotide that hybridizes under stringent conditions to the polynucleotide, its equivalent or its complement and isolated or purified polypeptides encoded by these polynucleotides or one having at least about 80% sequence identify to polynucleotides encoding SEQ ID No. 4-8, or alternatively at least 85%, or alternatively at least 90%, or alternatively at least 95%, or alternatively at least 98% sequence identity to polynucleotides encoding SEQ ID Nos. 4-8.

Sequence Listings

```
SEQ ID No. 1: BacIYL epitope: IYLKTNVYL

SEQ ID No. 2: Integrase protein (Bacteroides vulgatus)

MLEKIRYRLVFNRQKKLNKQGTALVQVEAYLNQRKIYLKTNVYLKPECWSREGAQVINHPQSNELNAMLY

EYILYLQGIELGYWKRGIPATLSLLKDAVKKKSAVNVSFSTFAKSAIDNSDKKQSTKDNLHSTLAVLNDF

RSGLDFKDLTYTFLRDFEQYLREKGNAVNTIAKHMRQLRTLVNEAINQGYMHADAYPFRKYKIKQEKGRH

EFLTPDELKKLETVEVEEKSMRHVLDAFLFCCYTGLRYSDFCQLTPENFIRVNGKRWLYFKSVKTGVEIR

LPLHLLFESRALGILDRYPDIGSLVSLPCNSEVNKQLRKLTGLCGIKKRITYHVSRHTCATLLVHQGVAI

TTVQKLLGHTSVKTTQIYSEVLSSTIVRDLKNVQRKRKKVKMFPDKGLRTSDFIDNR

SEQ ID No. 3: Integrase DNA sequence (Bacteroides vulgatus)

ATGCTAGAGAAGATACGATACAGGTTGGTCTTTAACCGCCAAAAGAAACTGAATAAGCAAGGCACGGCCCTTGTACA
```

-continued

```
GGTTGAAGCCTATTTGAACCAAAGGAAAATCTACCTGAAGACCAATGTTTACCTCAAACCGGAGTGCTGGAGCCGTG

AGGGGGCACAAGTCATTAACCACCCCCAATCTAACGAACTCAACGCAATGCTCTATGAATACATCCTGTATCTGCAA

GGCATAGAGTTGGGGTATTGGAAGCGCGGAATACCTGCCACACTCTCACTACTGAAGGATGCTGTCAAGAAGAAAAG

TGCCGTGAATGTCAGCTTCTCCACTTTCGCCAAATCAGCCATTGACAATTCGGACAAGAAGCAGTCCACCAAGGACA

ACCTGCACTCGACACTGGCGGTCCTGAATGACTTCCGTTCCGGATTGGACTTCAAGGATCTTACCTATACATTCCTT

CGTGATTTTGAGCAATATTTAAGGGAAAAGGGCAATGCGGTCAATACGATAGCCAAGCACATGAGACAGCTCCGTAC

CTTGGTCAATGAGGCAATCAACCAGGGATATATGCACGCGGACGCTTATCCGTTCAGAAAGTACAAAATCAAACAGG

AGAAAGGCAGACATGAGTTTCTTACCCCGGACGAGCTGAAGAAGCTGGAAACGGTCGAAGTGGAAGAGAAGTCCATG

CGCCATGTGCTCGATGCCTTCCTGTTCTGCTGTTATACCGGATTGCGCTATTCTGACTTCTGCCAGCTCACACCTGA

GAATTTCATTAGAGTAAACGGCAAACGGTGGCTGTACTTCAAATCCGTCAAGACAGGGGTGGAAATCCGTCTGCCGT

TACATCTGCTGTTTGAAAGCAGGGCATTGGGCATTCTTGACCGTTATCCGGATATAGGTAGTCTTGTATCCCTACCC

TGTAACTCGGAAGTGAATAAGCAGCTTCGAAAGCTGACCGGATTGTGTGGTATCAAAAAACGGATAACCTACCATGT

GAGCCGTCATACCTGTGCCACCCTGCTGGTTCATCAGGGAGITGCGATTACAACAGTCCAGAAGCTGCTCGGACATA

CTTCCGTAAAGACCACACAGATTTATTCGGAGGTACTTTCCAGCACCATTGTGCGTGACTTGAAAAATGTTCAAAGG

AAAAGGAAAAAAGTAAAGATGTTTCCTGATAAAGGCTTGAGAACATCTGATTTTATAGACAACCGGTAG
```

SEQ ID No. 4: BacInt$_{40-54}$ peptide sequence: TNVYLKPECWSREGA

SEQ ID No. 5: BacInt$_{81-95}$ peptide sequence: LGYWKRGIPATLSLL

SEQ ID No. 6: BacInt$_{365-379}$ peptide sequence: TQIYSEVLSSTIVRD

SEQ ID No. 7: BacInt$_{57-71}$ peptide sequence: INHPQSNELNAMLYE

SEQ ID No. 8: BacInt$_{88-102}$ peptide sequence: IPATLSLLKDAVKKK

Antigens, including segments, fragments and other molecules derived from an antigenic species, including but not limited to peptides, carbohydrates, lipids or other molecules presented by classical and non-classical MHC molecules of the invention are typically complexed or operatively coupled to a MHC molecule or derivative thereof. Antigen recognition by T lymphocytes is major histocompatibility complex (MHC)-restricted. A given T lymphocyte will recognize an antigen only when it is bound to a particular MHC molecule. In general, T lymphocytes are stimulated only in the presence of self-MHC molecules, and antigen is recognized as fragments of the antigen bound to self MHC molecules. MHC restriction defines T lymphocyte specificity in terms of the antigen recognized and in terms of the MHC molecule that binds its antigenic fragment(s). In particular aspects certain antigens will be paired with certain MHC molecules or polypeptides derived there from.

The term "operatively coupled" or "coated" as used herein, refers to a situation where individual polypeptide (e.g., MHC) and antigenic (e.g., peptide) components are combined to form the active complex prior to binding at the target site, for example, an immune cell. This includes the situation where the individual polypeptide complex components are synthesized or recombinantly expressed and subsequently isolated and combined to form a complex, in vitro, prior to administration to a subject; the situation where a chimeric or fusion polypeptide (i.e., each discrete protein component of the complex is contained in a single polypeptide chain) is synthesized or recombinantly expressed as an intact complex. Typically, polypeptide complexes are added to the nanoparticles to yield nanoparticles with adsorbed or coupled polypeptide complexes having a ratio of number of molecules:number of nanoparticle ratios from about, at least about or at most about 0.1, 0.5, 1, 3, 5, 7, 10, 15, 20, 25, 30, 35, 40, 50, 100, 125, 150, 175, 200, 225, 250, 275, 300, 325, 350, 375, 400, 425, 450, 475, 500, 600, 700, 800, 900, 1000, 1500 or more to:1, more typically 0.1:1, 1:1 to 50:1 or 300:1. In a specific embodiment, the ratio of the number of antigen-MHC molecules to the number of nanoparticles is from about 10:1 to about 1000:1. The polypeptide content of the nanoparticles can be determined using standard techniques.

The peptides and proteins described herein can also be used in conventional methods to treat inflammation of the gastrointestinal tract. Accordingly, certain aspects relate to methods for inducing an anti-inflammatory response in a cell or tissue, comprising contacting the cell or tissue with an effective amount of an antigen, wherein the antigen is an antigen derived from a microbe that resides within or infects a cell or tissue of the gastrointestinal tract (GI) or is a GI-associated antigen. Another aspect relates to a method for treating inflammation in a patient in need thereof comprising administering an effective amount of an antigen to the patient, wherein the antigen is derived from a microbe that resides within or infects a cell or tissue of the gastrointestinal tract or is a GI-associated antigen. A further aspect relates to a method for accumulating anti-inflammatory T cells in the GI tract of a patient in need thereof comprising administering an effective amount of an antigen to the patient, wherein the antigen is an antigen derived from a microbe that resides within or infects a cell or tissue of the gastrointestinal tract or is a GI-associated antigen. The antigen may be, for example, an antigen that corresponds to a peptide having at least 80% identity to the peptide sequence of the group: SEQ ID Nos. 1, 2, 4, 5, 6, 7, or 8. In certain embodiments, the antigen is complexed with MHC molecules prior to administration. In other embodiments, the antigen is administered with an adjuvant. Examples of suitable adjuvants include, but are not limited to Freund's Complete and Incomplete, mineral salts and polynucleotides. Other non-limiting examples of suitable adjuvants include monophosphoryl lipid A (MPL), mutant derivatives of the heat labile entero-toxin of *E. coli*, mutant derivatives of cholera toxin, CPG oligonucleotides, and adjuvants derived from squalene B. MHC Molecules Intracellular and extracellular antigens present quite different challenges to the immune system, both in terms of recognition and of appropriate response. Presentation of antigens to T cells is mediated by two distinct classes of molecules MHC class I (MHC-I) and MHC class II (MHC-II), which utilize distinct antigen processing pathways. Peptides derived from intracellular antigens are presented to $CD8^+$ T cells by MHC class I molecules, which are expressed on virtually all cells, while extracellular antigen-derived peptides are presented to $CD4^+$ T cells by MHC-II molecules. However, there are certain exceptions to this dichotomy.

Several studies have shown that peptides generated from endocytosed particulate or soluble proteins are presented on MHC-I molecules in macrophages as well as in dendritic cells. In certain embodiments of the invention, a particular antigen is identified and presented in the antigen-MHC-nanoparticle complex in the context of an appropriate MHC class I or II polypeptide. In certain aspects, the genetic makeup of a subject may be assessed to determine which MHC polypeptide is to be used for a particular patient and a particular set of peptides.

Non-classical MHC molecules are also contemplated for use in MHC complexes of the invention. Non-classical MHC molecules are non-polymorphic, conserved among species, and possess narrow, deep, hydrophobic ligand binding pockets. These binding pockets are capable of presenting glycolipids and phospholipids to Natural Killer T (NKT) cells or certain subsets of CD8+ T-cells such as Qa1 or HLA-E-restricted CD8+ T-cells. NKT cells represent a unique lymphocyte population that co-express NK cell markers and a semi-invariant T cell receptor (TCR). They are implicated in the regulation of immune responses associated with a broad range of diseases.

C. Antigenic Components

Certain aspects of the invention include methods and compositions concerning antigenic compositions including segments, fragments, or epitopes of polypeptides, peptides, nucleic acids, carbohydrates, lipids and other molecules that provoke or induce an antigenic response, generally referred to as antigens. In particular, antigenic segments or fragments of antigenic determinants, which lead to the destruction of a cell via an autoimmune response, can be identified and used in making an antigen-MHC-nanoparticle complex described herein. Embodiments of the invention include compositions and methods for the modulation of an immune response in a cell or tissue of the body.

Polypeptides and peptides of the invention may be modified by various amino acid deletions, insertions, and/or substitutions. In particular embodiments, modified polypeptides and/or peptides are capable of modulating an immune response in a subject. In some embodiments, a wild-type version of a protein or peptide are employed, however, in many embodiments of the invention, a modified protein or polypeptide is employed to generate an antigen-MHC-nanoparticle complex. An antigen-MHC-nanoparticle complex can be used to generate an anti-inflammatory immune response, to modify the T cell population of the immune system (i.e., re-educate the immune system), and/or foster the recruitment and accumulation of anti-inflammatory T cells to a particular tissue, such as, for example, a tissue of the gastrointestinal tract. The terms described above may be used interchangeably herein. A "modified protein" or "modified polypeptide" or "modified peptide" refers to a protein or polypeptide whose chemical structure, particularly its amino acid sequence, is altered with respect to the wild-type protein or polypeptide. In some embodiments, a modified protein or polypeptide or peptide has at least one modified activity or function (recognizing that proteins or polypeptides or peptides may have multiple activities or functions). It is specifically contemplated that a modified protein or polypeptide or peptide may be altered with respect to one activity or function yet retains a wild-type activity or function in other respects, such as immunogenicity or ability to interact with other cells of the immune system when in the context of an MHC-nanoparticle complex.

Antigens of the invention include antigens derived from proteins of a microbe common to the gastrointestinal tract. Microbes common to the gastrointestinal tract include, for example, *Achromobacter* spp, *Acidaminococcus fermentans*, *Acinetobacter cacoaceticus*, *Actinomyces* spp, *Actinomyces viscosus*, *Actinomyces naeslundii*, *Aeromonas* spp, *Aggregatibacter actinomycetemcomitans*, *Alistipes putredinis*, *Anaerotruncus colihominis*, *Anaerobiospirillum* spp, *Alcaligenes faecalis*, *Arachnia propionica*, *Bacillus* spp, *Bacteroides* spp, *Bacteroides caccae*, *Bacteroides capillosus*, *Bacteroides dorei*, *Bacteroides eggerthii*, *Bacteroides gingivalis*, *Bacteroides finegoldii*, *Bacteroides fragilis*, *Bacteroides intermedius*, *Bacteroides intestinalis*, *Bacteroides melaninogenicus*, *Bacteroides ovatus*, *Bacteroides pectinophilus*, *Bacteroides pneumosintes*, *Bacteroides stercoris*, *Bacteroides thetaiotaomicron*, *Bacteroides uniformis*, *Bacteroides vulgatus*, *Bacteroides xylanisolvens*, *Bacterionema matruchotii*, *Blautia hansenii*, *Corynebacterium matruchotii*, *Bifidobacterium* spp, *Buchnera aphidicola*, *Butyrivibrio crossotus*, *Butyriviberio fibrosolvens*, *Campylobacter* spp, *Campylobacter coli*, *Campylobacter sputorum*, *Campylobacter upsaliensis*, *Candida albicans*, *Capnocytophaga* spp, *Clostridium* spp, *Citrobacter freundii*, *Clostridium asparagiforme*, *Clostridium difficile*, *Clostridium leptum*, *Clostridium nexile*, *Clostridium scindens*, *Clostridium sordellii*, *Collinsella aerofaciens*, *Coprococcus comes*, *Coprococcus eutactus*, *Corynebacterium* spp, *Dorea formicigenerans*, *Dorea longicatena*, *Eikenella corrodens*, *Enterobacter cloacae*, *Enterococcus* spp, *Enterococcus faecalis*, *Enterococcus faecium*, *Escherichia coli*, *Eubacterium* spp, *Eubacterium hallii*, *Eubacterium rectale*, *Eubacterium siraeum*, *Eubacterium ventriosum*, *Faecalibacterium prausnitzii*, *Flavobacterium* spp, *Fusobacterium* spp, *Fusobacterium nucleatum*, *Gordonia Bacterium* spp, *Haemophilius parainfluenzae*, *Haemophilus paraphrophilus*, *Holdemania filiformis*, *Lactobacillus* spp, *Leptotrichia buccalis*, *Morganella morganii*, *Mycobacteria* spp, *Mycoplasma* spp, *Micrococcus* spp, *Mycoplasma* spp, *Mycobacterium chelonae*, *Neisseria* spp, *Neisseria sicca*, *Parabacteroides distasonis*, *Parabacteroides johnsonii*, Parabacteroides *merdae*, *Peptococcus* spp, *Peptostreptococcus* spp, *Plesiomonas shigelloides*, *Porphyromonas gingivalis*, *Propionibacterium* spp, *Propionibacterium acnes*, *Providencia* spp, *Pseudomonas aeruginosa*, *Roseburia intestinalis*, *Ruminococcus bromii*, *Ruminococcus gnavus*, *Ruminococcus torques*, *Ruminococcus lactaris*, *Ruminococcus obeum*, *Rothia dentocariosa*, *Ruminococcus* spp, *Sarcina* spp, *Staphylococcus aureus*, *Staphylococcus epidermidis*, *Streptococcus anginosus*, *Streptococcus mutans*, *Streptococcus oralis*, *Streptococcus pneumoniae*, *Streptococcus sobrinus*, *Streptococcus thermo-*

*philus, Streptococcus viridans, Subdoligranulum variabile, Torulopsis glabrata, Treponema denticola, Treponema refringens, Veillonella* spp, *Vibrio* spp, *Vibrio sputorum, Wolinella succinogenes,* and *Yersinia enterocolitica.* Qin et al., (2010) Nature, Vol. 464:4 describes prevalent bacteria in the gastrointestinal tract. In certain embodiments, the antigen is derived from a bacteria belonging to the genera of the group: *Bacteroides, Clostridium, Dorea, Fusobacterium, Eubacterium, Ruminococcus, Peptococcus, Peptostreptococcus,* and *Bifidobacterium.* In a related embodiment, the antigen is derived from *Bacteroides.* In a further embodiment, the antigen is derived from a protein of *Bacteroides.* In yet another embodiment, the antigen is derived from the protein Integrase. In a further embodiment, the antigen corresponds to a peptide having at least 80% identity, or at least about 80% sequence identify to SEQ ID No. 1, or alternatively at least 85%, or alternatively at least 90%, or alternatively at least 95%, or alternatively at least 98% sequence identity to the peptide sequence of SEQ ID No. 1. In other embodiments, the antigen corresponds to a peptide having at least 80% identity to the peptide sequence of SEQ ID Nos. 4-8. Other useful antigens include those that induce T cells that can cross-react with an antigen of a gut microbe. For example, IGRP$_{206-214}$ epitope (expressed by pancreatic beta cells) and NRP-V7 or NRP-A7 (mimics of IGRP$_{206-214}$) can be used to induce 8.3-like CD8+ T-cells that can cross-react with the BacIYL sequence.

Antigens of the invention also include GI-associated antigens such as known inflammatory bowel disease-related antigens (e.g. ovalbumin), dieteray antigens such as yeast mannan, gliadin and known celiac disease related antigens such as gliadin from gluten.

In certain embodiments, the size of a protein or polypeptide (wild-type or modified), including any complex of a protein or peptide of interest and in particular a MHC-peptide fusion, may comprise, but is not limited to 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1750, 2000, 2250, 2500 amino molecules or greater, including any range or value derivable therein, or derivative thereof. In certain aspects, 5, 6, 7, 8, 9, 10 or more contiguous amino acids, including derivatives thereof, and fragments of an antigen, such as those amino acid sequences disclosed and referenced herein, can be used as antigens. It is contemplated that polypeptides may be mutated by truncation, rendering them shorter than their corresponding wild-type form, but also they might be altered by fusing or conjugating a heterologous protein sequence with a particular function (e.g., for presentation as a protein complex, for enhanced immunogenicity, etc.).

Proteinaceous compositions may be made by any technique known to those of skill in the art, including (i) the expression of proteins, polypeptides, or peptides through standard molecular biological techniques, (ii) the isolation of proteinaceous compounds from natural sources, or (iii) the chemical synthesis of proteinaceous materials. The nucleotide as well as the protein, polypeptide, and peptide sequences for various genes have been previously disclosed, and may be found in the recognized computerized databases. One such database is the National Center for Biotechnology Information's GenBank and GenPept databases (on the World Wide Web at ncbi.nlm.nih.gov/). The all or part of the coding regions for these genes may be amplified and/or expressed using the techniques disclosed herein or as would be known to those of ordinary skill in the art.

Amino acid sequence variants of autoantigenic epitopes and other polypeptides of these compositions can be substitutional, insertional, or deletion variants. A modification in a polypeptide of the invention may affect 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500 or more non-contiguous or contiguous amino acids of a peptide or polypeptide, as compared to wild-type.

Deletion variants typically lack one or more residues of the native or wild-type amino acid sequence. Individual residues can be deleted or a number of contiguous amino acids can be deleted. A stop codon may be introduced (by substitution or insertion) into an encoding nucleic acid sequence to generate a truncated protein. Insertional mutants typically involve the addition of material at a non-terminal point in the polypeptide. This may include the insertion of one or more residues. Terminal additions, called fusion proteins, may also be generated.

Substitutional variants typically contain the exchange of one amino acid for another at one or more sites within the protein, and may be designed to modulate one or more properties of the polypeptide, with or without the loss of other functions or properties. Substitutions may be conservative, that is, one amino acid is replaced with one of similar shape and charge. Conservative substitutions are well known in the art and include, for example, the changes of: alanine to serine; arginine to lysine; asparagine to glutamine or histidine; aspartate to glutamate; cysteine to serine; glutamine to asparagine; glutamate to aspartate; glycine to proline; histidine to asparagine or glutamine; isoleucine to leucine or valine; leucine to valine or isoleucine; lysine to arginine; methionine to leucine or isoleucine; phenylalanine to tyrosine, leucine or methionine; serine to threonine; threonine to serine; tryptophan to tyrosine; tyrosine to tryptophan or phenylalanine; and valine to isoleucine or leucine. Alternatively, substitutions may be non-conservative such that a function or activity of a polypeptide or peptide is affected, such as avidity or affinity for a cellular receptor(s). Non-conservative changes typically involve substituting a residue with one that is chemically dissimilar, such as a polar or charged amino acid for a nonpolar or uncharged amino acid, and vice versa.

Proteins of the invention may be recombinant, or synthesized in vitro. Alternatively, a recombinant protein may be isolated from bacteria or other host cell.

It also will be understood that amino acid and nucleic acid sequences may include additional residues, such as additional N- or C-terminal amino acids, or 5' or 3' nucleic acid sequences, respectively, and yet still be essentially as set forth in one of the sequences disclosed herein, so long as the sequence meets the criteria set forth above, including the maintenance of biological protein activity (e.g., immunogenicity). The addition of terminal sequences particularly applies to nucleic acid sequences that may, for example, include various non-coding sequences flanking either of the 5' or 3' portions of the coding region.

It is contemplated that in compositions of the invention, there is between about 0.001 mg and about 10 mg of total protein per ml. Thus, the concentration of protein in a composition can be about, at least about or at most about 0.001, 0.010, 0.050, 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 50, 100 µg/ml or mg/ml or more (or any range derivable therein). Of this, about, at least about, or at most about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100% may be antigen-MHC-nanoparticle complex.

The present invention contemplates the administration of an antigen-MHC-nanoparticle complex to effect a treatment against a disease or condition associated with inflammation of the gastrointestinal tract.

In addition, U.S. Pat. No. 4,554,101 (Hopp), which is incorporated herein by reference, teaches the identification and preparation of epitopes from primary amino acid sequences on the basis of hydrophilicity. Through the methods disclosed in Hopp, one of skill in the art would be able to identify potential epitopes from within an amino acid sequence and confirm their immunogenicity. Numerous scientific publications have also been devoted to the prediction of secondary structure and to the identification of epitopes, from analyses of amino acid sequences (Chou & Fasman, Adv. Enzymol., 47:45-148, 1978; Chous and Fasman, Annu. Rev. Biochem., 47:251-276, 1978, Chou and Fasman, Biochemistry, 13(2):211-222, 1974; Chau and Fasman, Biochemistry, 13(2):222-245, 1974, Chou and Fasman, Biophys. J., 26(3):385-399, 1979). Any of these may be used, if desired, to supplement the teachings of Hopp in U.S. Pat. No. 4,554,101.

Molecules other than peptides can be used as antigens or antigenic fragments in complex with MHC molecules, such molecules include, but are not limited to carbohydrates, lipids, small molecules, and the like. Carbohydrates are major components of the outer surface of a variety of cells. Certain carbohydrates are characteristic of different stages of differentiation and very often these carbohydrates are recognized by specific antibodies. Expression of distinct carbohydrates can be restricted to specific cell types.

D. Substrates/Nanoparticles

In certain aspect, antigen/MHC complexes are operatively coupled to a substrate. A substrate can be in the form of a nanoparticle that optionally comprises a biocompatible, bioabsorbable material. Accordingly, in one embodiment, the nanoparticle is biocompatible and/or bioabsorbable. A substrate can also be in the form of a nanoparticle such as those described previously in US Patent Pub. No.: 2009/0155292 which is herein incorporated by reference in its entirety. Nanoparticles can have a structure of variable dimension and known variously as a nanosphere, a nanoparticle or a biocompatible biodegradable nanosphere or a biocompatible biodegradable nanoparticle. Such particulate formulations containing an antigen/MHC complex can be formed by covalent or non-covalent coupling of the complex to the nanoparticle.

The nanoparticles typically consist of a substantially spherical core and optionally one or more layers. The core may vary in size and composition. In addition to the core, the nanoparticle may have one or more layers to provide functionalities appropriate for the applications of interest. The thicknesses of layers, if present, may vary depending on the needs of the specific applications. For example, layers may impart useful optical properties.

Layers may also impart chemical or biological functionalities, referred to herein as chemically active or biologically active layers, and for these functionalities the layer or layers may typically range in thickness from about 0.001 micrometers (1 nanometer) to about 10 micrometers or more (depending on the desired nanoparticle diameter), these layers typically being applied on the outer surface of the nanoparticle.

The compositions of the core and layers may vary. Suitable materials for the particles or the core include, but are not limited to polymers, ceramics, glasses, minerals, and the like. Examples include, but are not limited to, standard and specialty glasses, silica, polystyrene, polyester, polycarbonate, acrylic polymers, polyacrylamide, polyacrylonitrile, polyamide, fluoropolymers, silicone, celluloses, silicon, metals (e.g., iron, gold, silver), minerals (e.g., ruby), nanoparticles (e.g., gold nanoparticles, colloidal particles, metal oxides, metal sulfides, metal selenides, and magnetic materials such as iron oxide), and composites thereof. The core could be of homogeneous composition, or a composite of two or more classes of material depending on the properties desired. In certain aspects, metal nanoparticles will be used. These metal particles or nanoparticles can be formed from Au, Pt, Pd, Cu, Ag, Co, Fe, Ni, Mn, Sm, Nd, Pr, Gd, Ti, Zr, Si, and In, precursors, their binary alloys, their ternary alloys and their intermetallic compounds. See U.S. Pat. No. 6,712,997, which is incorporated herein by reference in its entirety. In certain embodiments, the compositions of the core and layers may vary provided that the nanoparticles are biocompatible and bioabsorbable. The core could be of homogeneous composition, or a composite of two or more classes of material depending on the properties desired. In certain aspects, metal nanospheres will be used. These metal nanoparticles can be formed from Fe, Ca, Ga and the like.

As previously stated, the nanoparticle may, in addition to the core, include one or more layers. The nanoparticle may include a layer consisting of a biodegradable sugar or other polymer. Examples of biodegradable layers include but are not limited to dextran; poly(ethylene glycol); poly(ethylene oxide); mannitol; poly(esters) based on polylactide (PLA), polyglycolide (PGA), polycaprolactone (PCL); poly(hydroxalkanoate)s of the PHB-PHV class; and other modified poly(saccharides) such as starch, cellulose and chitosan. Additionally, the nanoparticle may include a layer with suitable surfaces for attaching chemical functionalities for chemical binding or coupling sites.

Layers can be produced on the nanoparticles in a variety of ways known to those skilled in the art. Examples include sol-gel chemistry techniques such as described in Iler, Chemistry of Silica, John Wiley & Sons, 1979; Brinker and Scherer, Sol-gel Science, Academic Press, (1990). Additional approaches to producing layers on nanoparticles include surface chemistry and encapsulation techniques such as described in Partch and Brown, J. Adhesion, 67:259-276, 1998; Pekarek et al., Nature, 367:258, (1994); Hanprasopwattana, Langmuir, 12:3173-3179, (1996); Davies, Advanced Materials, 10:1264-1270, (1998); and references therein. Vapor deposition techniques may also be used; see for example Golman and Shinohara, Trends Chem. Engin., 6:1-6, (2000); and U.S. Pat. No. 6,387,498. Still other approaches include layer-by-layer self-assembly techniques such as described in Sukhorukov et al., Polymers Adv. Tech., 9(10-11):759-767, (1998); Caruso et al., Macromolecules, 32(7):2317-2328, (1998); Caruso et al., J.Amer. Chem. Soc., 121(25):6039-6046, (1999); U.S. Pat. No. 6,103,379 and references cited therein.

Nanoparticles may be formed by contacting an aqueous phase containing the antigen/MHC/co-stimulatory molecule complex and a polymer and a nonaqueous phase followed by evaporation of the nonaqueous phase to cause the coalescence of particles from the aqueous phase as taught in U.S. Pat. No. 4,589,330 or 4,818,542. Preferred polymers for such preparations are natural or synthetic copolymers or polymers selected from the group consisting of gelatin agar, starch, arabinogalactan, albumin, collagen, polyglycolic acid, polylactic acid, glycolide-L(-) lactide poly(epsilon-caprolactone, poly(epsilon-caprolactone-CO-lactic acid), poly(epsilon-caprolactone-CO-glycolic acid), poly(P-hydroxy butyric acid), poly(ethylene oxide), polyethylene, poly(alkyl-2-cyanoacrylate), poly(hydroxyethyl methacrylate), polyamides, poly(amino acids), poly(2-hydroxyethyl DL-aspartamide), poly(ester urea), poly(L-phenylalanine/ethylene glycol/1,6-diisocyanatohexane) and poly(methyl methacrylate).

Particularly preferred polymers are polyesters, such as polyglycolic acid, polylactic acid, glycolide-L(-) lactide poly(episilon-caprolactone, poly(epsilon-caprolactone-CO-lactic acid), and poly(epsilon-caprolactone-CO-glycolic acid. Solvents useful for dissolving the polymer include: water, hexafluoroisopropanol, methylenechloride, tetrahydrofuran, hexane, benzene, or hexafluoroacetone sesquihydrate.

The size of the nanoparticle can range from about 1 nm to about 1 m. In certain embodiments, the nanoparticle is less than about 1 m. In other embodiments, the nanoparticle is less than about 500 nm, less than about 400 nm, less than about 300 nm, less than about 200 nm, less than about 100 nm, or less than about 50 nm. In further embodiments, the nanoparticle is from about 1 nm to about 15 nm or to about 30 nm, 50 nm, 75 nm, or 100 nm. In further embodiments, the nanoparticle is from about 5 nm to about 50 nm. In a related embodiment, the nanoparticle is from about 5 to about 15 nm in diameter.

E. Coupling Antigen-MHC Complex with the Nanoparticle

In order to couple the substrate or nanospheres to the antigen-MHC complexes the following techniques can be applied.

The binding can be generated by chemically modifying the substrate or nanoparticle which typically involves the generation of "functional groups" on the surface, said functional groups being capable of binding to an antigen-MHC complex, and/or linking the optionally chemically modified surface of the substrate or nanoparticle with covalently or non-covalently bonded so-called "linking molecules," followed by reacting the antigen-MHC complex with the nanoparticles obtained.

The term "linking molecule" means a substance capable of linking with the substrate or nanoparticle and also capable of linking to an antigen-MHC complex.

The term "functional groups" as used herein before is not restricted to reactive chemical groups forming covalent bonds, but also includes chemical groups leading to an ionic interaction or hydrogen bonds with the antigen-MHC complex. Moreover, it should be noted that a strict distinction between "functional groups" generated at the surface and linking molecules bearing "functional groups" is not possible, since sometimes the modification of the surface requires the reaction of smaller linking molecules such as ethylene glycol with the nanosphere surface.

The functional groups or the linking molecules bearing them may be selected from amino groups, carbonic acid groups, thiols, thioethers, disulfides, guanidino, hydroxyl groups, amine groups, vicinal dioles, aldehydes, alpha-haloacetyl groups, mercury organyles, ester groups, acid halide, acid thioester, acid anhydride, isocyanates, isothiocyanates, sulfonic acid halides, imidoesters, diazoacetates, diazonium salts, 1,2-diketones, phosphonic acids, phosphoric acid esters, sulfonic acids, azolides, imidazoles, indoles, N-maleimides, alpha-beta-unsaturated carbonyl compounds, arylhalogenides or their derivatives.

Non-limiting examples for other linking molecules with higher molecular weights are nucleic acid molecules, polymers, copolymers, polymerizable coupling agents, silica, proteins, and chain-like molecules having a surface with the opposed polarity with respect to the substrate or nanoparticle. Nucleic acids can provide a link to affinity molecules containing themselves nucleic acid molecules, though with a complementary sequence with respect to the linking molecule.

A specific example of a covalent linker includes poly (ethylene) glycol (PEG). The PEG linker may be a thiol-PEG-NH$_2$ linker.

In certain embodiments, the linker as described herein has a defined size. In some embodiments, the linker is less that about 10 kD, less than about 5 kD, less than about 4.5 kD, less than about 4 kD, less than about 3.5 kD, less than about 3 kD, less than about 2.5 kD, less than about 2 kD, or less than about 1 kD. In further embodiments, the linker is from about 0.5 kD to about 5, 4.5, 4, 3.5, 3, 2.5, 2, 1.5, or 1 kD. In yet further embodiments, the linker is from about 1 to about, 4.5, 4, 3.5, 3, 2.5, 2, or 1.5 kD.

As examples for polymerizable coupling agents, diacetylene, styrene butadiene, vinylacetate, acrylate, acrylamide, vinyl compounds, styrene, silicone oxide, boron oxide, phosphorous oxide, borates, pyrrole, polypyrrole and phosphates can be cited.

The surface of the substrate or nanoparticle can be chemically modified, for instance by the binding of phosphonic acid derivatives having functional reactive groups. One example of these phosphonic acid or phosphonic acid ester derivates is imino-bis(methylenphosphono) carbonic acid which can be synthesized according to the "Mannich-Moedritzer" reaction. This binding reaction can be performed with substrate or nanosphere as directly obtained from the preparation process or after a pre-treatment (for instance with trimethylsilyl bromide). In the first case the phosphonic acid (ester) derivative may for instance displace components of the reaction medium which are still bound to the surface. This displacement can be enhanced at higher temperatures. Trimethylsilyl bromide, on the other hand, is believed to dealkylate alkyl group-containing phosphorous-based complexing agents, thereby creating new binding sites for the phosphonic acid (ester) derivative. The phosphonic acid (ester) derivative, or linking molecules bound thereto, may display the same functional groups as given above. A further example of the surface treatment of the substrate or nanosphere involves heating in a diole such as ethylene glycol. It should be noted that this treatment may be redundant if the synthesis already proceeded in a diole. Under these circumstances the synthesis product directly obtained is likely to show the necessary functional groups. This treatment is however applicable to substrate or nanoparticle that were produced in N- or P-containing complexing agents. If such substrate or particle are subjected to an after-treatment with ethylene glycol, ingredients of the reaction medium (e.g. complexing agent) still binding to the surface can be replaced by the diole and/or can be dealkylated.

It is also possible to replace N-containing complexing agents still bound to the particle surface by primary amine derivatives having a second functional group. The surface of the substrate or nanoparticle can also be coated with silica. Silica allows a relatively simple chemical conjugation of organic molecules since silica easily reacts with organic linkers, such as triethoxysilane or chlorosilane. The nanoparticle surface may also be coated by homo- or copolymers. Examples for polymerizable coupling agents are. N-(3-aminopropyl)-3-mercaptobenzamidine, 3-(trimethoxysilyl)propylhydrazide and 3-trimethoxysilyl)propylmaleimide. Other non-limiting examples of polymerizable coupling agents are mentioned herein. These coupling agents can be used singly or in combination depending on the type of copolymer to be generated as a coating.

Another surface modification technique that can be used with substrates or nanoparticles containing oxidic transition metal compounds is conversion of the oxidic transition metal compounds by chlorine gas or organic chlorination agents to the corresponding oxychlorides. These oxychlorides are capable of reacting with nucleophiles, such as hydroxy or amino groups as often found in biomolecules. This technique allows generating a direct conjugation with proteins, for instance-via the amino group of lysine side chains. The conjugation with proteins after surface modification with oxychlorides can also be effected by using a bi-functional linker, such as maleimidopropionic acid hydrazide.

For non-covalent linking techniques, chain-type molecules having a polarity or charge opposite to that of the substrate or nanosphere surface are particularly suitable. Examples for linking molecules which can be non-covalently linked to core/shell nanospheres involve anionic, cationic or zwitter-ionic surfactants, acid or basic proteins, polyamines, polyamides, polysulfone or polycarboxylic acid. The hydrophobic interaction between substrate or nanosphere and amphiphilic reagent having a functional reactive group can generate the necessary link. In particular, chain-type molecules with amphiphilic character, such as phospholipids or derivatised polysaccharides, which can be crosslinked with each other, are useful. The absorption of these molecules on the surface can be achieved by coincubation. The binding between affinity molecule and substrate or nanoparticle can also be based on non-covalent, self-organising bonds. One example thereof involves simple detection probes with biotin as linking molecule and avidin- or strepdavidin-coupled molecules.

Protocols for coupling reactions of functional groups to biological molecules can be found in the literature, for instance in "Bioconjugate Techniques" (Greg T. Hermanson, Academic Press 1996). The biological molecule (e.g., MHC molecule or derivative thereof) can be coupled to the linking molecule, covalently or non-covalently, in line with standard procedures of organic chemistry such as oxidation, halogenation, alkylation, acylation, addition, substitution or amidation. These methods for coupling the covalently or non-covalently bound linking molecule can be applied prior to the coupling of the linking molecule to the substrate or nanosphere or thereafter. Further, it is possible, by means of incubation, to effect a direct binding of molecules to correspondingly pre-treated substrate or nanoparticle (for instance by trimethylsilyl bromide), which display a modified surface due to this pre-treatment (for instance a higher charge or polar surface).

F. Protein Production

The present invention describes polypeptides, peptides, and proteins for use in various embodiments of the present invention. For example, specific peptides and their complexes are assayed for their abilities to elicit or modulate an immune response. In specific embodiments, all or part of the peptides or proteins of the invention can also be synthesized in solution or on a solid support in accordance with conventional techniques. Various automatic synthesizers are commercially available and can be used in accordance with known protocols. See, for example, Stewart and Young, Solid Phase Peptide Synthesis, $2^{nd}$. Ed., Pierce Chemical Co.l, (1984); Tam et al., J. Am. Chem. Soc., 105:6442, (1983); Merrifield, Science, 232(4748):341-347, (1986); and Barany and Merrifield, The Peptides, Gross and Meinhofer (Eds.), Academic Press, NY, 1-284, (1979), each incorporated herein by reference. Alternatively, recombinant DNA technology may be employed wherein a nucleotide sequence which encodes a peptide of the invention is inserted into an expression vector, transformed or transfected into an appropriate host cell and cultivated under conditions suitable for expression.

One embodiment of the invention includes the use of gene transfer to cells, including microorganisms, for the production of proteins. The gene for the protein of interest may be transferred into appropriate host cells followed by culture of cells under the appropriate conditions. A nucleic acid encoding virtually any polypeptide may be employed. The generation of recombinant expression vectors, and the elements included therein, are known to one skilled in the art and are briefly discussed herein. Examples of mammalian host cell lines include, but are not limited to Vero and HeLa cells, other B- and T-cell lines, such as CEM, 721.221, H9, Jurkat, Raji, as well as cell lines of Chinese hamster ovary, W138, BHK, COS-7, 293, HepG2, 3T3, RIN and MDCK cells. In addition, a host cell strain may be chosen that modulates the expression of the inserted sequences, or that modifies and processes the gene product in the manner desired. Such modifications (e.g., glycosylation) and processing (e.g., cleavage) of protein products may be important for the function of the protein. Different host cells have characteristic and specific mechanisms for the post-translational processing and modification of proteins. Appropriate cell lines or host systems can be chosen to ensure the correct modification and processing of the foreign protein expressed.

A number of selection systems may be used including, but not limited to HSV thymidine kinase, hypoxanthine-guanine phosphoribosyltransferase, and adenine phosphoribosyltransferase genes, in tk-, hgprt- or aprt-cells, respectively. Also, anti-metabolite resistance can be used as the basis of selection: for dhfr, which confers resistance to trimethoprim and methotrexate; gpt, which confers resistance to mycophenolic acid; neo, which confers resistance to the aminoglycoside G418; and hygro, which confers resistance to hygromycin.

G. Nucleic Acids

The present invention may include recombinant polynucleotides encoding the proteins, polypeptides, peptides of the invention, such as, for example, SEQ ID No. 1, 2, or 3. The nucleic acid sequences for exemplary antigens and MHC molecules for presenting the antigens, are included and can be used to prepare an antigen-MHC complex.

In particular embodiments, the invention concerns isolated nucleic acid segments and recombinant vectors incorporating nucleic acid sequences that encode an autoantigen and/or a MHC molecule. The term "recombinant" may be used in conjunction with a polypeptide or the name of a specific polypeptide, and this generally refers to a polypeptide produced from a nucleic acid molecule that has been manipulated in vitro or that is a replication product of such a molecule.

The nucleic acid segments used in the present invention, regardless of the length of the coding sequence itself, may be combined with other nucleic acid sequences, such as promoters, polyadenylation signals, additional restriction enzyme sites, multiple cloning sites, other coding segments, and the like, such that their overall length may vary considerably. It is therefore contemplated that a nucleic acid fragment of almost any length may be employed, with the total length preferably being limited by the ease of preparation and use in the intended recombinant nucleic acid protocol. In some cases, a nucleic acid sequence may encode a polypeptide sequence with additional heterologous coding sequences, for example to allow for purification of the polypeptide, transport, secretion, post-translational modification, or for therapeutic benefits such as targeting or efficacy. A tag or other heterologous polypeptide may be added to the modified polypeptide-encoding sequence, wherein "heterologous" refers to a polypeptide that is not the same as the modified polypeptide.

IV. PHARMACEUTICAL COMPOSITIONS AND ADMINISTRATION

Provided herein are pharmaceutical compositions useful for the treatment of disease.

A. Pharmaceutical Compositions

Compositions of the invention may be conventionally administered parenterally, by injection, for example, intravenously, subcutaneously, or intramuscularly. Additional formulations which are suitable for other modes of administration include oral formulations. Oral formulations include such normally employed excipients such as, for example, pharmaceutical grades of mannitol, lactose, starch, magnesium stearate, sodium saccharine, cellulose, magnesium carbonate and the like. These compositions take the form of solutions, suspensions, tablets, pills, capsules, sustained release formulations or powders and contain about 10% to about 95% of active ingredient, preferably about 25% to about 70%. The preparation of an aqueous composition that contains a antigen-MHC-nanoparticle complex that modifies the subject's immune condition will be known to those of skill in the art in light of the present disclosure. In certain embodiments, a composition may be inhaled (e.g., U.S. Pat. No. 6,651,655, which is specifically incorporated by reference in its entirety). In one embodiment, the antigen-MHC-nanoparticle complex is administered systemically.

Typically, compositions of the invention are administered in a manner compatible with the dosage formulation, and in such amount as will be therapeutically effective and immune modifying. The quantity to be administered depends on the subject to be treated. Precise amounts of active ingredient required to be administered depend on the judgment of the practitioner. However, suitable dosage ranges are of the order of ten to several hundred nanograms or micrograms antigen-MHC-nanoparticle complex per administration. Suitable regimes for initial administration and boosters are also variable, but are typified by an initial administration followed by subsequent administrations.

In many instances, it will be desirable to have multiple administrations of a peptide-MHC-nanoparticle complex, about, at most about or at least about 3, 4, 5, 6, 7, 8, 9, 10 or more. The administrations will normally range from 2 day to twelve week intervals, more usually from one to two week intervals. Periodic boosters at intervals of 0.5-5 years, usually two years, may be desirable to maintain the condition of the immune system. The course of the administrations may be followed by assays for inflammatory immune responses and/or autoregulatory anti-inflammatory T cell activity.

In some embodiments, pharmaceutical compositions are administered to a subject. Different aspects of the present invention involve administering an effective amount of a antigen-MHC-nanoparticle complex composition to a subject. Additionally, such compositions can be administered in combination with modifiers of the immune system. Such compositions will generally be dissolved or dispersed in a pharmaceutically acceptable carrier or aqueous medium.

The phrases "pharmaceutically acceptable" or "pharmacologically acceptable" refer to molecular entities and compositions that do not produce an adverse, allergic, or other untoward reaction when administered to an animal, or human. As used herein, "pharmaceutically acceptable carrier" includes any and all solvents, dispersion media, coatings, antibacterial and antifungal agents, isotonic and absorption delaying agents, and the like. The use of such media and agents for pharmaceutical active substances is well known in the art. Except insofar as any conventional media or agent is incompatible with the active ingredients, its use in immunogenic and therapeutic compositions is contemplated.

The pharmaceutical forms suitable for injectable use include sterile aqueous solutions or dispersions; formulations including sesame oil, peanut oil, or aqueous propylene glycol; and sterile powders for the extemporaneous preparation of sterile injectable solutions or dispersions. In all cases the form must be sterile and must be fluid to the extent that it may be easily injected. It also should be stable under the conditions of manufacture and storage and must be preserved against the contaminating action of microorganisms, such as bacteria and fungi.

The compositions may be formulated into a neutral or salt form. Pharmaceutically acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

The carrier may be a solvent or dispersion medium containing, for example, water, ethanol, polyol (for example, glycerol, propylene glycol, and liquid poly(ethylene glycol), and the like), suitable mixtures thereof, and vegetable oils. The proper fluidity can be maintained, for example, by the use of a coating, such as lecithin, by the maintenance of the required particle size in the case of dispersion, and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with various of the other ingredients enumerated above, as required, followed by sterilization. Sterilization of the solution will be done in such a way as to not diminish the therapeutic properties of the antigen-MHC-nanoparticle complex. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques, which yield a powder of the active ingredient, plus any additional desired ingredient from a previously sterilized solution thereof. One such method of sterilization of the solution is sterile filtration, however, this invention is meant to include any method of sterilization that does not significantly decrease the therapeutic properties of the antigen-MHC-nanoparticle complexes. Methods of sterilization that involve intense heat and pressure, such as autoclaving, may compromise the tertiary structure of the complex, thus significantly decreasing the therapeutic properties of the antigen-MHC-nanoparticle complexes.

An effective amount of therapeutic composition is determined based on the intended goal. The term "unit dose" or "dosage" refers to physically discrete units suitable for use in a subject, each unit containing a predetermined quantity of the composition calculated to produce the desired responses discussed above in association with its administration, i.e., the appropriate route and regimen. The quantity to be administered, both according to number of treatments and unit dose, depends on the result and/or protection desired. Precise amounts of the composition also depend on the judgment of the practitioner and are peculiar to each individual. Factors affecting dose include physical and clinical state of the subject, route of administration, intended goal of treatment (alleviation of symptoms versus cure), and potency, stability, and toxicity of the particular composition. Upon formulation, solutions will be administered in a manner compatible with the dosage formulation and in such amount as is therapeutically or prophylactically effective. The formulations are easily administered in a variety of dosage forms, such as the type of injectable solutions described above.

B. Combination Therapy

The compositions and related methods of the present invention, particularly administration of a antigen-MHC-nanoparticle complex, may also be used in combination with the administration of traditional therapies. These include, but are not limited to, anti-inflammatory drugs such as sulfasalazine, corticosteroids such as prednisone, and immune system suppressors such as azathioprine and mercaptopurine. An antibiotic, such as metronidazole, may also be helpful for killing germs in the intestines.

To help treat symptoms, a doctor may recommend anti-diarrheals, laxatives, pain relievers or other over-the-counter (OTC) drugs. Steroids are generally used for people who have more severe form of Crohn's disease. In more aggressive disease, steroids may be used with immunosuppressants or with a newer medicine called infliximab.

When combination therapy is employed, various combinations may be employed, for example antigen-MHC-nanoparticle complex administration is "A" and the additional agent is "B".

| A/B/A | B/A/B | B/B/A | A/A/B | A/B/B | B/A/A | A/B/B/B | B/A/B/B |
|-------|-------|-------|-------|-------|-------|---------|---------|
| B/B/B/A |  | B/B/A/B | A/A/B/B | A/B/A/B | A/B/B/A/ | B/B/A/A | |
| B/A/B/A |  | B/A/A/B | A/A/A/B | B/A/A/A | A/B/A/A | A/A/B/A | |

Administration of the peptide-MHC complex compositions of the present invention to a patient/subject will follow general protocols for the administration of such compounds, taking into account the toxicity, if any. It is expected that the treatment cycles would be repeated as necessary. It also is contemplated that various standard therapies, such as hydration, may be applied in combination with the described therapy.

C. In Vitro or Ex Vivo Administration

As used herein, the term in vitro administration refers to manipulations performed on cells removed from or outside of a subject, including, but not limited to cells in culture. The term ex vivo administration refers to cells which have been manipulated in vitro, and are subsequently administered to a subject. The term in vivo administration includes all manipulations performed within a subject, including administrations.

In certain aspects of the present invention, the compositions may be administered either in vitro, ex vivo, or in vivo. In certain in vitro embodiments, autologous T cells are incubated with compositions of this invention. The cells or tissue can then be used for in vitro analysis, or alternatively for ex vivo administration.

V. EXAMPLES

The following examples are given for the purpose of illustrating various embodiments of the invention and are not meant to limit the present invention in any fashion. One skilled in the art will appreciate readily that the present invention is well adapted to carry out the objects and obtain the ends and advantages mentioned, as well as those objects, ends and advantages inherent herein. The present examples, along with the methods described herein are presently representative of embodiments and are exemplary, and are not intended as limitations on the scope of the invention. Changes therein and other uses which are encompassed within the spirit of the invention as defined by the scope of the claims will occur to those skilled in the art.

Example 1

Figure 1A:
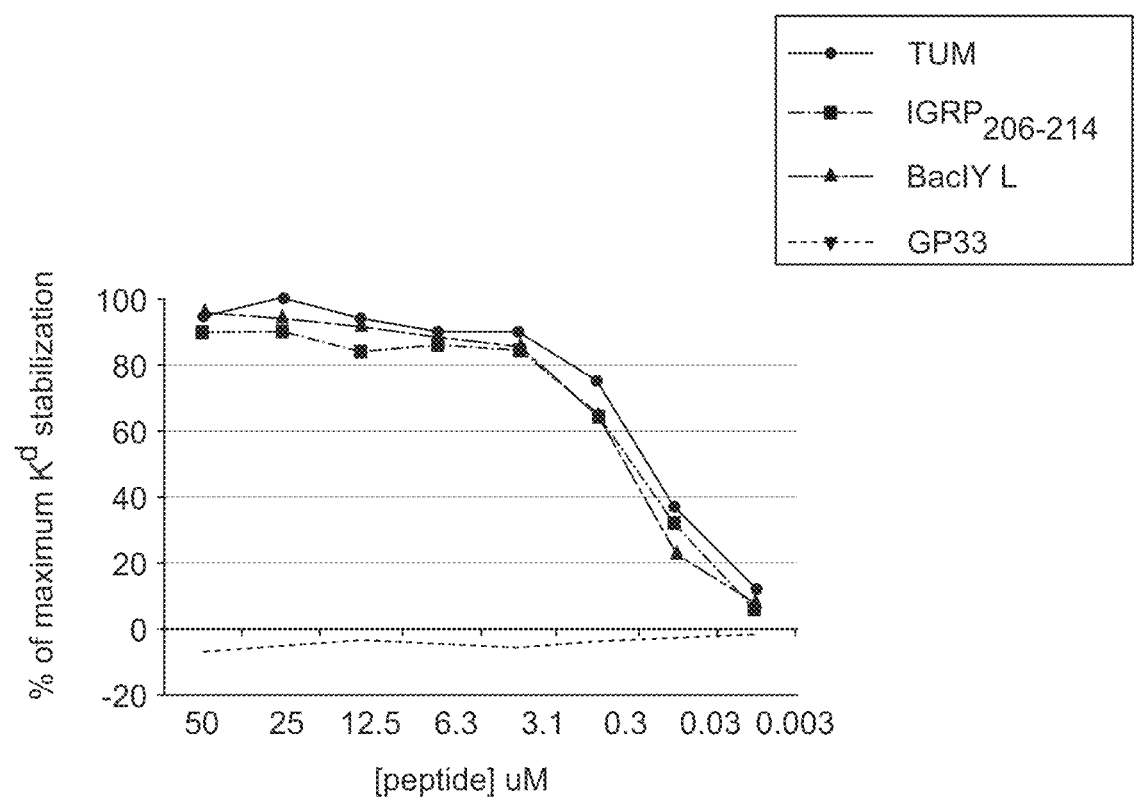

*Bacteroides* Integrase as an Antigenic Target of Memory-Like Autoregulatory T-Cells It was investigated whether a novel epitope of *Bacteroides* Integrase (BacIYL: SEQ ID No. 1) could bind to the NOD mouse major histocompatibility complex class I molecule H-2K$^d$ over a range of concentrations, as compared to TUM (a positive control), IGRP$_{206-214}$, and LCMV-encoded Gp33 (a D$^b$-binding negative control). As shown in FIG. 1A, the BacIYL sequence (SEQ ID No. 1) bound K$^d$ molecules on the surface of Transporter-Associated with Antigen-Processing (TAP)-deficient RMA-SK$^d$ cells as efficiently as IGRP$_{206-214}$ and TUM.

Figure 1B:
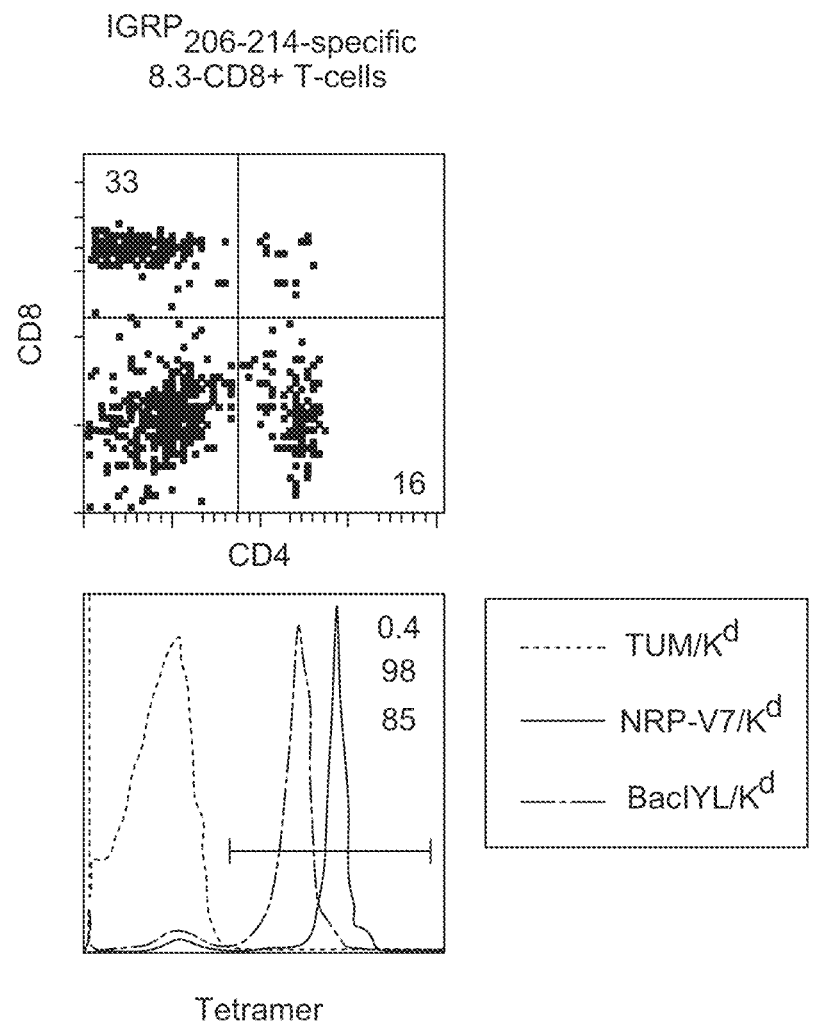

To ascertain if the BacIYL/K$^d$ peptide-MHC (pMHC) complex could be recognized by IGRP$_{206-214}$-reactive CD8+ T-cells, naive splenic CD8+ T-cells from 8.3-TCR-transgenic NOD mice (8.3-NOD) were stained with fluorochrome-conjugated TUM/K$^d$ (negative control), NRP-V7/K$^d$ (positive control) and BacIYL/K$^d$ pMHC tetramers. As shown in FIG. 1B, 8.3-CD8+ T-cells bound Bac-IYL/Kd tetramers efficiently, albeit with lower mean fluorescence intensity (mfi) as IGRP$_{206-214}$/K$^d$ tetramers, suggesting that the 8.3-TCR binds this pMHC complex with low affinity. This was confirmed by carrying out Scatchard plot analyses of tetramer binding at equilibrium. As shown in FIG. 1C, Bac-IYL/Kd tetramers bound 8.3-CD8+ T-cells with ~2-fold lower avidity.

Figure 2A:
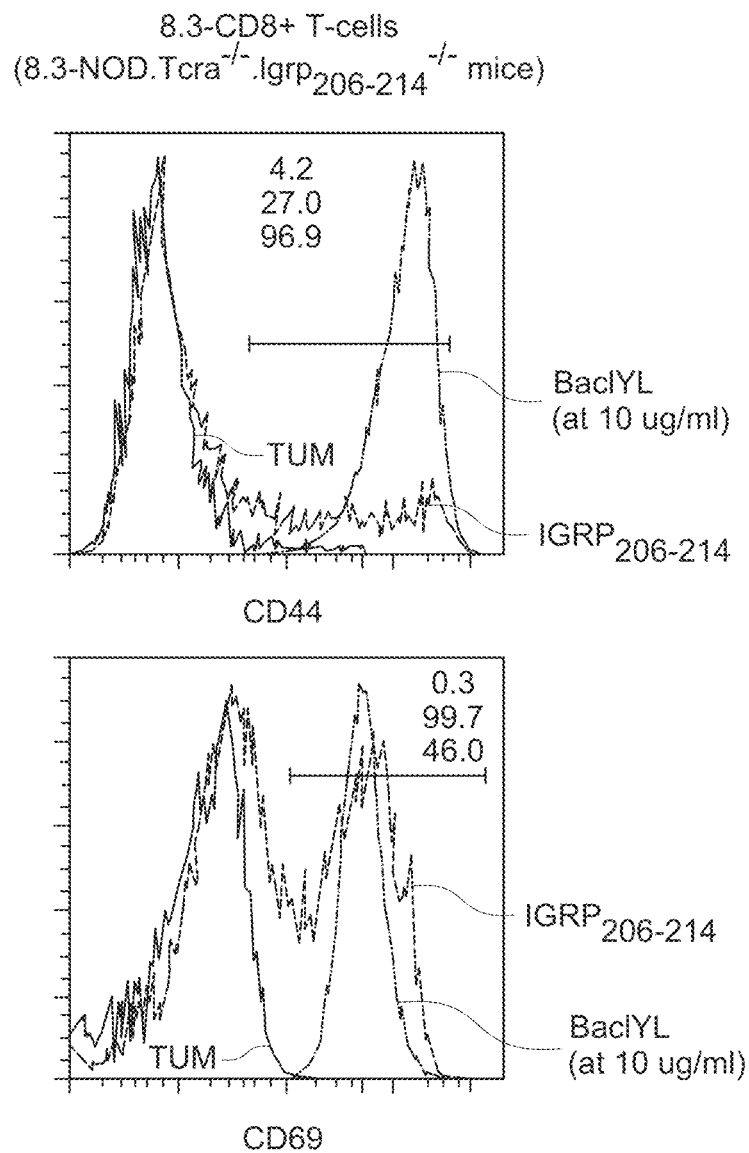
FIG. 2A-2D show that BacIYL functions as an antagonist in isolation, but as a partial agonist in the presence of LPS and its donor protein is effective cross-presented by dendritic cells. A, expression of CD44 and CD69 in 8.3-CD8+ T-cells cultured in the presence of BacIYL, $IGRP_{206\text{-}214}$ (positive control) or TUM (negative control). B, Antagonism assay. TUM is used as a negative control. Note how increasing concentrations of BacIYL (but not TUM, a negative control that binds K$^d$) antagonize IGRP$_{206-214}$-induced 8.3-CD8+ T-cell responses (IFNg secretion, top; and proliferation, bottom). C, BacIYL functions as an agonist in the presence of LPS. NTG, non-transgenic (CD8+ T-cells). D, DCs can process BacIYL or BAC$_{IGRP206-214}$-like epitopes from recombinant wild-type integrase or recombinant mutant Integrase (where the BacIYL epitope is mutated to encode IGRP$_{206-214}$).

To investigate if the Bac-IYL sequence had agonistic activity on naive 8.3-CD8+ T-cells, naive 8.3-CD8+ T-cells were cultured with TUM (negative control), IGRP$_{206-214}$ (positive control) and Bac-IYL for 24h. Unlike IGRP$_{206-214}$, which elicited upregulation of both CD44 and CD69, Bac-IYL was only able to induce CD69 upregulation (FIG. 2A). This indicated that Bac-IYL had partial agonistic activity, consistent with the low-binding avidity of the corresponding tetramers seen in FIG. 1C. Since differentiated 8.3-cytotoxic T-lymphocytes (8.3-CTL) do not kill BacIYL-pulsed targets or Integrase-encoding cDNA-transfected HEK293-K$^d$ cells these data show that BacIYL can bind to and 'tickle' the 8.3-TCR without driving most T-cell activation programs downstream of the TCR.

Figure 2B:
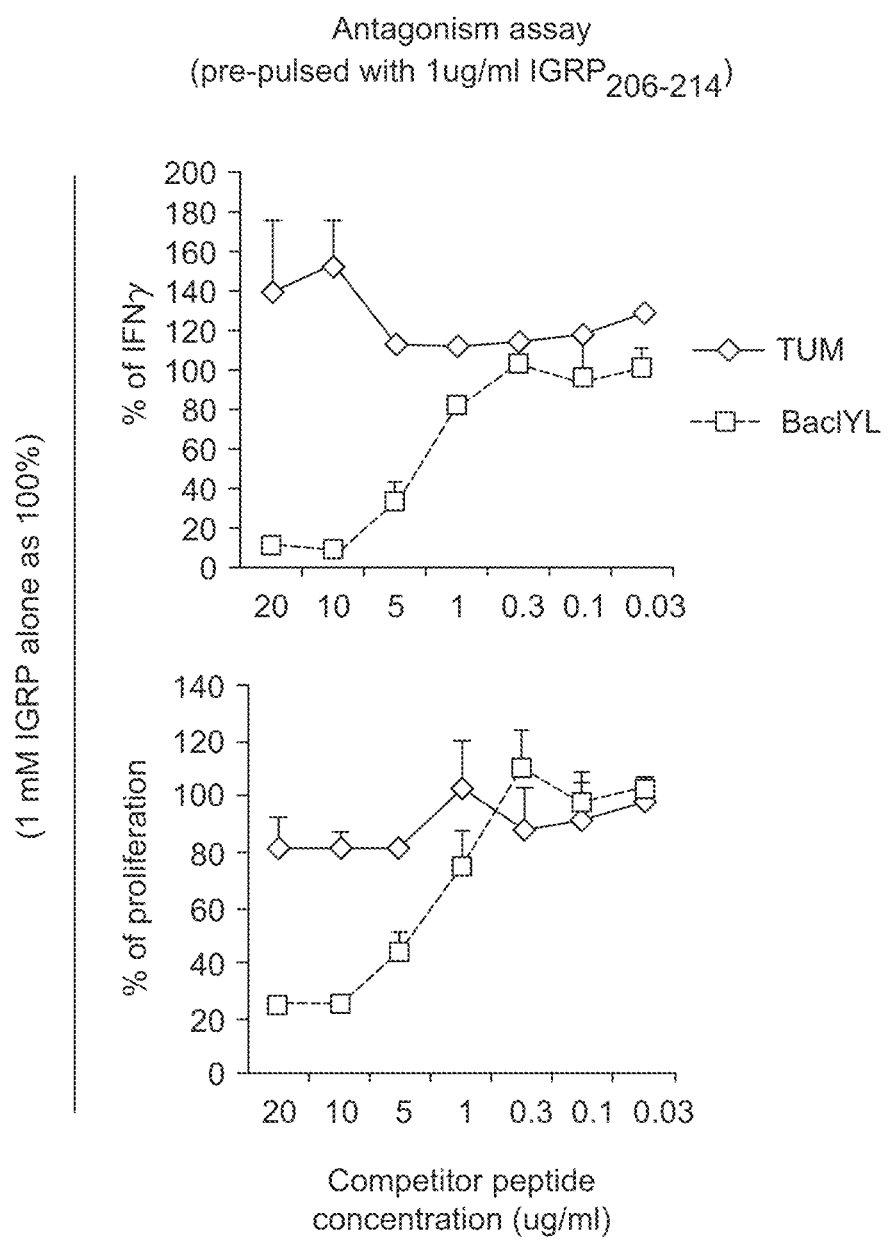

Because certain low-avidity TCR-binding ligands have antagonistic properties (in addition to partial agonistic activity at higher ligand densities), it was investigated whether Bac-IYL might be able to antagonize IGRP$_{206-214}$-induced 8.3-CD8+ T-cell responses. As shown in FIG. 2B, Bac-IYL but not TUM (a K$^d$-binding peptide that is not recognized by the 8.3-TCR) was able to antagonize IGRP$_{206-214}$-induced 8.3-CD8+ T-cell responses (IFNγ secretion and proliferation) over a range of concentrations (above 1 uM). Thus, when presented to 8.3-CD8+ T-cells in isolation, Bac-IYL binds to 8.3-like TCRs with low avidity, antagonizes agonist-induced responses at relatively low ligand densities, and induces partial agonistic responses at high ligand densities.

Figure 2C:
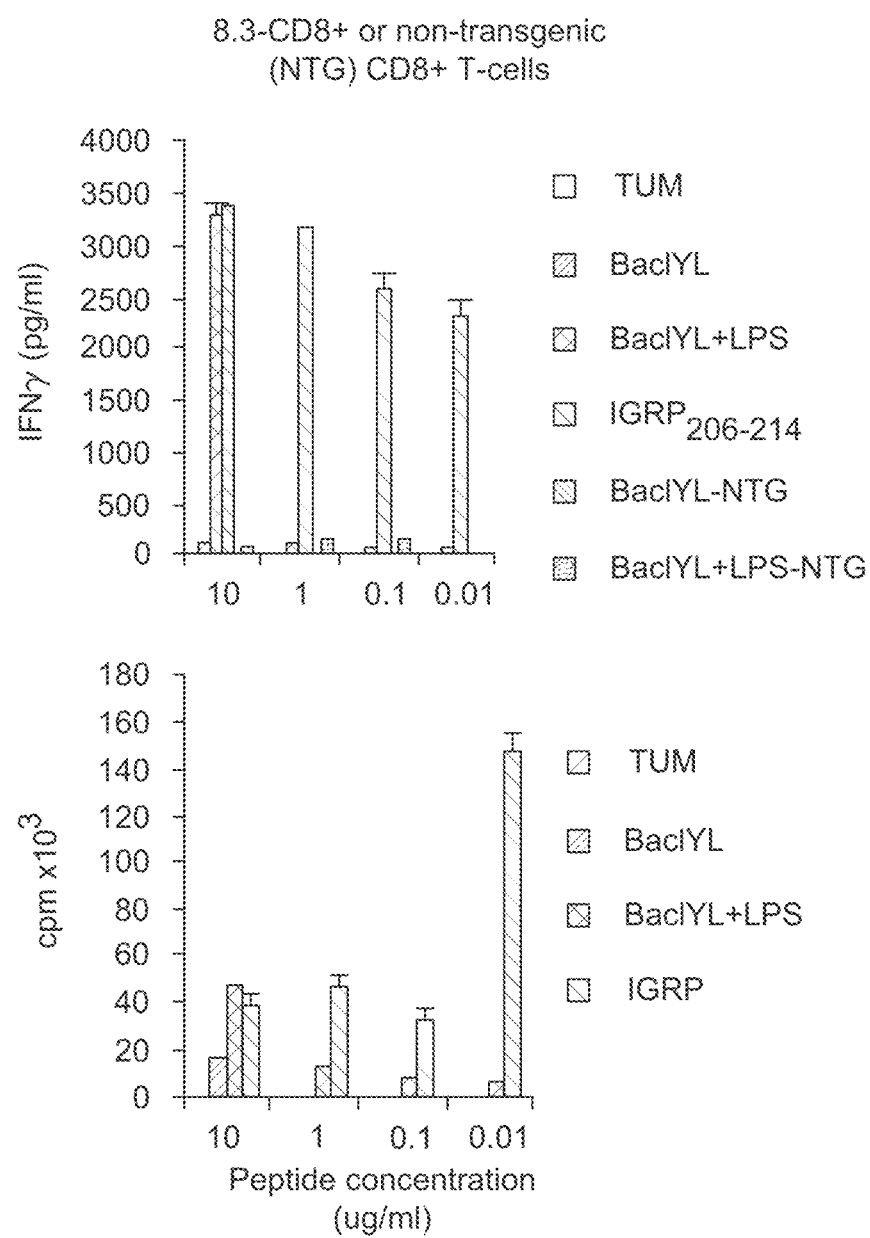

Without being bound by theory, it was then believed that in vivo, Bac-IYL, encoded in prevalent gut bacterial strains, would not be presented in isolation, but rather in the context of bacterial toll-like receptor ligands, such as LPS. This, in turn, might abrogate the antagonistic properties of Bac-IYL and afford it agonistic activity. In agreement with this hypothesis, naive 8.3-CD8+ T-cells mounted efficient IFNγ and proliferative responses to Bac-IYL in the presence of LPS (FIG. 2C).

Figure 2D:
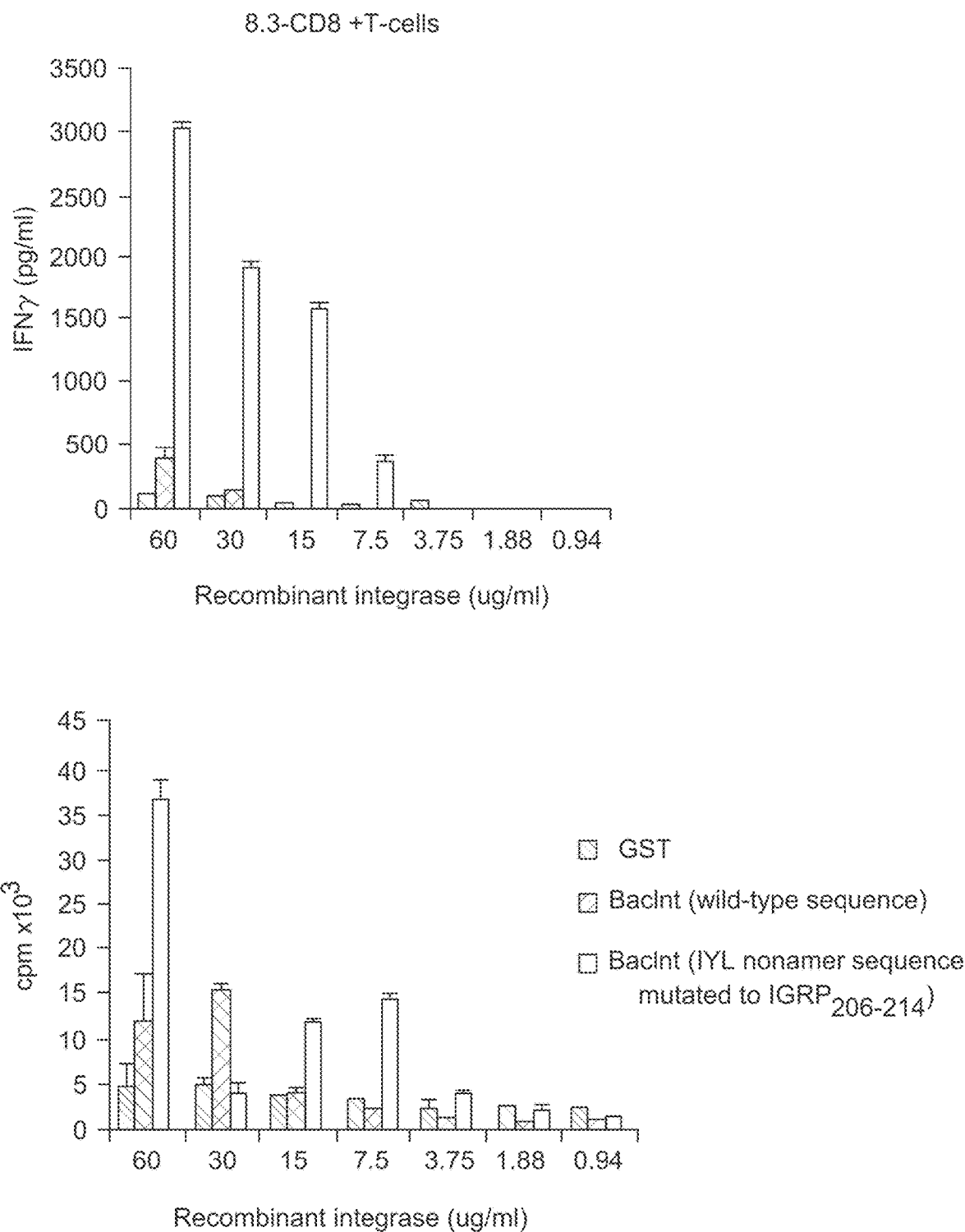

Antigenic peptides encoded in bacteria must be processed from the donor full-length protein by professional antigen-presenting cells (APCs, such as dendritic cells -DCs-). In the case of the Bac-IYL peptide, its donor protein, the *Bacteroides* Integrase, would have to be processed by the proteasome and the resulting peptides shuttled to the ER for binding to endogenous MHC (Kd) molecules, which would then be transported to the APC's plasma membrane for exposure to T-cells. To investigate if DCs could process *Bacteroides* Integrase protein and generate Bac-IYL/K$^d$ complexes capable of eliciting 8.3-CD8+ T-cell activation, recombinant GST-fused Integrase preparations encoding the wild-type Bac-IYL sequence or a mutated Bac-IYL epitope identical to IGRP$_{206-214}$ were produced and purified. DCs were then then fed the recombinant proteins (in the presence of LPS) and 8.3-CD8+ T-cells, to measure 8.3-CD8+ T-cell activation. As shown in FIG. 2D, both types of recombinant Integrase preparations induced 8.3-CD8+ T-cell activation, particularly the one encoding IGRP$_{206-214}$, as expected. Thus, DCs can process *Bacteroides* Integrase and generate epitopes capable of activating cognate T-cells.

Figure 3A:
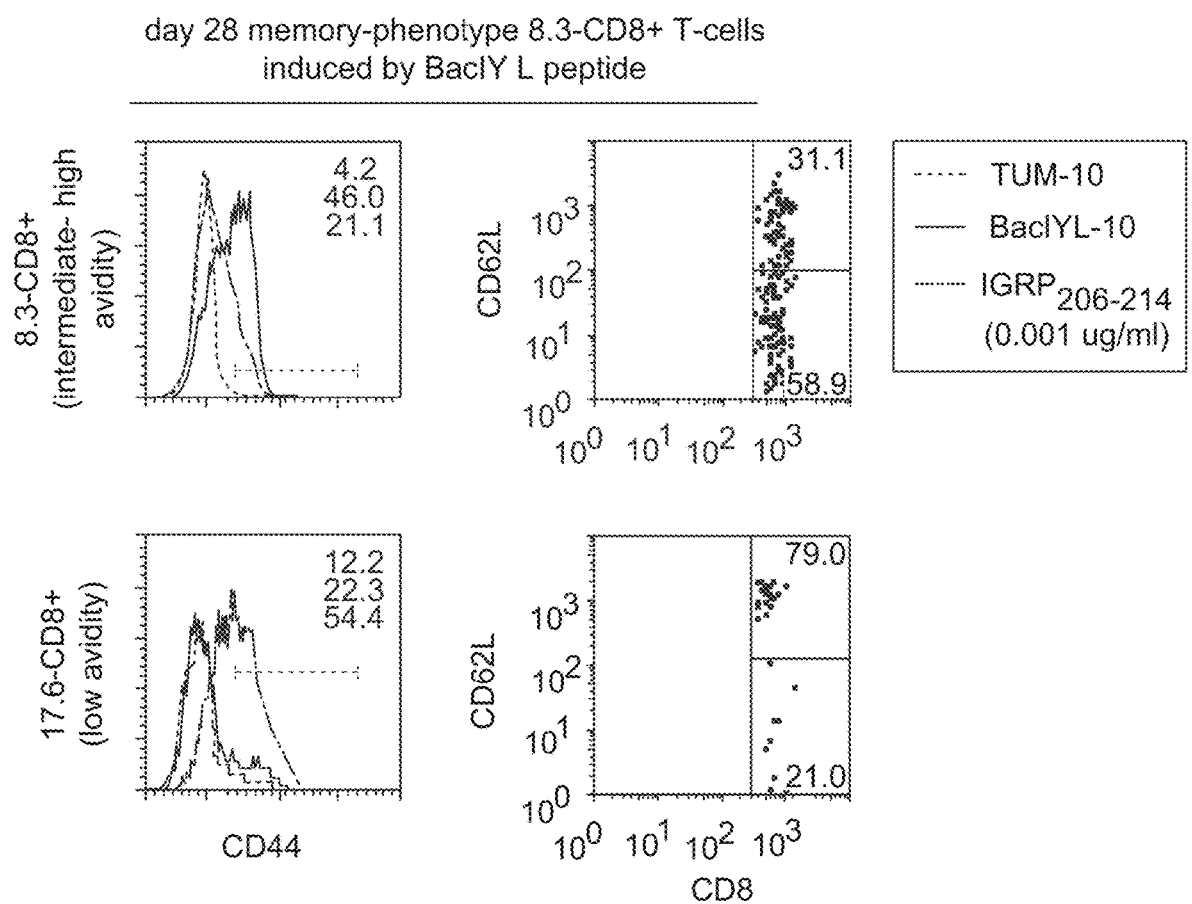
FIG. 3A-3D show that the BacIYL peptide induces memory CD8+ T-cell formation in vitro. A and B, Phenotype of 8.3-CD8+ T-cells 28 days after culture in the presence of peptide-pulsed (10 or 0.001 ug/ml) DCs. 17.6-CD8+ T-cells are very low avidity IGRP$_{206-214}$-specific CD8+ T-cells; as expected they remain naive after 28 days in culture with BacIYL. C, Intracellular IFNγ content in response to peptide challenge. BacIYL-cultured 8.3-CD8+ T-cells rapidly produce IFNγ in response to IGRP$_{206-214}$ stimulation. D, Secretion of IFNγ by, and proliferation of memory-like 8.3-CD8+ T-cells (induced by BacIYL) in response to peptide challenge.
Figure 3B:
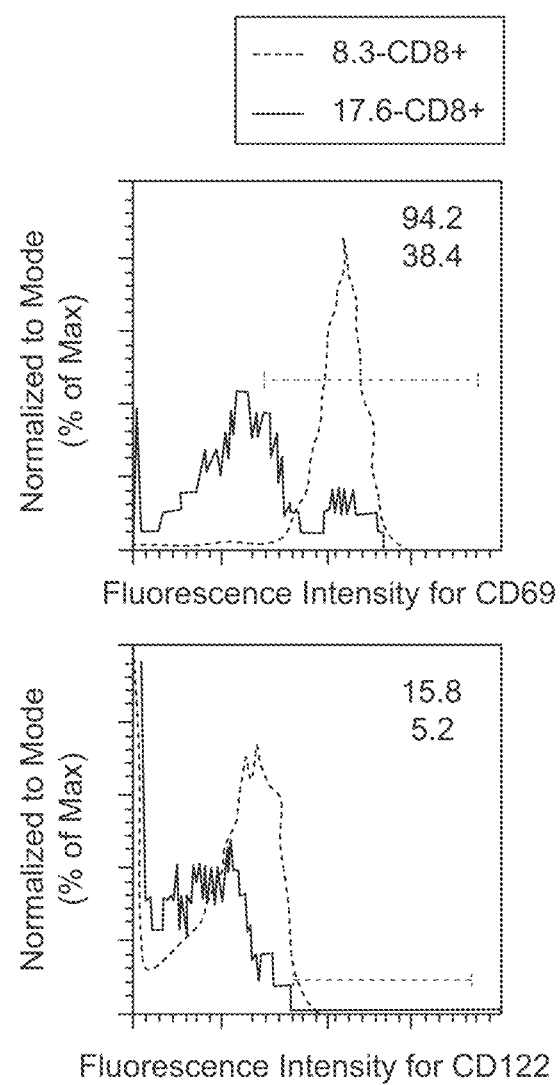
Figure 3C:
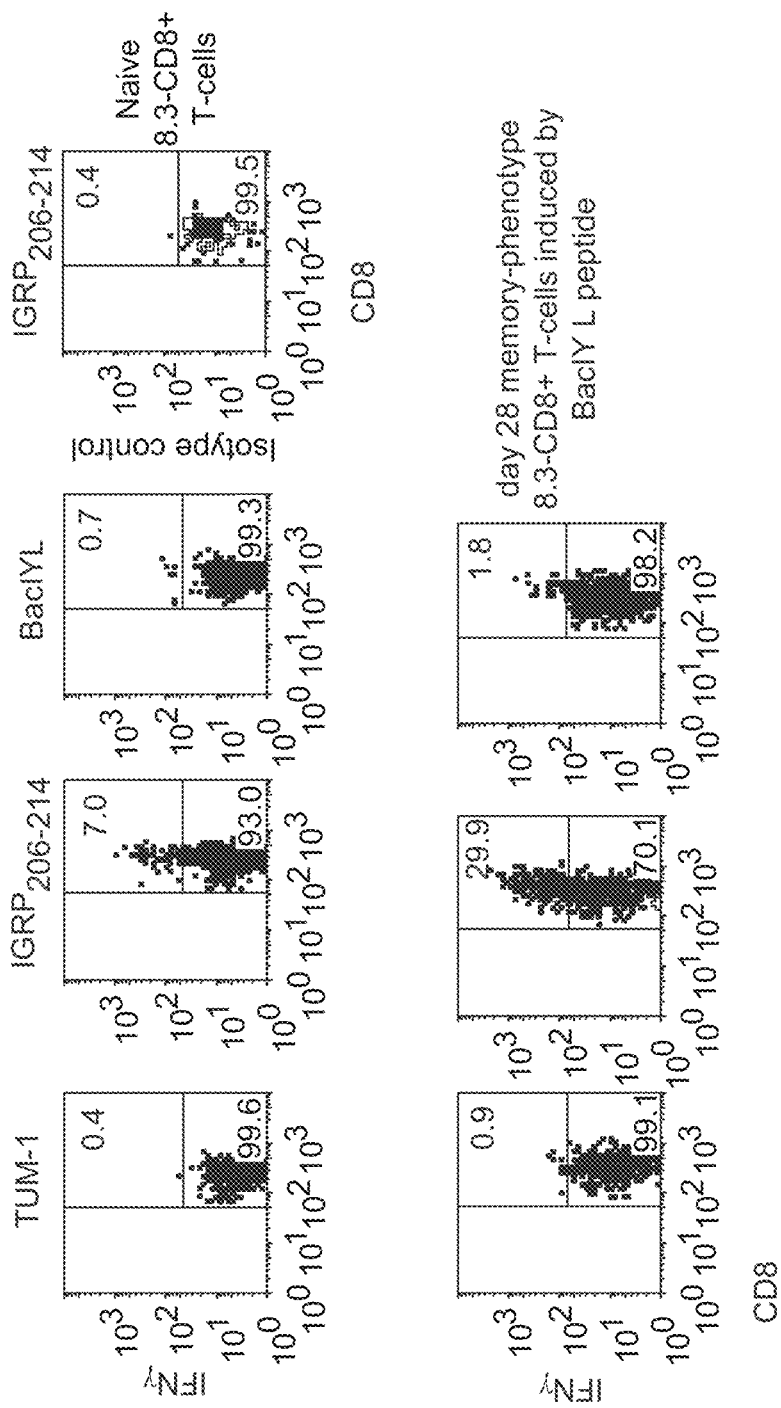
Figure 3D:
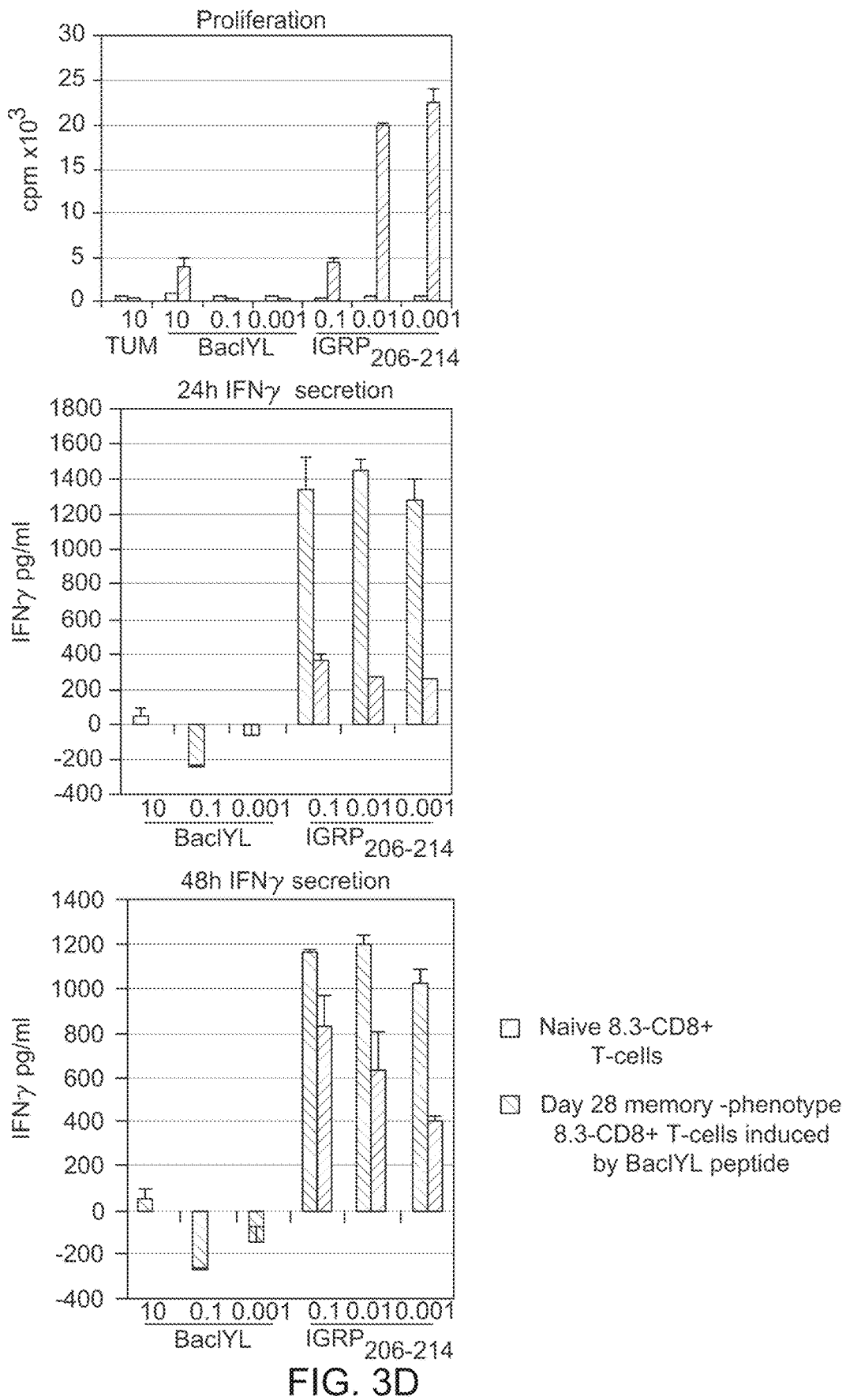

Because low-avidity autoreactive T-cells tend to differentiate into memory-like anergic (non-proliferating, but cytokine-secreting) autoregulatory (autoimmune disease-suppressing) T-cells in response to chronic autoantigenic stimulation, it was contemplated that Bac-IYL might be able to induce memory-like 8.3-CD8+ T-cells in vitro. As shown in FIG. 3A, 8.3-CD8+ T-cells (but not low-avidity IGRP206-214-reactive 17.6-CD8+ T-cells) cultured in the presence of Bac-IYL peptide for 28 days expressed the late T-cell activation marker CD44 and low levels of the naive T-cell marker CD62L. In addition, these cells expressed the early activation marker CD69 and CD122, a memory T-cell marker (FIG. 3B). Functionally, these cells behaved like memory T-cells. Thus, they rapidly produced IFNg in response to agonist (IGRP$_{206-214}$)-pulsed DCs (FIGS. 3C and D). However, unlike conventional memory-like CD8+ T-cells, and like autoregulatory CD8+ T-cells, they displayed proliferative unresponsiveness (anergy) as compared to naive 8.3-CD8+ T-cells (FIG. 3D). Accordingly, these Bac-IYL-activated CD8+ T-cells have all the hallmarks of the autoregulatory CD8+ T-cells that arise spontaneously, in vivo, in response to chronic autoantigenic stimulation.

It has been documented that TCRa–/– mice can develop spontaneous IBD (see, for example, Mombaerts, P., et al. (1993) *Cell* 75:274-282.) or DSS-induced IBD (see, for example, Mahler, M., et al. (1998) *Am J Physiol* 274:G544-551.) and the NOD strain is also susceptible to DSS-induced IBD (see, for example, Mahler, M., et al. (1998) *Am J Physiol* 274:G544-551.). Several factors such as genetic, environmental, composition of the gut microbial flora, the structure of the intestinal epithelial layer as well as elements of the innate and adaptive immune systems are all known to contribute to the initiation, progression and regulation of IBD, albeit through poorly understood mechanisms. IBD is defined as inflammation underneath the mucosal and epithelia layers of the gut wall (see, for example, Nell, S., et al. *Nat Rev Microbiol* 8:564-577; Maloy, K. J., et al. *Nature*

474:298-306; Khor, B., et al. *Nature* 474:307-317; and Kaser, A., et al. (2010) *Annu Rev Immunol* 28:573-621.). To investigate the biological significance of BacIYL$_{36-44}$ recognition by cognate CD8+ T-cells in the context of IBD, Applicants compared the susceptibility of 8.3- vs. 17.6-TCR-transgenic NOD.IGRP$_{206-214}$$^{-/-}$ mice (carrying IGRP$_{206-214}$-specific CD8+ T-cells capable of recognizing or not recognizing BacIYL$_{36-44}$, respectively). Mice were exposed to 2% DSS in the drinking water for 1 wk, to compromise gut epithelial integrity and expose the gut microbiota to the gut-associated lymphoid tissue (GALT) without inducing overt disease (bleeding or weight loss). After an additional week on 0% DSS, these mice were exposed to three cycles of 3.5% DSS (wk 1)/0% DSS (wk 2 and 3). As shown in FIGS. 4A, 4B and 4E, 8.3-NOD mice exhibited significant resistance to colitis and no mortality as compared to 17.6-NOD mice, suggesting that in vivo activation of 8.3-CD8+ cells by the Bac-IYL$_{36-44}$ epitope rendered the hosts resistant to colitis. Furthermore, 8.3-NOD mice lacking integrin β7 were highly susceptible to colitis (FIGS. 4C, 4D and 4F). These results support the idea that 8.3-CD8+ T-cells' anti-colitogenic effect requires recruitment to the GALT.

The above data predicted that NOD.IGRP$_{206-214}$$^{-/-}$ mice, which export increased numbers of high-avidity IGRP$_{206-214}$-reactive (BacIYL$_{36-44}$ cross-reactive) CD8+ cells to the periphery, should display a relative resistance to DSS-induced colitis vs. wild-type NOD mice, in which a significant fraction of these higher-avidity CD8+ T-cells are deleted. Indeed, as shown in FIG. 4G, NOD.IGRP$_{206-214}$$^{-/-}$ mice, unlike NOD mice, were resistant to weight loss resulting from 4% DSS. To directly investigate a role for a cytotoxic CD8+ T-cell response against BacIYL$_{36-44}$-loaded APCs in colitis resistance, 4% DSS was fed to NOD.I-GRP$_{206-214}$$^{-/-}$ hosts along with i.v. injections of in vitro-differentiated 8.3-CTL (cytotoxic T lymphocytes). As shown in FIG. 4H, 8.3-CTL-transfused hosts had lower disease activity scores than non-transfused mice.

Figure 5A:
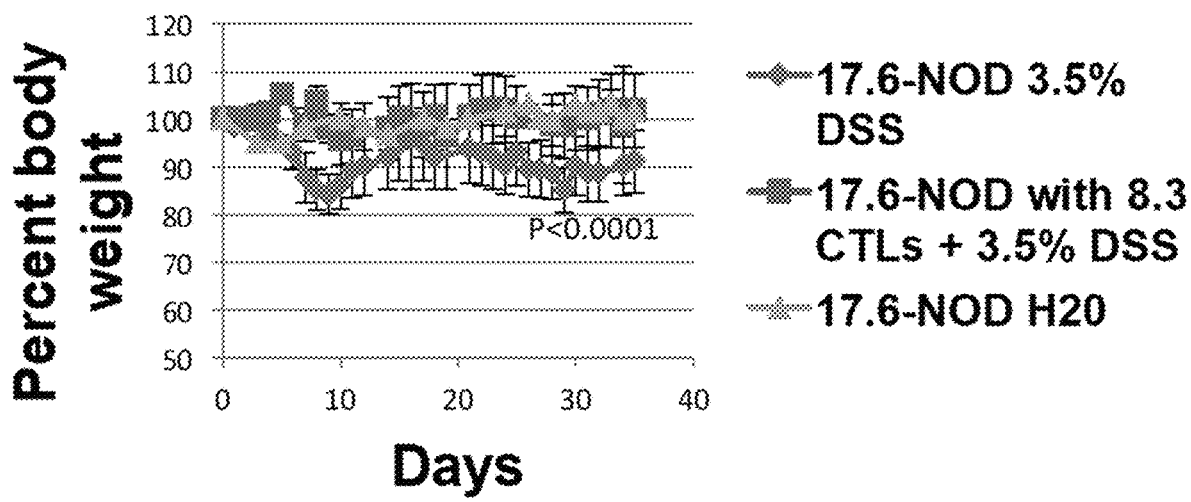
FIG. 5A-5B shows BacIYL$_{36-44}$-reactive CD8+ CTL protect 17.6-NOD mice from DSS-induced colitis.
Figure 5B:
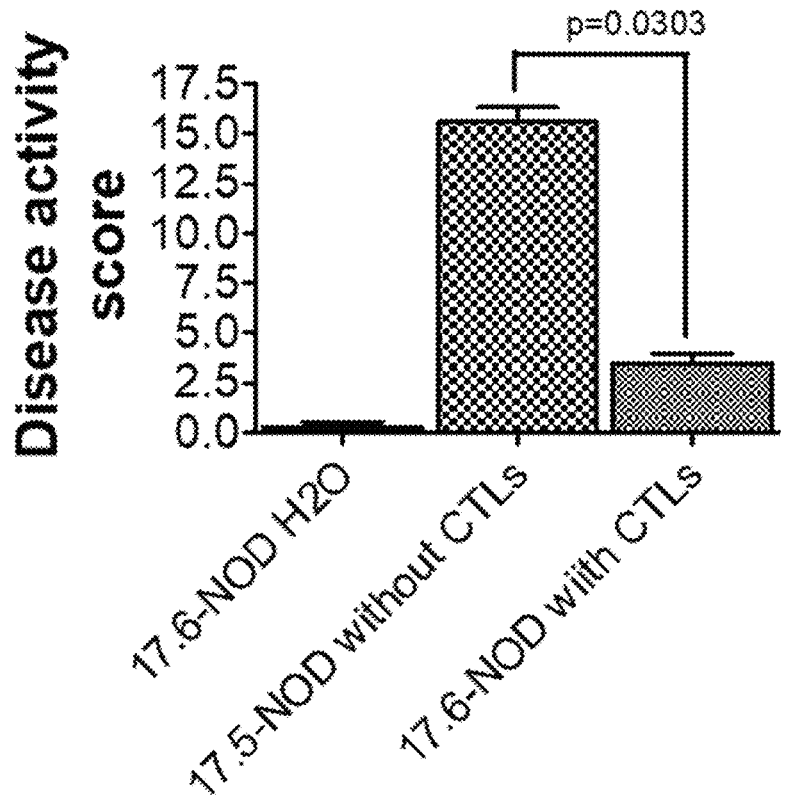

To further substantiate these results, Applicants ascertained the ability of 8.3-CTL to protect 17.6-NOD mice, which are highly susceptible to DSS-induced colitis, from disease. As shown in FIG. 5A, 8.3-CTL-transferred 17.6-NOD mice (one CTL transfer per week) did not significantly lose weight over a 35-day follow-up, as compared to non-CTL-transferred 17.6-NOD mice. Furthermore, 8.3-CTL transfer significantly reduced the disease activity scores in these animals (FIG. 5B). Together, these data support the idea that a CTL response against a gut bacterial epitope affords resistance to colitis. Accordingly, approaches capable of eliciting in the in vivo activation and expansion of gut microbiota-specific CTLs should have therapeutic significance in IBD.

Figure 6:
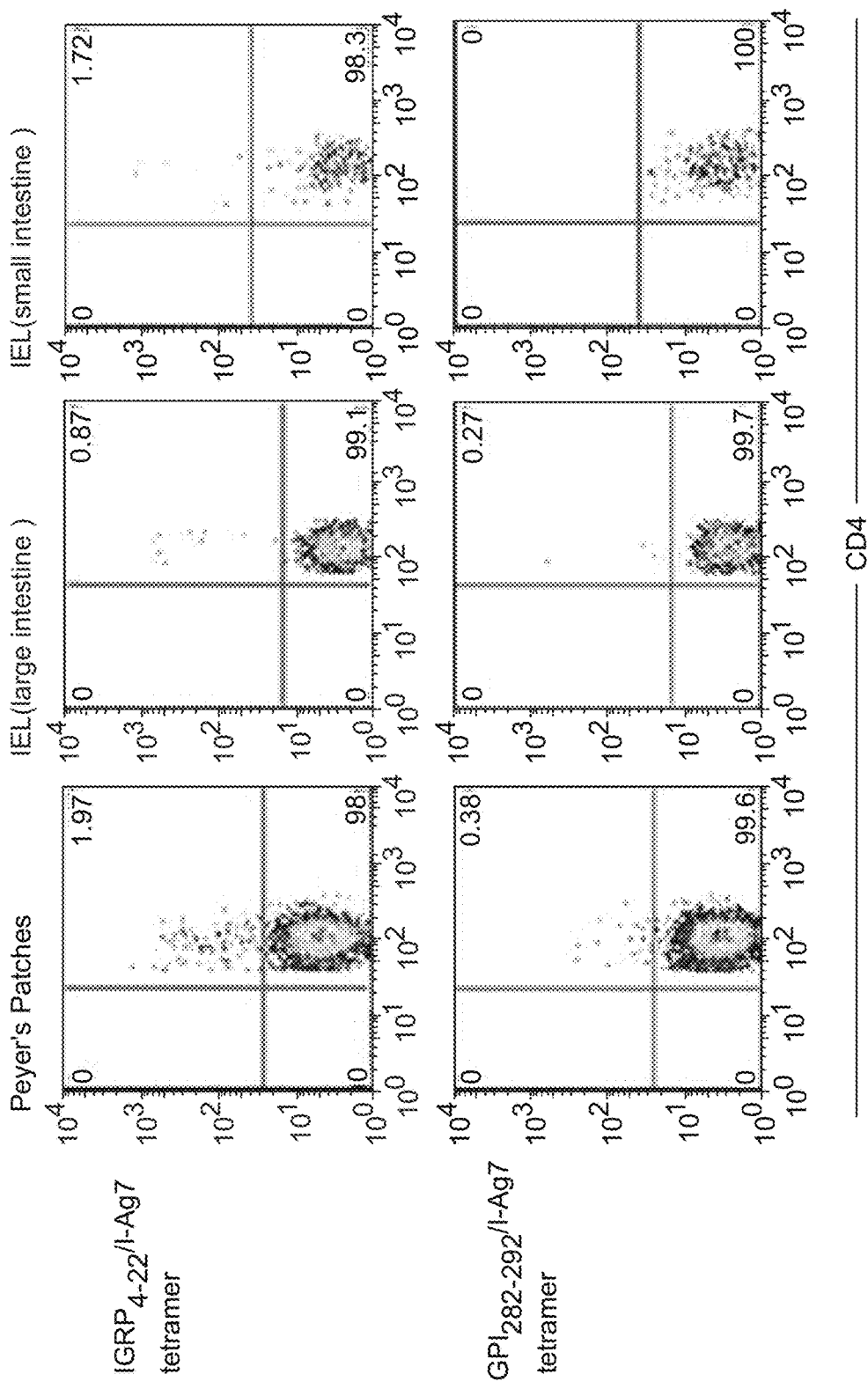
FIG. 6 demonstrates the recruitment of Tr1-like autoregulatory CD4+ T-cells to gut-associated lymphoid tissue in IGRP$_{4-22}$/I-A$^{g7}$-NP-treated NOD mice. Data on two mice are shown.
Figure 6:
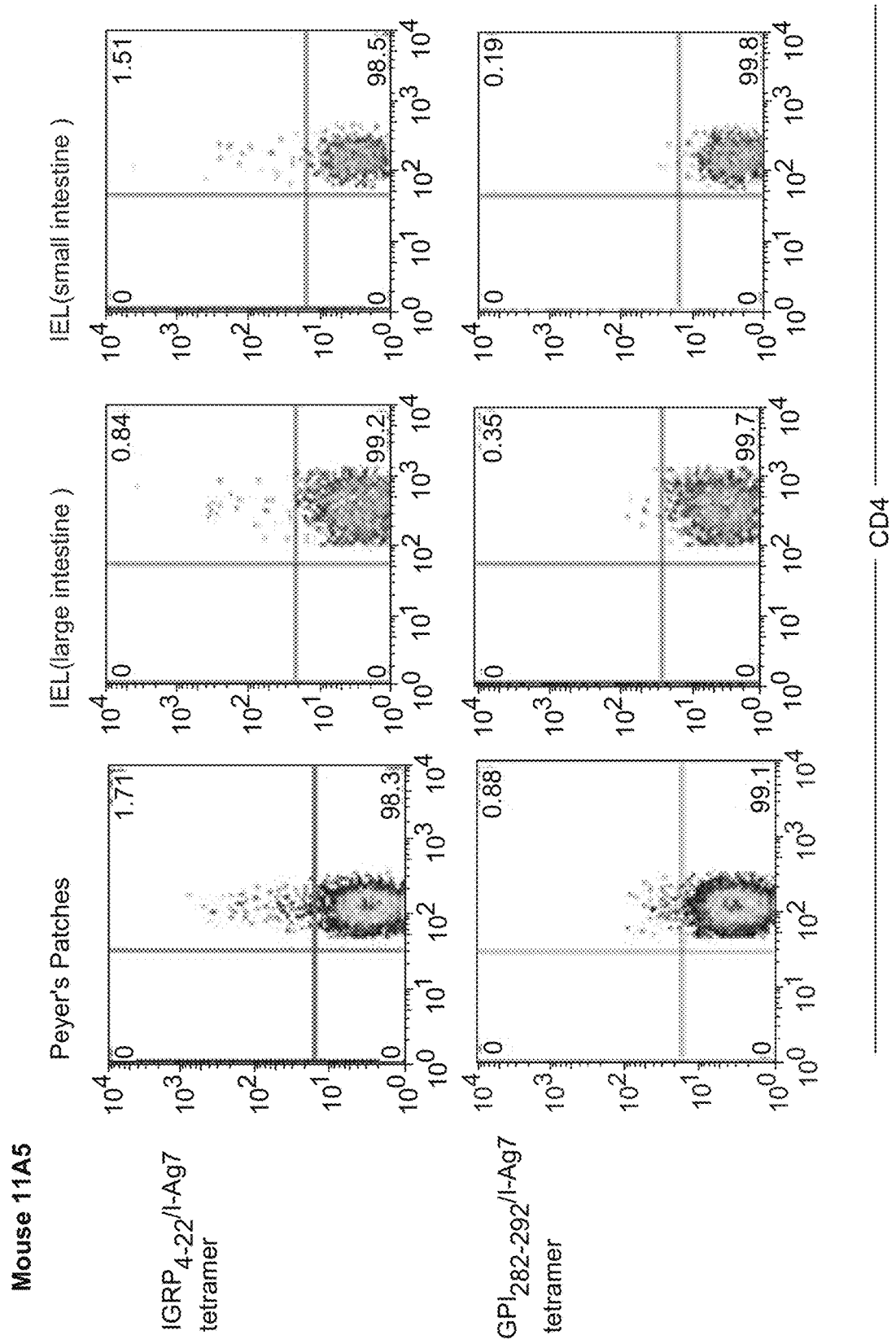
Figure 7:
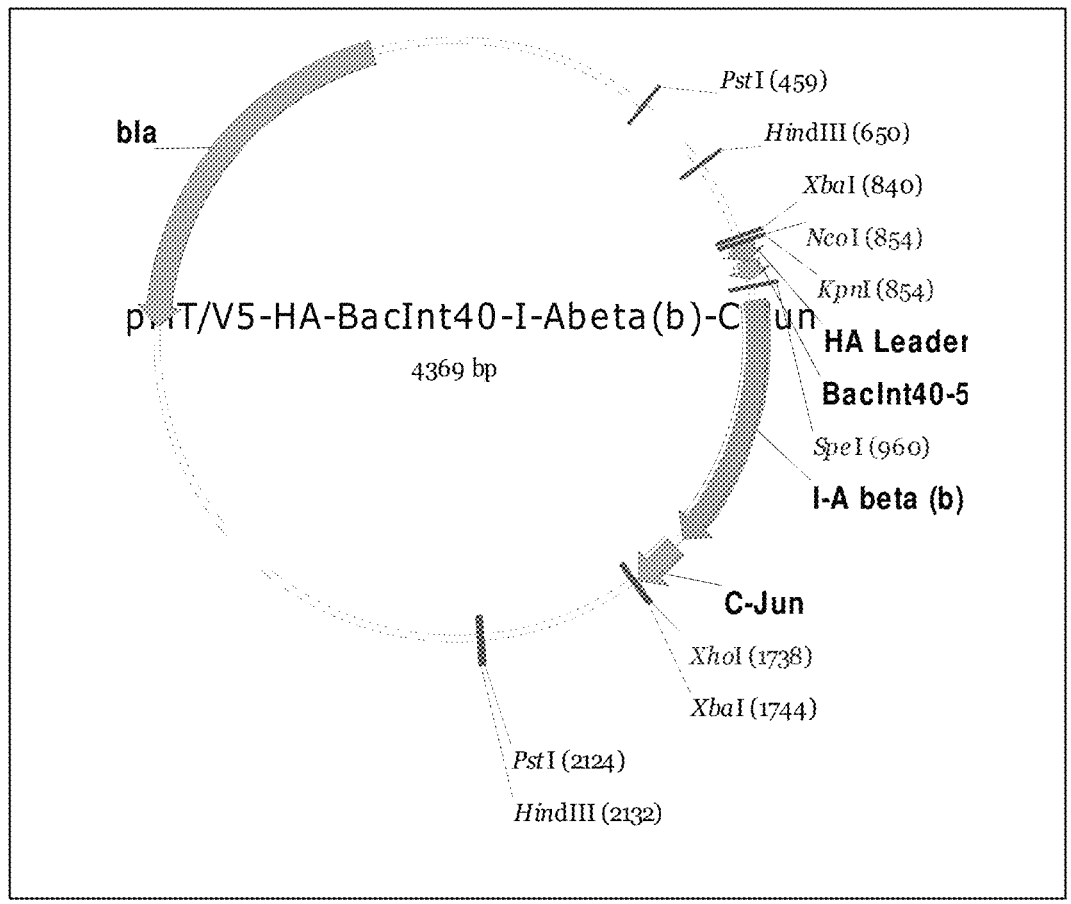
FIG. 7 depicts a map of BacInt$_{40\_54}$-I-Ab-C-Jun in pMT/V5. DNA construct between Nco I (854) to Xho I (1738) sites encodes HA-BacInt$_{40-54}$-I-Abeta (b)-C-Jun fusion protein (293 a.a). The fusion protein includes 15 a.a HA leader sequence followed by BacInt$_{40-54}$ (TNV) peptide (15 a.a.). DNA sequence encoding peptide was linked to I-Abeta (b) (199 a.a.) through a 16 a.a GS linker. C-terminal of I-Abeta (b) was linked to C-Jun sequence (40 a.a,) thorough a 8 a.a GS linker. a.a.=amino acid.
Figure 9:
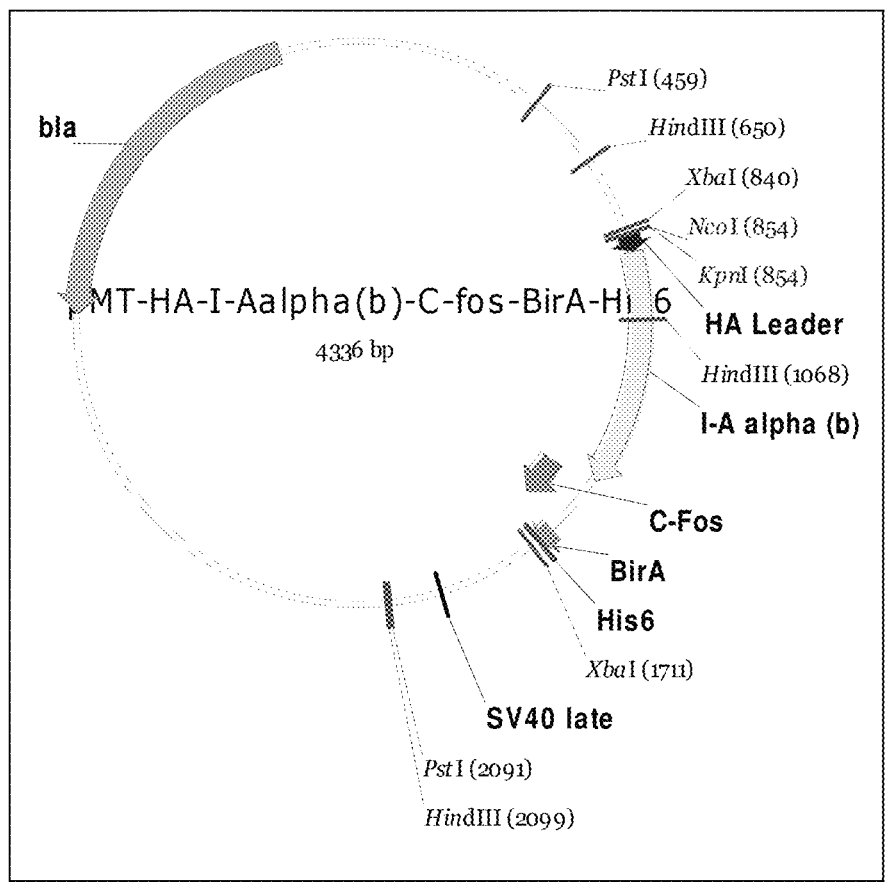
FIG. 9 depicts a map of I-Aalpha (b)-C-Fos-BirA-His6 in pMT/V5. DNA construct sites encoding HA leader- I-Aalpha (b)-C-Fos-BirA-His X 6 fusion protein (284 a.a) was cloned into pMT/V5 fly cell expression vector between Nco I (854) to Xba I (1711). The fusion protein includes I-Aalpha (d) (195 a.a.), followed by C-Fos though a GS linker (6 a.a.), and then BirA sequence and 6 X His.
Figure 11:
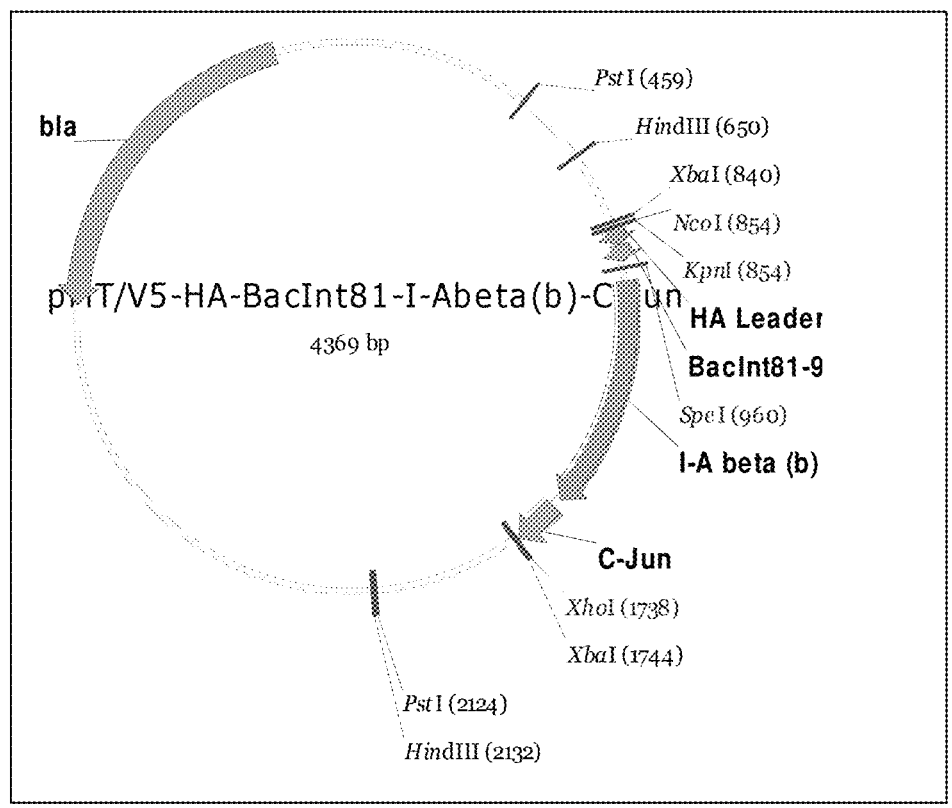
FIG. 11 depicts a map of BacInt$_{81-95}$-I-Ab-C-Jun in pMT/V5. DNA construct between Nco I (854) to Xho I (1738) sites encodes HA-BacInt$_{81-95}$-I-Abeta (b)-C-Jun fusion protein (293 a.a). The fusion protein includes 15 a.a HA leader sequence followed by BecInt$_{81-95}$ (LGY) peptide (15 a.a.). DNA sequence encoding peptide was linked to I-Abeta (b) (199 a.a.) through a 16 a.a GS linker. C-terminal of I-Abeta (b) was linked to C-Jun sequence (40 a.a,) thorough a 8 a.a GS linker.
Figure 13:
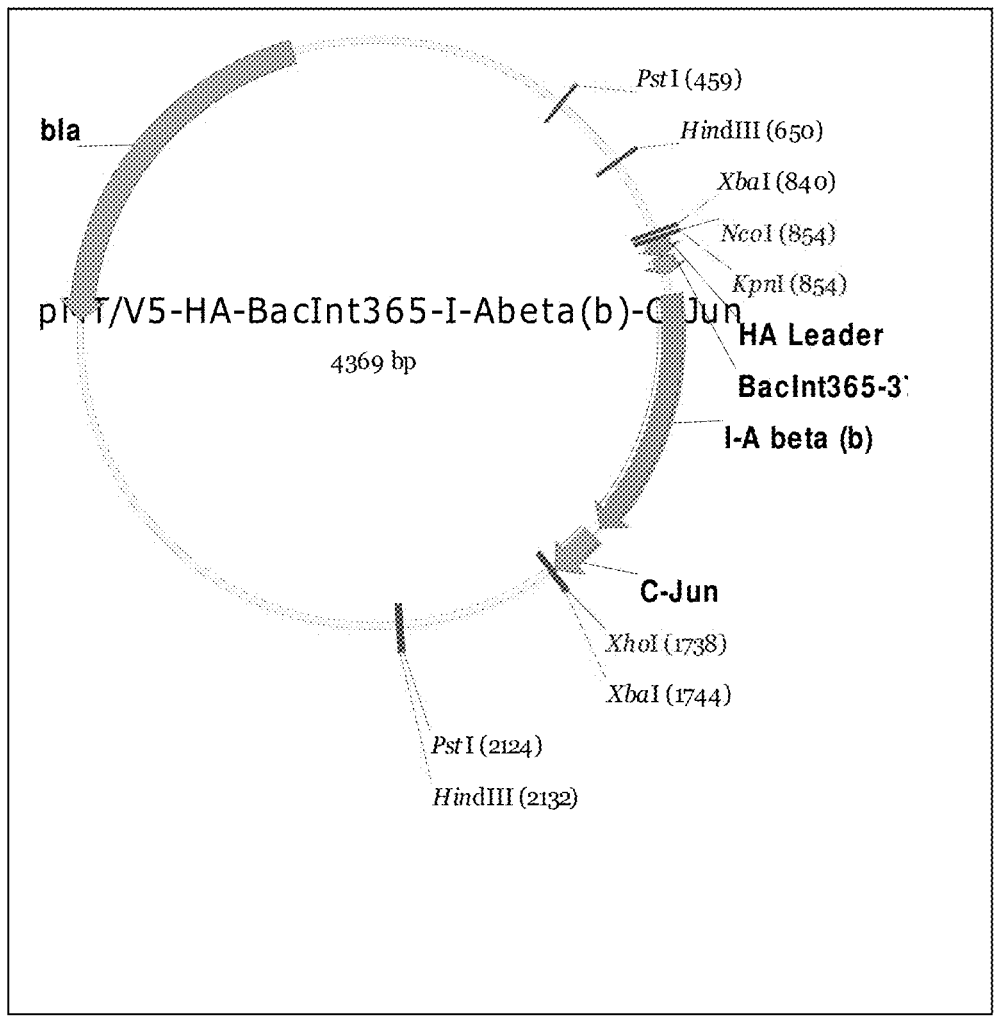
FIG. 13 depicts a map of BacInt$_{365\_379}$-I-Ab-C-Jun in pMT/V5. DNA construct between Nco I (854) to Xho I (1738) sites encodes HA-BacInt$_{365-379}$-I-Abeta (b)-C-Jun fusion protein (293 a.a). The fusion protein includes 15 a.a HA leader sequence followed by BacInt$_{365-379}$ (TQI) peptide (15 a.a.). DNA sequence encoding peptide was linked to I-Abeta (b) (199 a.a.) through a 16 a.a GS linker. C-terminal of I-Abeta (b) was linked to C-Jun sequence (40 a.a,) thorough a 8 a.a GS linker.
Figure 15:
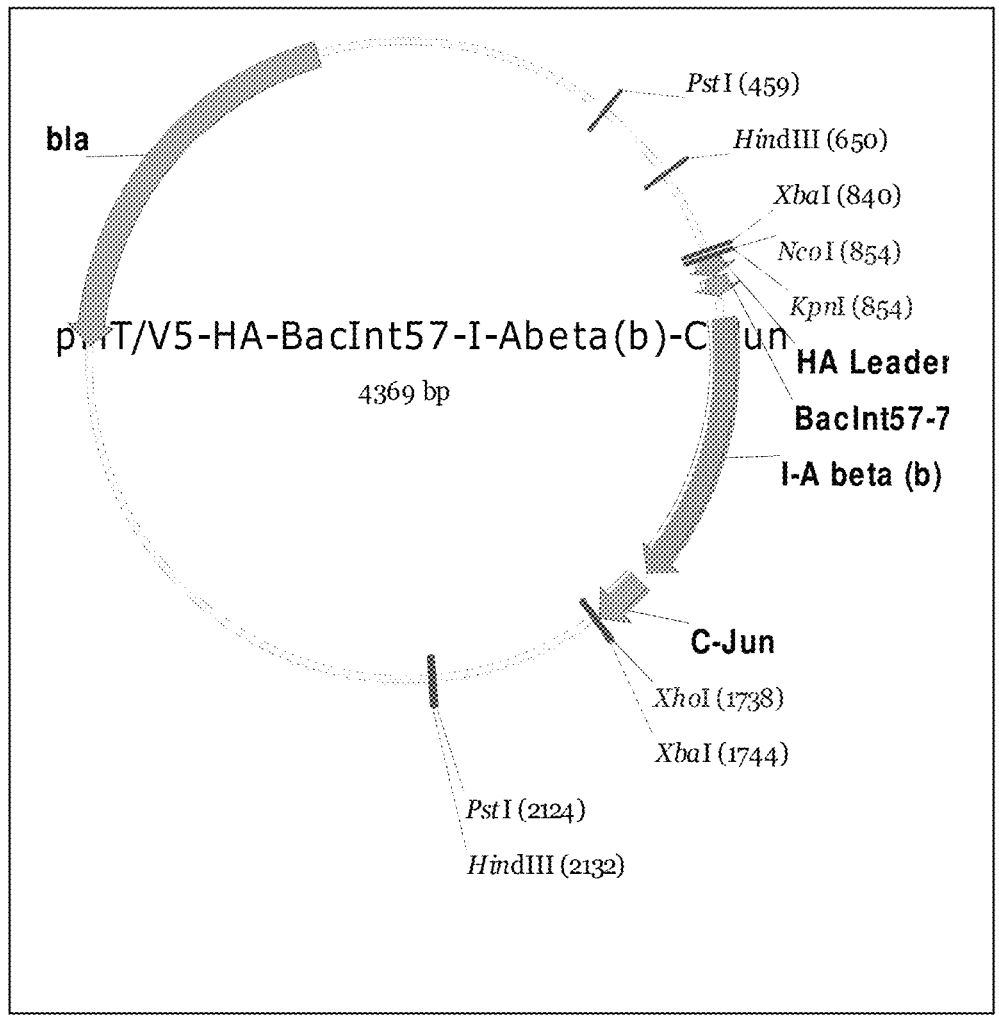
FIG. 15 depicts a map of BacInt$_{57\_71}$-I-Ab-C-Jun in pMT/V5. DNA construct between Nco I (854) to Xho I (1738) sites encodes HA-BacInt$_{57\_71}$-I-Abeta (b)-C-Jun fusion protein (293 a.a). The fusion protein includes 15 a.a HA leader sequence followed by BacInt$_{57-71}$ (INH) peptide (15 a.a.). DNA sequence encoding peptide was linked to I-Abeta (b) (199 a.a.) through a 16 a.a GS linker. C-terminal of I-Abeta (b) was linked to C-Jun sequence (40 a.a,) thorough a 8 a.a GS linker.

The data described herein conclusively demonstrates that the *Bacteroides* Integrase is a bona-fide antigenic target of anti-IBD T-cells in the gut-associated lymphoid tissue. Accordingly, this antigen could be used as a target to foster the recruitment and accumulation of autoregulatory (anti-inflammatory) T-cells to the gut in inflammatory bowel disease. In one embodiment, systemic treatment of subjects with nanoparticles coated with peptide-MHC class I complexes induces antigen-specific CD8+ T cells (8.3-like, both conventional and memory-like autoregulatory). In another embodiment, systemic treatment of subjects with nanoparticles coated with peptide-MHC class II complexes induces antigen-specific T-regulatory-1 (IL-10/TGFb-producing) CD4+ T-cells. In fact, Tr1-like CD4+ T-cells expanded by nanoparticles coated with the NOD mouse class II MHC molecule I-A$^{g7}$ presenting an IGRP-derived autoantigenic epitope accumulate in gut-associated lymphoid tissue, including Peyer's Patches and intra-epithelial lymphocyte aggregates. FIG. 6 shows data from two mice cured from diabetes by treatment with IGRP$_{4-22}$/I-A$^{g7}$-coated nanoparticles—these mice were analyzed at 50 wk of age; GPI/I-A$^{g7}$ tetramer is a negative control tetramer).

Accordingly, nanoparticles coated with MHC class I and/or II molecules presenting epitopes from *Bacteroides* Integrase elicit the expansion of Integrase-specific CD8+ or Tr1-like CD4+ T-cells, most of which will accumulate in the gut, helping restore immune homeostasis in individuals affected with IBD. Thus, the compositions of this disclosure provide this method of treatment as well.

Example 2

Process for Making Antigen-MHC-Nanoparticle Complexes

Inorganic nanoparticles (iron oxide=IONP; gold=GNPs) of a desired size. IONPs are produced via thermal decomposition. IONPs synthesized as such are biocompatible and can be PEGylated for protein conjugation. To coat pMHC and/or other proteins onto IONPs, surfactant-coated NPs are reacted with functionalized PEG linkers of the appropriate length. The linkers are purified by HPLC and characterized by $^1$H-NMR, MALDI/GPC and GPC, to confirm chemical identity, purity, molecular weight and polydispersity. Similar linkers and approaches can be used to coat GNPs, except that the linkers will have a thiol (SH) group at their NP-binding end.

Example 3

Size, Density, and Exposure of pMHC-coated Nanoparitcles

I. Synthesis and Characterization of Gold-Based pMHC-Coated NP.

Gold nanoparticles (GNPs) of specific sizes were synthesized. The size, density, surface charge and monodispersity of the GNP preparations are measured using spectrophotometry, transmission electron microscopy (TEM) and dynamic light scattering. The GNP samples are then concentrated and conjugated with mono-specific pMHC complexes using different approaches as described below. Applicants have developed methods to quantitate the pMHC valency per GNP and to concentrate the pMHC-coated GNP preparations of different sizes at high densities (~10$^{14}$/ml) without compromising monodispersion (FIG. 19).

II. Characterization of the pMHC Binding Capacity of GNPs.

pMHC complexes were coated onto GNPs of various sizes using two different approaches: (i) random binding of pMHC to the GNP surface via electrostatic interactions; and (ii) directional binding through a thiol-PEG-NH$_2$ linker (in this case, an additional thiol-PEG linker as GNP stabilizer was used to prevent aggregation). It was believed that the first approach would enable very high ligand densities (of pMHC per GNP) while compromising the directionality of pMHC binding (i.e. only a fraction of the molecules might become available for recognition by cognate T-lymphocytes). The second approach aimed to generate pMHC-coated GNPs carrying lower densities of pMHC but bound directionally, via their C-termini. Both approaches were tested on GNPs of various diameters, ranging from 14 to 40 nm. It was confirmed that, for both approaches, the pMHC-binding capacity of GNPs is a function of size, and more specifically surface area (higher number of pMHCs on bigger NPs). Surprisingly, it was found that PEG mediated-binding not only ensures the directionality of binding but also enhances the binding capacity of individual GNPs (contrary to initial expectations). Table 1 below summarizes the data.

TABLE 1 pMHC binding capacity of GNPs

| Diameter (nm) | Surface area: ($\times 10^2$ nm$^2$) | pMHCs/GNP (absorption) | pMHCs/GNP (linker) |
|---|---|---|---|
| 14 | 7 | | 212 |
| 20 | 12 | | 3,750 |
| 30 | 28 | 335 | |
| 40 | 50 | 2,850 | 5,250 |

Iii. Agonistic Activity Versus pMHC Content

The effects of pMHC valency, GNP size, GNP density and coating strategy on the functional (agonistic) activity of pMHC-coated GNPs in vitro were tested. The ability of various IGRP$_{206-214}$-K$^d$-GNP preparations to activate cognate (IGRP$_{206-214}$-specific) naive CD8+ T cells (herein referred to as '8.3-CD8+ T-cells') derived from T-cell receptor (TCR) transgenic NOD mice (or 8.3-NOD mice) were compared. The first set of experiments aimed to compare the effects of IGRP$_{206-214}$-K$^d$ (pMHC) valency over a range of GNP densities in the culture. GNPs conjugated with a control (non-cognate) pMHC complex (Tum-K$^d$) were used as negative controls. As expected, IGRP$_{206-214}$-K$^d$-coated (but not TUM-K$^d$-coated) GNPs activated these T cells (as measured by IFNγ production), and they did so in a GNP dose- (hence pMHC dose)-dependent manner. FIG. 20 shows an experiment using ~14 nm GNPs coated with different numbers of pMHC molecules/GNP using the linker method. FIG. 20 compares the amounts of IFNγ secreted by cognate 8.3-CD8+ T-cells in response to two different pMHC-GNP samples (both consisting of ~2×10$^{13}$ GNPs of 14 nm in diameter/ml). Au-022410 and Au-21910 carried ~250 and ~120 pMHCs/GNP, respectively. Au-011810-C carried ~120 control pMHCs/GNP. GNPs coated with ~2-fold higher numbers of pMHC complexes/GNP had superior agonistic activity. Thus, the agonistic activity of pMHC-coated GNPs is a function of total pMHC (GNP) content. These results were counter-intuitive as the state of the art would suggest that, in the absence of costimulatory molecules on the NPs, increasing the numbers of pMHCs on individual NPs would also increase avidity and should promote deletion (cell death), rather than proliferation and cytokine secretion from cognate T-cells. This would be true for both low avidity and high avidity T-cells. For example, previous work by the Applicants (Han et al., Nature Medicine, 2005) and others indicated that peptides recognized with high avidity or peptides recognized with low avidity but given a high concentrations have an increased ability to delete cognate T cells in vivo. Therefore, in the context of therapeutic delivery of intravenous antigen-MHC-coated nanoparticles or soluble peptides, cognate T-cells should undergo deletion in a peptide affinity and dose-dependent manner. This expectation was not met by the data shown in FIG. 20.

Iv. A Valency Threshold in the Agonistic Activity of Peptide-MHC-Nanoparticle Complexes To further investigate the role of peptide-MHC (pMHC) valency on the agonistic properties of pMHC-conjugated nanoparticles (pMHC-NPs), the ability of 8 nm diameter iron-oxide (Fe$_3$O$_4$) NPs covalently coupled with increasing numbers of IGRP$_{206-214}$/K$^d$ pMHC monomers, to trigger the secretion of IFN-gamma (IFNγ) by cognate (IGRP$_{206-214}$/K$^d$-specific) CD8+ T cells (herein referred to as 8.3-CD8+ T-cells) in vitro was compared. As shown in Table 2, 8.3-CD8+ T cells produced negligible amounts of IFNγ when cultured in the presence of NPs coated with 8 pMHC monomers per NP, but produced substantially higher amounts of IFNγ in response to NPs coated with higher pMHC valencies, even as low as 11 pMHC monomers/NP, in a dose-response manner.

TABLE 2

Secretion of IFNγ by 8.3-CD8+ T cells in response to NPs conjugated with increasing pMHC valencies (at 5 × 10$^{11}$ NPs/mL)

| Nanoparticles (NPs) | Core property | Core size (nm) | pMHC Valency | IFNγ responses (ng/mL) |
|---|---|---|---|---|
| IGRP-SFPM-110512 | Fe3O4 | 8 | 8 | 0.03 |
| IGRP-SFP-102912 | Fe3O4 | 8 | 11 | 0.4 |
| IGRP-SFP-012011 | Fe3O4 | 8 | 14 | 0.2 |
| IGRP-SFP-031511 | Fe3O4 | 8 | 15 | 0.15 |
| IGRP-SFP-051211 | Fe3O4 | 8 | 31 | 0.7 |
| IGRP-SFP-100711 | Fe3O4 | 8 | 39 | 0.9 |
| IGRP-SFP-011411 | Fe3O4 | 8 | 54 | 2.3 |

This positive effect of pMHC valency on the agonistic activity of pMHC-NPs was maintained over a range of pMHC-NP densities (FIG. 21). Remarkably, however, whereas 25×10$^{11}$ NPs (per ml) carrying 11 pMHCs/NP had similar agonistic activity as 5×10$^{11}$ NPs (per ml) carrying 54 pMHCs/NP, increasing the number of NPs carrying 8 pMHCs/NP to values as high as 40×10$^{11}$ NPs/ml had minimal effects (FIG. 22). Taken together, these results indicate that there is a threshold of pMHC valency, lying between 9 and 11 pMHCs/NP, below which relatively small increases in the number of NPs (i.e. 5-fold) cannot overcome the low agonistic activity of pMHC-NPs coated at low valencies (it is noted that that the use of >50×10$^{11}$ NPs in these in vitro experiments is not informative due to cellular toxicity caused by high NP densities).

This pMHC valency threshold effect is further illustrated in FIG. 23, where the IFNγ secretion data are normalized to the concentration of total pMHC delivered by the coated NPs in the cultures. NPs carrying 11 pMHCs/NP triggered significantly higher IFNγ responses over a range of pMHC concentrations than those triggered by NPs carrying 8 pMHCs/NP. Furthermore, differences in the agonistic properties of these two NP preparations increased substantially with total pMHC content. That is, differences in the agonistic properties of 2.4 μg/ml of pMHC delivered by the NPs as octamers versus monodecamers were much higher than differences in the agonistic properties of the same formulations at 10-fold lower concentrations of total pMHC.

FIG. 24 shows that these profound effects of pMHC valency on the agonistic properties of pMHC-NPs can also be seen when using larger NPs (which can accept much higher pMHC valencies than the 8 nm NPs studied in FIGS. 21-23) used at lower NP densities (to normalize the total iron oxide content in the cultures). Whereas 18 nm diameter NPs carrying <10 pMHCs/NP had virtually no biological activity up to $4\times10^{11}$ NPs/ml, the agonistic activity of 18 nm diameter NPs carrying higher pMHC valencies increased linearly with NP density. Comparison of FIGS. 23 and 24 further shows that $2\times10^{11}$ 18 nm NPs delivering 61 pMHCs/NP have similar agonistic activity than $2\times10^{11}$ 8 nm NPs delivering a similar number (54) of pMHCs/NP, indicating that the effects of pMHC valency are not significantly affected by NP volume.

Taken together, these data demonstrate that pMHC-coated NPs acquire powerful agonistic activity above a certain pMHC valency threshold (lying between 9 and 11 pMHCs/NP). Increases in either pMHC valency or NP density can enhance the agonistic properties of pMHC-NPs carrying "threshold" or "supra-threshold" pMHC-valencies but not the agonistic properties of NPs carrying "infra-threshold" pMHC valencies.

V. Agonistic Activity Versus NP Size and Density.

Further analysis indicated that total pMHC content is not the only factor affecting the agonistic activity of pMHC-NPs in vitro and that NP size also plays an important independent role. This was investigated by comparing the agonistic activity of two pMHC-GNP samples of different size (14 and 40 nm in diameter, respectively) and different pMHC valencies but under conditions of similar total pMHC content. In the experiment shown in FIG. 25, 14 nm GNPs carrying ~200 pMHC molecules/GNP, and 40 nm GNPs carrying ~5,000 pMHCs/GNP were used. The GNP densities of these two samples was adjusted (to $3\times10^{13}$ and $10^{12}$ GNPs/mL, respectively) to adjust the total pMHC content in each sample to ~450 ug/ml. Notably, 8.3-CD8+ T cells responded significantly better to the 14 nm pMHC/GNP compound than to the 40 nm one over a range of total pMHC contents, despite the fact that the latter were decorated with significantly more pMHC complexes than the former. This suggested that GNP density (more GNPs/cognate T-cell) is key. In other words, 4×40 nm NPs carrying 1000 pMHCs/GNP (4000 pMHCs) would be less desirable than 40×10 nm NPs carrying 100 pMHCs/GNP (4000 pMHCs). Thus, when taken together these data suggest that optimal pMHC-GNP preparations are those comprised of small GNPs used at high pMHC densities. Increasing pMHC valency on these small NPs further increase their surprising and unexpected agonistic properties.

Vi. Agonistic Activity Versus pMHC Exposure.

As noted above, the pMHC-coated GNP samples are produced by co-coating GNPs with a 3.4 kD thiol-PEG-NH$_2$ linker (as acceptor of pMHC carboxitermini) with a thiol-PEG linker that functions as GNP stabilizer. To investigate if the length of the stabilizing thiol-PEG linker influences its GNP anti-aggregation properties, the ability of the thiol-PEG-NH$_2$ linker to bind pMHC molecules and/or the agonistic properties of pMHC-coated GNPs, pMHC-coated GNPs prepared using stabilizing linkers of different sizes (2 kD and 5 kD, shorter and longer than the pMHC-acceptor linker, respectively) were compared. It was found that both linkers had similar anti-aggregation properties, and that the 5 kD linker did not inhibit binding of pMHC to the shorter 3.4 kD thiol-PEG-NH$_2$ linker. Notably, however, pMHC-GNPs that were protected by the shorter (2 kD) thiol-PEG had superior agonistic activity in vitro than those co-coated with the longer (5 kD) thiol-PEG (FIG. 26). This suggests that long protective thiol-PEG linkers shield pMHC molecules bound to the acceptor linker from exposure to cognate T cells.

Vii. Small NPs Covalently Coupled to High Densities of pMHC Afford Maximum Autoregulatory T-Cell Expansion Effects In Vivo.

Nanoparticles having an average diameter of about 10 nm and coupled to either NRP-V7/K$^d$ (also referred to as IGRP$_{206-214}$-K$^d$) or TUM/K$^d$ (control) were made in accordance with the methods described herein, and tested for their ability to induce expansion of cognate autoregulatory CD8+ T cells in vivo. FIG. 27 shows the results of an experiment in which antigen-MHC-GNPs were injected intravenously into 10 week-old wild-type NOD mice mice bi-weekly for 5 consecutive weeks. Changes in the size of the cognate T-cell population in the circulation and different lymphoid tissues in response to therapy were assessed by staining cell suspensions with fluorescently-labeled antigen-MHC tetramers (both cognate as well as irrelevant control tetramers). Administration of 10-100 fewer GNPs than what was has previously been shown in the art (See, for example, Tsai et al., Immunity, 2010 in which nanoparticles coated with 1-8 pMHCs were tested) but coated with 150 antigen-MHCs per GNP resulted in substantially higher expansions (FIG. 27). They expanded CD8+ T-cells in vivo to levels several fold higher (up to 44% of all circulating CD8+ T-cells) than those we typically obtain with nanoparticles coated with a pMHC at a valency of about 8 (1-2% cells in blood; See, for example, Tsai et al., Immunity, 2010, FIG. 1C). The above data indicate that small nanoparticles coated with high antigen-MHC valencies afford maximum T-cell expansion effects. These results were unexpected. Accordingly, it is not the overall avidity of the pMHC-NP-T-cell interaction that is responsible for therapeutic effect, but rather the avidity of the precursor population that gives rise to the T-cells that expand in response to pMHC-NP therapy. This interpretation is consistent with the data described herein and implies that valency of pMHCs on NPs should increase the therapeutic efficacy of pMHC-NPs.

Example 4

Large expansion of cognate CD8+ T-cells by pMHC-GNPs coated at higher pMHC valencies. It was next determined whether pMHC-NPs have the potential to induce massive expansions of cognate T-cells in vivo. This was done by treating mice with several injections of $3\times10^{12}$ 10-14 nm NPs carrying 25 μg of total pMHC (~150 IGRP$_{206-214}$/Kd molecules per NP). As shown in FIG. 28, mice treated with 10 doses (twice a week for 10 week) displayed massive expansions of cognate IGRP$_{206-214}$ (NRP-V7)-reactive CD8+ T-cells in peripheral blood as compared to their untreated counterparts (from <0.4 to >17 or 47% CD8+ T-cells) (lower panels). Such expansion was already seen in a mouse that was sacrificed after 4 doses of pMHC-NPs (upper panels). The pMHC-NP-expanded cells specifically bound cognate but not non-cognate pMHC tetramers (NRP-V7/K$^d$ vs. TUM/K$^d$, respectively).

Example 5

Preparation of pMHC Conjugated Gold NanoParticles pMHC conjugated Gold NanoParticle Preparation (pMHC-GNPs, 12 and 30 nm). Preparation of GNPs. GNPs were prepared by heating D.D. water (200 mL) in a ball flask in a silicon oil bath till boiling. A solution of 1% $HAuCL_4$ (4 mL) was then added into boiling water. The solution was stirred for 10 min before adding of 1% Na Citrate solution. For 12 nm GNPs, 12 mL Na Citrate solution was added. For 30 nm GNPs, 12 mL Na Citrate solution was added. A wine color appears immediately after adding Na Citrate solution. To complete the reaction, GNP solution was stirred for 30 minutes more. This is a modification of the method described in Levy, R. et al. ("Rational and combinatorial design of peptide capping ligands for gold nanoparticles." J Am Chem Soc 126, 10076-84 (2004)) which is herein incorporated by reference.

Surface modification of GNPs. GNPs were pegylated by addition of 25 mM thiol-PEG-$NH_2$ (M. W. 3,400) and 50 mM thiol-PEG (M. W. 2,000, PEG/GNP ratio 10,000:1) into GNP solution. The solution was stirred for 5 hours at room temperature. Pegylated GNPs were then washed with 3×30 mL sterilized D. D. water to remove excess PEGs, and resuspended in 40 mL of 100 mM MES ($C_6H_{13}NO_4S \cdot xH_2O$) buffer, pH 5.5.

pMHC conjugation. pMHCs ($IGRP_{206-214}$/Kd, 4 mg) was added into solution of pegylated GNPs, drop-by-drop with mild stirring at room temperature. The mixture is stirred for one hour before the addition of 20 mg 1-Ethyl-3-(3-dimethylaminopropyl) carbodiimide (EDC). The mixture is stirred for additional 4 hrs. pMHC-GNPs conjugates are then washed with 40 mL Phosphate Buffered Saline (PBS, PH 7.2-7.4) for three times, and resuspended in 8 mL PBS.

Example 6

Preparation of pMHC Conjugated Gold NanoParticles

Preparation of pMHC conjugated GNPs (pMHC-GNPs, 2-10 nm). Prepare GNPs (2-5 nm). GNPs of 2-5 nm were prepared by dissolving 250 mg (for 2 nm GNPs) or 50 mg (for 4 nm GNPs) Dodecylamine in 10 mL of DDAB solution (100 mM Didodecyldimethylammonium bromide (DDAB) in Toluene). Secondly, 100 mg Tetrabutylammonium borohydride (TBAB) was dissolved in 4 mL of DDAB solution. Solutions of Dodecylamine and TBAB were then mixed in a 50 mL three-neck flask, stirring under nitrogen. 34 mg $AuCl_3$ was resolved in 4.5 mL DDAB solution, and injected quickly into a mixture of TBAB and Dodecylamine solution. Solution becomes deep red immediately, indicating the formation of GNPs. The mixture was continuously stirred for 30 min, and 15 mLs of ethanol were added into the mixture. The mixture was then spun at 4,100×g for 12 min to precipitate GNPs.

Prepare GNPs (6-10 nm). To prepare GNPs of 6-10 nm Decanoic acid (172 mg) was first dissolved in 10 mL Toluene, and then mixed with various amounts of TBAB solution (4 and 1 mL for 6 and 10 nm GNPs, respectively) in a 50 mL three-neck flask, when stirring under nitrogen. $AuCl_3$ (34 mg dissolved in in 4.5 mL DDAB stock solution) was then quickly injected into the mixture of TBAB and Decanoic acid solution. The solution became deep red immediately. The mixture was continuously stirred for 30 min, and 15 mL ethanol was added into the mixture. The mixture is then spun at 4,100×g for 12 min to precipitate GNPs.

Surface modification of GNPs. GNPs were resuspended in 20 mL of 0.1 M mercaptopropanoic acid (MPA) in methanol, pH 10 and stirred for one hour at room temperature. 10 mL ethyl acetate was then added. The mixture was then spun at 4,100×g for 15 min. The precipitated GNPs were then washed with 30 mL sterilized D.D. water for three times, and resuspended in 20 mL 100 mM MES ($C_6H_{13}NO_4S \cdot xH_2O$) buffer, pH 5.5. To this mixture, solutions of 0.5 M Polyoxyethylene bis(amine) (at 10,000:1 PEG/GNP ratio) and 0.1M 1-Ethyl-3-(3-dimethylaminopropyl) carbodiimide (EDC) (final EDC concentration 2 mM) were added. The mixture was then stirred for 4 hours. The pegylated GNPs were washed with 3×30 mL sterilized D.D. water to remove excess PEG and EDC.

pMHC conjugation. Pegylated GNPs were resuspended in 20 mL 100 mM MES ($C_6H_{13}NO_4S \cdot xH_2O$) buffer, pH 5.5. pMHCs (5 mg/mL, total 10-30 mg) were then added to resuspended GNPs (500:1 pMHC/GNP ratio), drop-by-drop, and stirred for 1 hour at room temperature before adding 0.1M 1-Ethyl-3-(3-dimethylaminopropyl) carbodiimide (EDC) (final EDC concentration 2 mM). The mixture was stirred for 4 more hours. pMHC-GNPs conjugates were washed three with 40 mL Phosphate Buffered Saline (PBS, PH 7.2-7.4), and then resuspended in 10-20 mL PBS.

It should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention. The materials, methods, and examples provided here are representative of preferred embodiments, are exemplary, and are not intended as limitations on the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

In addition, where features or aspects of the invention are described in terms of Markush groups, those skilled in the art will recognize that the invention is also thereby described in terms of any individual member or subgroup of members of the Markush group.

Throughout this disclosure, various publications, patents and published patent specifications are referenced by an identifying citation. All publications, patent applications, patents, and other references mentioned herein are expressly incorporated by reference in their entirety, to the same extent as if each were incorporated by reference individually. In case of conflict, the present specification, including definitions, will control.

What is claimed is:

1. A method for treating inflammation in the gastrointestinal (GI) tract of a patient in need thereof comprising parenterally administering to the patient an effective amount of a nanoparticle composition, wherein the composition does not comprise an adjuvant, wherein the composition comprises a plurality of nanoparticle cores, each nanoparticle core coupled to a plurality of peptide antigen-MHC complexes, wherein:
- the peptide antigen comprises a peptide having at least 80% identity to a peptide sequence chosen from SEQ ID NO:4 to SEQ ID NO:8 across the entire length;
- the nanoparticle core has a diameter from about 1 nm to about 100 nm; and
- the ratio of peptide antigen-MHC complexes per nanoparticle core is from about 10:1 to about 1000:1; and
- the peptide antigen is a T cell epitope.

2. The method of claim 1, wherein the nanoparticle core has a diameter of from about 5 nm to about 50 nm and wherein the ratio of peptide antigen-MHC complexes per nanoparticle core is from about 50:1 to about 500:1.

3. The method of claim 1 or 2, wherein the patient suffers from a gastrointestinal disease of the group: inflammatory bowel disease, colitis, Crohn's disease, allergic inflammation of the gastrointestinal tract, and celiac disease.

4. The method of claim 1 or 2, wherein inflammation of the gastrointestinal tract is treated.

5. The method of any one of claims 1 or 2, wherein the nanoparticle core further comprises a biodegradable layer on the outer surface of the nanoparticle core and the antigen MHC complexes are coupled to the nanoparticle core or the biodegradable layer on the nanoparticle core.

6. The method of claim 5, wherein the biodegradable layer comprises one or more of dextran, mannitol, or poly(ethylene glycol).

7. The method of claim 5, wherein the antigen-MHC complexes are covalently linked or non-covalently linked to the nanoparticle core or the biodegradable layer.

8. The method of claim 5, wherein the antigen-MHC complexes are covalently linked to the nanoparticle core or the biodegradable layer through a linker less than 5 kD in size.

9. The method of claim 8, wherein the linker comprises poly(ethylene) glycol.

10. The method of claim 5, wherein the nanoparticle core comprises a metal, a metal oxide, a metal sulfide, a metal selenide, a magnetic material, or a polymer.

11. The method of claim 10, wherein the metal is gold or iron, and the metal oxide is iron oxide.

12. The method of claim 1, wherein the nanoparticle composition is administered intravenously.

13. The method of claim 1, wherein the nanoparticle composition is administered subcutaneously.

14. The method of claim 1, wherein the peptide comprises an amino acid sequence having at least 80% identity to SEQ ID NO:4 across the entire length.

15. The method of claim 1, wherein the peptide comprises an amino acid sequence having at least 80% identity to SEQ ID NO:5 across the entire length.

16. The method of claim 1, wherein the peptide comprises an amino acid sequence having at least 80% identity to SEQ ID NO:6 across the entire length.

17. The method of claim 1, wherein the peptide comprises an amino acid sequence having at least 80% identity to SEQ ID NO:7 across the entire length.

18. The method of claim 1, wherein the peptide comprises an amino acid sequence having at least 80% identity to SEQ ID NO:8 across the entire length.

* * * * *

SEQUENCE LISTING

<160> NUMBER OF SEQ ID NOS: 21

<210> SEQ ID NO 1
<211> LENGTH: 9
<212> TYPE: PRT

<213> ORGANISM: Bacteroides sp.

<400> SEQUENCE: 1

Ile Tyr Leu Lys Thr Asn Val Tyr Leu
1               5

<210> SEQ ID NO 2
<211> LENGTH: 407
<212> TYPE: PRT
<213> ORGANISM: Bacteroides vulgatus

<400> SEQUENCE: 2

Met Leu Glu Lys Ile Arg Tyr Arg Leu Val Phe Asn Arg Gln Lys Lys
1               5                   10                  15

Leu Asn Lys Gln Gly Thr Ala Leu Val Gln Val Glu Ala Tyr Leu Asn
                20                  25                  30

Gln Arg Lys Ile Tyr Leu Lys Thr Asn Val Tyr Leu Lys Pro Glu Cys
            35                  40                  45

Trp Ser Arg Glu Gly Ala Gln Val Ile Asn His Pro Gln Ser Asn Glu
    50                  55                  60

Leu Asn Ala Met Leu Tyr Glu Tyr Ile Leu Tyr Leu Gln Gly Ile Glu
65                  70                  75                  80

Leu Gly Tyr Trp Lys Arg Gly Ile Pro Ala Thr Leu Ser Leu Leu Lys
                85                  90                  95

Asp Ala Val Lys Lys Ser Ala Val Asn Val Ser Phe Ser Thr Phe
            100                 105                 110

Ala Lys Ser Ala Ile Asp Asn Ser Asp Lys Lys Gln Ser Thr Lys Asp
        115                 120                 125

Asn Leu His Ser Thr Leu Ala Val Leu Asn Asp Phe Arg Ser Gly Leu
    130                 135                 140

Asp Phe Lys Asp Leu Thr Tyr Thr Phe Leu Arg Asp Phe Glu Gln Tyr
145                 150                 155                 160

Leu Arg Glu Lys Gly Asn Ala Val Asn Thr Ile Ala Lys His Met Arg
                165                 170                 175

Gln Leu Arg Thr Leu Val Asn Glu Ala Ile Asn Gln Gly Tyr Met His
            180                 185                 190

Ala Asp Ala Tyr Pro Phe Arg Lys Tyr Lys Ile Lys Gln Glu Lys Gly
        195                 200                 205

Arg His Glu Phe Leu Thr Pro Asp Glu Leu Lys Lys Leu Glu Thr Val
    210                 215                 220

Glu Val Glu Glu Lys Ser Met Arg His Val Leu Asp Ala Phe Leu Phe
225                 230                 235                 240

Cys Cys Tyr Thr Gly Leu Arg Tyr Ser Asp Phe Cys Gln Leu Thr Pro
                245                 250                 255

Glu Asn Phe Ile Arg Val Asn Gly Lys Arg Trp Leu Tyr Phe Lys Ser
            260                 265                 270

Val Lys Thr Gly Val Glu Ile Arg Leu Pro Leu His Leu Phe Glu
        275                 280                 285

Ser Arg Ala Leu Gly Ile Leu Asp Arg Tyr Pro Asp Ile Gly Ser Leu
    290                 295                 300

Val Ser Leu Pro Cys Asn Ser Glu Val Asn Gln Leu Arg Lys Leu
305                 310                 315                 320

Thr Gly Leu Cys Gly Ile Lys Lys Arg Ile Thr Tyr His Val Ser Arg
                325                 330                 335

His Thr Cys Ala Thr Leu Leu Val His Gln Gly Val Ala Ile Thr Thr 340             345             350
Val Gln Lys Leu Leu Gly His Thr Ser Val Lys Thr Thr Gln Ile Tyr
                355             360             365

Ser Glu Val Leu Ser Ser Thr Ile Val Arg Asp Leu Lys Asn Val Gln
            370             375             380

Arg Lys Arg Lys Lys Val Lys Met Phe Pro Asp Lys Gly Leu Arg Thr
385             390             395             400

Ser Asp Phe Ile Asp Asn Arg
                405

<210> SEQ ID NO 3
<211> LENGTH: 1224
<212> TYPE: DNA
<213> ORGANISM: Bacteroides vulgatus

<400> SEQUENCE: 3
atgctagaga agatacgata caggttggtc tttaaccgcc aaaagaaact gaataagcaa       60
ggcacggccc ttgtacaggt tgaagcctat ttgaaccaaa ggaaaatcta cctgaagacc      120
aatgtttacc tcaaaccgga gtgctggagc cgtgaggggg cacaagtcat taaccacccc      180
caatctaacg aactcaacgc aatgctctat gaatacatcc tgtatctgca aggcatagag      240
ttggggtatt ggaagcgcgg aatacctgcc acactctcac tactgaagga tgctgtcaag      300
aagaaaagtg ccgtgaatgt cagcttctcc actttcgcca atcagccat gacaattcg       360
gacaagaagc agtccaccaa ggacaacctg cactcgacac tggcggtcct gaatgacttc      420
cgttccggat tggacttcaa ggatcttacc tatacattcc ttcgtgattt tgagcaatat      480
ttaagggaaa agggcaatgc ggtcaatacg atagccaagc acatgagaca gctccgtacc      540
ttggtcaatg aggcaatcaa ccagggatat atgcacgcgg acgcttatcc gttcagaaag      600
tacaaaatca acaggagaa aggcagacat gagtttctta ccccggacga gctgaagaag      660
ctggaaacgg tcgaagtgga agagaagtcc atgcgccatg tgctcgatgc cttcctgttc      720
tgctgttata ccggattgcg ctattctgac ttctgccagc tcacacctga gaatttcatt      780
agagtaaacg gcaaacggtg gctgtacttc aaatccgtca agacaggggt ggaaatccgt      840
ctgccgttac atctgctgtt tgaaagcagg gcattgggca ttcttgaccg ttatccggat      900
ataggtagtc ttgtatccct accctgtaac tcggaagtga ataagcagct tcgaaagctg      960
accggattgt gtggtatcaa aaacggata acctaccatg tgagccgtca tacctgtgcc     1020
accctgctgg ttcatcaggg agttgcgatt acaacagtcc agaagctgct cggacatact     1080
tccgtaaaga ccacacagat ttattcggag gtactttcca gcaccattgt gcgtgacttg     1140
aaaaatgttc aaaggaaaag gaaaaaagta aagatgtttc ctgataaagg cttgagaaca     1200
tctgattta tagacaaccg gtag                                            1224

<210> SEQ ID NO 4
<211> LENGTH: 15
<212> TYPE: PRT
<213> ORGANISM: Bacteroides vulgatus

<400> SEQUENCE: 4

Thr Asn Val Tyr Leu Lys Pro Glu Cys Trp Ser Arg Glu Gly Ala
1               5                   10                  15

<210> SEQ ID NO 5
<211> LENGTH: 15
<212> TYPE: PRT

-continued

<213> ORGANISM: Bacteroides vulgatus

<400> SEQUENCE: 5

Leu Gly Tyr Trp Lys Arg Gly Ile Pro Ala Thr Leu Ser Leu Leu
1               5                   10                  15

<210> SEQ ID NO 6
<211> LENGTH: 15
<212> TYPE: PRT
<213> ORGANISM: Bacteroides vulgatus

<400> SEQUENCE: 6

Thr Gln Ile Tyr Ser Glu Val Leu Ser Ser Thr Ile Val Arg Asp
1               5                   10                  15

<210> SEQ ID NO 7
<211> LENGTH: 15
<212> TYPE: PRT
<213> ORGANISM: Bacteroides vulgatus

<400> SEQUENCE: 7

Ile Asn His Pro Gln Ser Asn Glu Leu Asn Ala Met Leu Tyr Glu
1               5                   10                  15

<210> SEQ ID NO 8
<211> LENGTH: 15
<212> TYPE: PRT
<213> ORGANISM: Bacteroides vulgatus

<400> SEQUENCE: 8

Ile Pro Ala Thr Leu Ser Leu Leu Lys Asp Ala Val Lys Lys Lys
1               5                   10                  15

<210> SEQ ID NO 9
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 9

His His His His His His
1               5

<210> SEQ ID NO 10
<211> LENGTH: 894
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(879)

<400> SEQUENCE: 10 atg gct atc atc tac ctc atc ctc ctg ttc acc gct gtg cgg ggc acc      48
Met Ala Ile Ile Tyr Leu Ile Leu Leu Phe Thr Ala Val Arg Gly Thr
1               5                   10                  15 aat gtt tac ctc aaa ccg gag tgc tgg agc cgt gag ggg gca gga ggt      96
Asn Val Tyr Leu Lys Pro Glu Cys Trp Ser Arg Glu Gly Ala Gly Gly
                20                  25                  30 gga ggc tca cta gtg ccc cga ggc tct gga ggt gga ggc tct gga gac     144
Gly Gly Ser Leu Val Pro Arg Gly Ser Gly Gly Gly Gly Ser Gly Asp
            35                  40                  45

```
tcc gaa agg cat ttc gtg tac cag ttc atg ggc gag tgc tac ttc acc      192
Ser Glu Arg His Phe Val Tyr Gln Phe Met Gly Glu Cys Tyr Phe Thr
    50                  55                  60 aac ggg acg cag cgc ata cga tat gtg acc aga tac atc tac aac cgg      240
Asn Gly Thr Gln Arg Ile Arg Tyr Val Thr Arg Tyr Ile Tyr Asn Arg
65                  70                  75                  80 gag gag tac gtg cgc tac gac agc gac gtg ggc gag cac cgc gcg gtg      288
Glu Glu Tyr Val Arg Tyr Asp Ser Asp Val Gly Glu His Arg Ala Val
                85                  90                  95 acc gag ctg ggg cgg cca gac gcc gag tac tgg aac agc cag ccg gag      336
Thr Glu Leu Gly Arg Pro Asp Ala Glu Tyr Trp Asn Ser Gln Pro Glu
            100                 105                 110 atc ctg gag cga acg cgg gcc gag ctg gac acg gtg tgc aga cac aac      384
Ile Leu Glu Arg Thr Arg Ala Glu Leu Asp Thr Val Cys Arg His Asn
        115                 120                 125 tac gag ggg ccg gag acc cac acc tcc ctg cgg cgg ctt gaa cag ccc      432
Tyr Glu Gly Pro Glu Thr His Thr Ser Leu Arg Arg Leu Glu Gln Pro
    130                 135                 140 aat gtc gtc atc tcc ctg tcc agg aca gag gcc ctc aac cac cac aac      480
Asn Val Val Ile Ser Leu Ser Arg Thr Glu Ala Leu Asn His His Asn
145                 150                 155                 160 act ctg gtc tgc tca gtg aca gat ttc tac cca gcc aag atc aaa gtg      528
Thr Leu Val Cys Ser Val Thr Asp Phe Tyr Pro Ala Lys Ile Lys Val
                165                 170                 175 cgc tgg ttc cgg aat ggc cag gag gag acg gtg ggg gtc tca tcc aca      576
Arg Trp Phe Arg Asn Gly Gln Glu Glu Thr Val Gly Val Ser Ser Thr
            180                 185                 190 cag ctt att agg aat ggg gac tgg acc ttc cag gtc ctg gtc atg ctg      624
Gln Leu Ile Arg Asn Gly Asp Trp Thr Phe Gln Val Leu Val Met Leu
        195                 200                 205 gag atg acc cct cgg cgg gga gag gtc tac acc tgt cac gtg gag cat      672
Glu Met Thr Pro Arg Arg Gly Glu Val Tyr Thr Cys His Val Glu His
    210                 215                 220 ccc agc ctg aag agc ccc atc act gtg gag tgg agg gca cag tct gag      720
Pro Ser Leu Lys Ser Pro Ile Thr Val Glu Trp Arg Ala Gln Ser Glu
225                 230                 235                 240 tct gcc tgg agc aag gga gga gga ggt ggc gga gga cgg atc gct          768
Ser Ala Trp Ser Lys Gly Gly Gly Gly Gly Gly Gly Arg Ile Ala
                245                 250                 255 cgg cta gag gaa aaa gtg aaa acc ttg aaa gcg caa aac tcc gag ctg      816
Arg Leu Glu Glu Lys Val Lys Thr Leu Lys Ala Gln Asn Ser Glu Leu
            260                 265                 270 gcg tcc acg gcc aac atg ctc agg gaa cag gtg gca cag ctt aag cag      864
Ala Ser Thr Ala Asn Met Leu Arg Glu Gln Val Ala Gln Leu Lys Gln
        275                 280                 285 aaa gtc atg aac cac tgactcgagt ctaga                                 894
Lys Val Met Asn His
    290

<210> SEQ ID NO 11
<211> LENGTH: 293
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 11

Met Ala Ile Ile Tyr Leu Ile Leu Leu Phe Thr Ala Val Arg Gly Thr
1               5                   10                  15
```

Asn Val Tyr Leu Lys Pro Glu Cys Trp Ser Arg Glu Gly Ala Gly Gly
            20                  25                  30

Gly Gly Ser Leu Val Pro Arg Gly Ser Gly Gly Gly Ser Gly Asp
        35                  40                  45

Ser Glu Arg His Phe Val Tyr Gln Phe Met Gly Glu Cys Tyr Phe Thr
 50                  55                  60

Asn Gly Thr Gln Arg Ile Arg Tyr Val Thr Arg Tyr Ile Tyr Asn Arg
 65                  70                  75                  80

Glu Glu Tyr Val Arg Tyr Asp Ser Asp Val Gly Glu His Arg Ala Val
                 85                  90                  95

Thr Glu Leu Gly Arg Pro Asp Ala Glu Tyr Trp Asn Ser Gln Pro Glu
            100                 105                 110

Ile Leu Glu Arg Thr Arg Ala Glu Leu Asp Thr Val Cys Arg His Asn
        115                 120                 125

Tyr Glu Gly Pro Glu Thr His Thr Ser Leu Arg Arg Leu Glu Gln Pro
130                 135                 140

Asn Val Val Ile Ser Leu Ser Arg Thr Glu Ala Leu Asn His His Asn
145                 150                 155                 160

Thr Leu Val Cys Ser Val Thr Asp Phe Tyr Pro Ala Lys Ile Lys Val
                165                 170                 175

Arg Trp Phe Arg Asn Gly Gln Glu Glu Thr Val Gly Val Ser Ser Thr
            180                 185                 190

Gln Leu Ile Arg Asn Gly Asp Trp Thr Phe Gln Val Leu Val Met Leu
        195                 200                 205

Glu Met Thr Pro Arg Arg Gly Glu Val Tyr Thr Cys His Val Glu His
210                 215                 220

Pro Ser Leu Lys Ser Pro Ile Thr Val Glu Trp Arg Ala Gln Ser Glu
225                 230                 235                 240

Ser Ala Trp Ser Lys Gly Gly Gly Gly Gly Gly Gly Arg Ile Ala
                245                 250                 255

Arg Leu Glu Glu Lys Val Lys Thr Leu Lys Ala Gln Asn Ser Glu Leu
            260                 265                 270

Ala Ser Thr Ala Asn Met Leu Arg Glu Gln Val Ala Gln Leu Lys Gln
        275                 280                 285

Lys Val Met Asn His
        290

<210> SEQ ID NO 12
<211> LENGTH: 861
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(852)

<400> SEQUENCE: 12 atg gct atc atc tac ctc atc ctc ctg ttc acc gct gtg cgg ggc gaa      48
Met Ala Ile Ile Tyr Leu Ile Leu Leu Phe Thr Ala Val Arg Gly Glu
1               5                   10                  15 gac gac att gag gcc gac cac gta ggc acc tat ggt ata agt gta tat      96
Asp Asp Ile Glu Ala Asp His Val Gly Thr Tyr Gly Ile Ser Val Tyr
            20                  25                  30 cag tct cct gga gac att ggc cag tac aca ttt gaa ttt gat ggt gat     144
Gln Ser Pro Gly Asp Ile Gly Gln Tyr Thr Phe Glu Phe Asp Gly Asp
        35                  40                  45

```
gag ttg ttc tat gtg gac ttg gat aag aag gag act gtc tgg atg ctt    192
Glu Leu Phe Tyr Val Asp Leu Asp Lys Lys Glu Thr Val Trp Met Leu
    50                  55                  60 cct gag ttt ggc caa ttg gca agc ttt gac ccc caa ggt gga ctg caa    240
Pro Glu Phe Gly Gln Leu Ala Ser Phe Asp Pro Gln Gly Gly Leu Gln
65                  70                  75                  80 aac ata gct gta gta aaa cac aac ttg gga gtc ttg act aag agg tca    288
Asn Ile Ala Val Val Lys His Asn Leu Gly Val Leu Thr Lys Arg Ser
                85                  90                  95 aat tcc acc cca gct acc aat gag gct cct caa gcg act gtg ttc ccc    336
Asn Ser Thr Pro Ala Thr Asn Glu Ala Pro Gln Ala Thr Val Phe Pro
            100                 105                 110 aag tcc cct gtg ctg ctg ggt cag ccc aac acc ctc atc tgc ttt gtg    384
Lys Ser Pro Val Leu Leu Gly Gln Pro Asn Thr Leu Ile Cys Phe Val
        115                 120                 125 gac aac atc ttc cct cct gtg atc aac atc aca tgg ctc aga aat agc    432
Asp Asn Ile Phe Pro Pro Val Ile Asn Ile Thr Trp Leu Arg Asn Ser
130                 135                 140 aag tca gtc gca gac ggt gtt tat gag acc agc ttc ttc gtc aac cgt    480
Lys Ser Val Ala Asp Gly Val Tyr Glu Thr Ser Phe Phe Val Asn Arg
145                 150                 155                 160 gac tat tcc ttc cac aag ctg tct tat ctc acc ttc atc cct tct gac    528
Asp Tyr Ser Phe His Lys Leu Ser Tyr Leu Thr Phe Ile Pro Ser Asp
                165                 170                 175 gat gac att tat gac tgc aag gtg gaa cac tgg ggc ctg gag gag ccg    576
Asp Asp Ile Tyr Asp Cys Lys Val Glu His Trp Gly Leu Glu Glu Pro
            180                 185                 190 gtt ctg aaa cac tgg gaa cct gag att cca gcc ccc atg tca gag ctg    624
Val Leu Lys His Trp Glu Pro Glu Ile Pro Ala Pro Met Ser Glu Leu
        195                 200                 205 aca gag tcc gga ggc gga ggc gga ctg aca gat aca ctc caa gcg gag    672
Thr Glu Ser Gly Gly Gly Gly Gly Leu Thr Asp Thr Leu Gln Ala Glu
210                 215                 220 aca gat caa ctt gaa gac gag aag tct gcg ttg cag acc gag att gcc    720
Thr Asp Gln Leu Glu Asp Glu Lys Ser Ala Leu Gln Thr Glu Ile Ala
225                 230                 235                 240 aat cta ctg aaa gag aag gaa aaa ctg gag ttt att ttg gca gcc cac    768
Asn Leu Leu Lys Glu Lys Glu Lys Leu Glu Phe Ile Leu Ala Ala His
                245                 250                 255 ggt agt ggt agt ggt agt gga tct ctg ggt ggt atc ttc gag gct atg    816
Gly Ser Gly Ser Gly Ser Gly Ser Leu Gly Gly Ile Phe Glu Ala Met
            260                 265                 270 aag atg gag ctg cgc gat cat cac cat cac cat cac tgatctaga          861
Lys Met Glu Leu Arg Asp His His His His His His
        275                 280

<210> SEQ ID NO 13
<211> LENGTH: 284
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 13

Met Ala Ile Ile Tyr Leu Ile Leu Leu Phe Thr Ala Val Arg Gly Glu
1               5                   10                  15

Asp Asp Ile Glu Ala Asp His Val Gly Thr Tyr Gly Ile Ser Val Tyr
            20                  25                  30

Gln Ser Pro Gly Asp Ile Gly Gln Tyr Thr Phe Glu Phe Asp Gly Asp
```

-continued

```
                35                  40                  45
Glu Leu Phe Tyr Val Asp Leu Asp Lys Lys Glu Thr Val Trp Met Leu
 50                  55                  60

Pro Glu Phe Gly Gln Leu Ala Ser Phe Asp Pro Gln Gly Gly Leu Gln
 65                  70                  75                  80

Asn Ile Ala Val Val Lys His Asn Leu Gly Val Leu Thr Lys Arg Ser
                 85                  90                  95

Asn Ser Thr Pro Ala Thr Asn Glu Ala Pro Gln Ala Thr Val Phe Pro
                100                 105                 110

Lys Ser Pro Val Leu Leu Gly Gln Pro Asn Thr Leu Ile Cys Phe Val
            115                 120                 125

Asp Asn Ile Phe Pro Pro Val Ile Asn Ile Thr Trp Leu Arg Asn Ser
        130                 135                 140

Lys Ser Val Ala Asp Gly Val Tyr Glu Thr Ser Phe Phe Val Asn Arg
145                 150                 155                 160

Asp Tyr Ser Phe His Lys Leu Ser Tyr Leu Thr Phe Ile Pro Ser Asp
                165                 170                 175

Asp Asp Ile Tyr Asp Cys Lys Val Glu His Trp Gly Leu Glu Glu Pro
            180                 185                 190

Val Leu Lys His Trp Glu Pro Glu Ile Pro Ala Pro Met Ser Glu Leu
        195                 200                 205

Thr Glu Ser Gly Gly Gly Gly Leu Thr Asp Thr Leu Gln Ala Glu
    210                 215                 220

Thr Asp Gln Leu Glu Asp Glu Lys Ser Ala Leu Gln Thr Glu Ile Ala
225                 230                 235                 240

Asn Leu Leu Lys Glu Lys Glu Lys Leu Glu Phe Ile Leu Ala Ala His
                245                 250                 255

Gly Ser Gly Ser Gly Ser Gly Ser Leu Gly Gly Ile Phe Glu Ala Met
            260                 265                 270

Lys Met Glu Leu Arg Asp His His His His His
        275                 280

<210> SEQ ID NO 14
<211> LENGTH: 894
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(879)

<400> SEQUENCE: 14 atg gct atc atc tac ctc atc ctc ctg ttc acc gct gtg cgg ggc ttg     48
Met Ala Ile Ile Tyr Leu Ile Leu Leu Phe Thr Ala Val Arg Gly Leu
 1               5                  10                  15 ggg tat tgg aag cgc gga ata cct gcc aca ctc tca cta ctg gga ggt     96
Gly Tyr Trp Lys Arg Gly Ile Pro Ala Thr Leu Ser Leu Leu Gly Gly
                20                  25                  30 gga ggc tca cta gtg ccc cga ggc tct gga ggt gga ggc tct gga gac    144
Gly Gly Ser Leu Val Pro Arg Gly Ser Gly Gly Gly Gly Ser Gly Asp
            35                  40                  45 tcc gaa agg cat ttc gtg tac cag ttc atg ggc gag tgc tac ttc acc    192
Ser Glu Arg His Phe Val Tyr Gln Phe Met Gly Glu Cys Tyr Phe Thr
        50                  55                  60 aac ggg acg cag cgc ata cga tat gtg acc aga tac atc tac aac cgg    240
Asn Gly Thr Gln Arg Ile Arg Tyr Val Thr Arg Tyr Ile Tyr Asn Arg
```

```
                65                  70                  75                  80
gag gag tac gtg cgc tac gac agc gac gtg ggc gag cac cgc gcg gtg            288
Glu Glu Tyr Val Arg Tyr Asp Ser Asp Val Gly Glu His Arg Ala Val
                    85                  90                  95 acc gag ctg ggg cgg cca gac gcc gag tac tgg aac agc cag ccg gag            336
Thr Glu Leu Gly Arg Pro Asp Ala Glu Tyr Trp Asn Ser Gln Pro Glu
                100                 105                 110 atc ctg gag cga acg cgg gcc gag ctg gac acg gtg tgc aga cac aac            384
Ile Leu Glu Arg Thr Arg Ala Glu Leu Asp Thr Val Cys Arg His Asn
            115                 120                 125 tac gag ggg ccg gag acc cac acc tcc ctg cgg cgg ctt gaa cag ccc            432
Tyr Glu Gly Pro Glu Thr His Thr Ser Leu Arg Arg Leu Glu Gln Pro
        130                 135                 140 aat gtc gtc atc tcc ctg tcc agg aca gag gcc ctc aac cac cac aac            480
Asn Val Val Ile Ser Leu Ser Arg Thr Glu Ala Leu Asn His His Asn
145                 150                 155                 160 act ctg gtc tgc tca gtg aca gat ttc tac cca gcc aag atc aaa gtg            528
Thr Leu Val Cys Ser Val Thr Asp Phe Tyr Pro Ala Lys Ile Lys Val
                    165                 170                 175 cgc tgg ttc cgg aat ggc cag gag gag acg gtg ggg gtc tca tcc aca            576
Arg Trp Phe Arg Asn Gly Gln Glu Glu Thr Val Gly Val Ser Ser Thr
                180                 185                 190 cag ctt att agg aat ggg gac tgg acc ttc cag gtc ctg gtc atg ctg            624
Gln Leu Ile Arg Asn Gly Asp Trp Thr Phe Gln Val Leu Val Met Leu
            195                 200                 205 gag atg acc cct cgg cgg gga gag gtc tac acc tgt cac gtg gag cat            672
Glu Met Thr Pro Arg Arg Gly Glu Val Tyr Thr Cys His Val Glu His
        210                 215                 220 ccc agc ctg aag agc ccc atc act gtg gag tgg agg gca cag tct gag            720
Pro Ser Leu Lys Ser Pro Ile Thr Val Glu Trp Arg Ala Gln Ser Glu
225                 230                 235                 240 tct gcc tgg agc aag gga gga gga ggt ggc gga gga cgg atc gct            768
Ser Ala Trp Ser Lys Gly Gly Gly Gly Gly Gly Gly Arg Ile Ala
                    245                 250                 255 cgg cta gag gaa aaa gtg aaa acc ttg aaa gcg caa aac tcc gag ctg            816
Arg Leu Glu Glu Lys Val Lys Thr Leu Lys Ala Gln Asn Ser Glu Leu
                260                 265                 270 gcg tcc acg gcc aac atg ctc agg gaa cag gtg gca cag ctt aag cag            864
Ala Ser Thr Ala Asn Met Leu Arg Glu Gln Val Ala Gln Leu Lys Gln
            275                 280                 285 aaa gtc atg aac cac tgactcgagt ctaga                                      894
Lys Val Met Asn His
        290

<210> SEQ ID NO 15
<211> LENGTH: 293
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Met Ala Ile Ile Tyr Leu Ile Leu Leu Phe Thr Ala Val Arg Gly Leu
1               5                   10                  15

Gly Tyr Trp Lys Arg Gly Ile Pro Ala Thr Leu Ser Leu Leu Gly Gly
                20                  25                  30

Gly Gly Ser Leu Val Pro Arg Gly Ser Gly Gly Gly Ser Gly Asp
            35                  40                  45

Ser Glu Arg His Phe Val Tyr Gln Phe Met Gly Glu Cys Tyr Phe Thr
```

```
        50                  55                  60
Asn Gly Thr Gln Arg Ile Arg Tyr Val Thr Arg Tyr Ile Tyr Asn Arg
 65                  70                  75                  80

Glu Glu Tyr Val Arg Tyr Asp Ser Asp Val Gly Glu His Arg Ala Val
                 85                  90                  95

Thr Glu Leu Gly Arg Pro Asp Ala Glu Tyr Trp Asn Ser Gln Pro Glu
            100                 105                 110

Ile Leu Glu Arg Thr Arg Ala Glu Leu Asp Thr Val Cys Arg His Asn
        115                 120                 125

Tyr Glu Gly Pro Glu Thr His Thr Ser Leu Arg Arg Leu Glu Gln Pro
130                 135                 140

Asn Val Val Ile Ser Leu Ser Arg Thr Glu Ala Leu Asn His His Asn
145                 150                 155                 160

Thr Leu Val Cys Ser Val Thr Asp Phe Tyr Pro Ala Lys Ile Lys Val
                165                 170                 175

Arg Trp Phe Arg Asn Gly Gln Glu Glu Thr Val Gly Val Ser Ser Thr
            180                 185                 190

Gln Leu Ile Arg Asn Gly Asp Trp Thr Phe Gln Val Leu Val Met Leu
        195                 200                 205

Glu Met Thr Pro Arg Arg Gly Glu Val Tyr Thr Cys His Val Glu His
210                 215                 220

Pro Ser Leu Lys Ser Pro Ile Thr Val Glu Trp Arg Ala Gln Ser Glu
225                 230                 235                 240

Ser Ala Trp Ser Lys Gly Gly Gly Gly Gly Gly Gly Arg Ile Ala
                245                 250                 255

Arg Leu Glu Glu Lys Val Lys Thr Leu Lys Ala Gln Asn Ser Glu Leu
            260                 265                 270

Ala Ser Thr Ala Asn Met Leu Arg Glu Gln Val Ala Gln Leu Lys Gln
        275                 280                 285

Lys Val Met Asn His
    290

<210> SEQ ID NO 16
<211> LENGTH: 900
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (15)..(893)

<400> SEQUENCE: 16
tagatcgggg tacc atg gct atc atc tac ctc atc ctc ctg ttc acc gct        50
                Met Ala Ile Ile Tyr Leu Ile Leu Leu Phe Thr Ala
                  1               5                  10 gtg cgg ggc aca cag att tat tcg gag gta ctt tcc agc acc att gtg        98
Val Arg Gly Thr Gln Ile Tyr Ser Glu Val Leu Ser Ser Thr Ile Val
         15                  20                  25 cgt gac gga ggt gga ggc tca cta gtg ccc cga ggc tct gga ggt gga       146
Arg Asp Gly Gly Gly Gly Ser Leu Val Pro Arg Gly Ser Gly Gly Gly
     30                  35                  40 ggc tct gga gac tcc gaa agg cat ttc gtg tac cag ttc atg ggc gag       194
Gly Ser Gly Asp Ser Glu Arg His Phe Val Tyr Gln Phe Met Gly Glu
 45                  50                  55                  60 tgc tac ttc acc aac ggg acg cag cgc ata cga tat gtg acc aga tac       242
Cys Tyr Phe Thr Asn Gly Thr Gln Arg Ile Arg Tyr Val Thr Arg Tyr
```

```
                          65                  70                  75
atc tac aac cgg gag gag tac gtg cgc tac gac agc gac gtg ggc gag       290
Ile Tyr Asn Arg Glu Glu Tyr Val Arg Tyr Asp Ser Asp Val Gly Glu
             80                  85                  90 cac cgc gcg gtg acc gag ctg ggg cgg cca gac gcc gag tac tgg aac       338
His Arg Ala Val Thr Glu Leu Gly Arg Pro Asp Ala Glu Tyr Trp Asn
         95                 100                 105 agc cag ccg gag atc ctg gag cga acg cgg gcc gag ctg gac acg gtg       386
Ser Gln Pro Glu Ile Leu Glu Arg Thr Arg Ala Glu Leu Asp Thr Val
     110                 115                 120 tgc aga cac aac tac gag ggg ccg gag acc cac acc tcc ctg cgg cgg       434
Cys Arg His Asn Tyr Glu Gly Pro Glu Thr His Thr Ser Leu Arg Arg
125                 130                 135                 140 ctt gaa cag ccc aat gtc gtc atc tcc ctg tcc agg aca gag gcc ctc       482
Leu Glu Gln Pro Asn Val Val Ile Ser Leu Ser Arg Thr Glu Ala Leu
                145                 150                 155 aac cac cac aac act ctg gtc tgc tca gtg aca gat ttc tac cca gcc       530
Asn His His Asn Thr Leu Val Cys Ser Val Thr Asp Phe Tyr Pro Ala
            160                 165                 170 aag atc aaa gtg cgc tgg ttc cgg aat ggc cag gag gag acg gtg ggg       578
Lys Ile Lys Val Arg Trp Phe Arg Asn Gly Gln Glu Glu Thr Val Gly
        175                 180                 185 gtc tca tcc aca cag ctt att agg aat ggg gac tgg acc ttc cag gtc       626
Val Ser Ser Thr Gln Leu Ile Arg Asn Gly Asp Trp Thr Phe Gln Val
    190                 195                 200 ctg gtc atg ctg gag atg acc cct cgg cgg gga gag gtc tac acc tgt       674
Leu Val Met Leu Glu Met Thr Pro Arg Arg Gly Glu Val Tyr Thr Cys
205                 210                 215                 220 cac gtg gag cat ccc agc ctg aag agc ccc atc act gtg gag tgg agg       722
His Val Glu His Pro Ser Leu Lys Ser Pro Ile Thr Val Glu Trp Arg
                225                 230                 235 gca cag tct gag tct gcc tgg agc aag gga ggc gga ggc ggt ggc gga       770
Ala Gln Ser Glu Ser Ala Trp Ser Lys Gly Gly Gly Gly Gly Gly Gly
            240                 245                 250 gga cgg atc gct cgg cta gag gaa aaa gtg aaa acc ttg aaa gcg caa       818
Gly Arg Ile Ala Arg Leu Glu Glu Lys Val Lys Thr Leu Lys Ala Gln
        255                 260                 265 aac tcc gag ctg gcg tcc acg gcc aac atg ctc agg gaa cag gtg gca       866
Asn Ser Glu Leu Ala Ser Thr Ala Asn Met Leu Arg Glu Gln Val Ala
    270                 275                 280 cag ctt aag cag aaa gtc atg aac cac tgactcg                           900
Gln Leu Lys Gln Lys Val Met Asn His
285                 290
```

<210> SEQ ID NO 17
<211> LENGTH: 293
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Met Ala Ile Ile Tyr Leu Ile Leu Leu Phe Thr Ala Val Arg Gly Thr
1               5                   10                  15

Gln Ile Tyr Ser Glu Val Leu Ser Ser Thr Ile Val Arg Asp Gly Gly
            20                  25                  30

Gly Gly Ser Leu Val Pro Arg Gly Ser Gly Gly Gly Ser Gly Asp
        35                  40                  45

Ser Glu Arg His Phe Val Tyr Gln Phe Met Gly Glu Cys Tyr Phe Thr

```
                  50                  55                  60
Asn Gly Thr Gln Arg Ile Arg Tyr Val Thr Arg Tyr Ile Tyr Asn Arg
 65                  70                  75                  80

Glu Glu Tyr Val Arg Tyr Asp Ser Asp Val Gly Glu His Arg Ala Val
                 85                  90                  95

Thr Glu Leu Gly Arg Pro Asp Ala Glu Tyr Trp Asn Ser Gln Pro Glu
                100                 105                 110

Ile Leu Glu Arg Thr Arg Ala Glu Leu Asp Thr Val Cys Arg His Asn
                115                 120                 125

Tyr Glu Gly Pro Glu Thr His Thr Ser Leu Arg Arg Leu Glu Gln Pro
        130                 135                 140

Asn Val Val Ile Ser Leu Ser Arg Thr Glu Ala Leu Asn His His Asn
145                 150                 155                 160

Thr Leu Val Cys Ser Val Thr Asp Phe Tyr Pro Ala Lys Ile Lys Val
                165                 170                 175

Arg Trp Phe Arg Asn Gly Gln Glu Glu Thr Val Gly Val Ser Ser Thr
                180                 185                 190

Gln Leu Ile Arg Asn Gly Asp Trp Thr Phe Gln Val Leu Val Met Leu
        195                 200                 205

Glu Met Thr Pro Arg Arg Gly Glu Val Tyr Thr Cys His Val Glu His
210                 215                 220

Pro Ser Leu Lys Ser Pro Ile Thr Val Glu Trp Arg Ala Gln Ser Glu
225                 230                 235                 240

Ser Ala Trp Ser Lys Gly Gly Gly Gly Gly Gly Gly Arg Ile Ala
                245                 250                 255

Arg Leu Glu Glu Lys Val Lys Thr Leu Lys Ala Gln Asn Ser Glu Leu
                260                 265                 270

Ala Ser Thr Ala Asn Met Leu Arg Glu Gln Val Ala Gln Leu Lys Gln
        275                 280                 285

Lys Val Met Asn His
    290

<210> SEQ ID NO 18
<211> LENGTH: 900
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (15)..(893)

<400> SEQUENCE: 18
tagatcgggg tacc atg gct atc atc tac ctc atc ctc ctg ttc acc gct         50
                Met Ala Ile Ile Tyr Leu Ile Leu Leu Phe Thr Ala
                 1               5                  10 gtg cgg ggc att aac cac ccc caa tct aac gaa ctc aac gca atg ctc         98
Val Arg Gly Ile Asn His Pro Gln Ser Asn Glu Leu Asn Ala Met Leu
     15                  20                  25 tat gaa gga ggt gga ggc tca cta gtg ccc cga ggc tct gga ggt gga       146
Tyr Glu Gly Gly Gly Gly Ser Leu Val Pro Arg Gly Ser Gly Gly Gly
 30                  35                  40 ggc tct gga gac tcc gaa agg cat ttc gtg tac cag ttc atg ggc gag       194
Gly Ser Gly Asp Ser Glu Arg His Phe Val Tyr Gln Phe Met Gly Glu
 45                  50                  55                  60 tgc tac ttc acc aac ggg acg cag cgc ata cga tat gtg acc aga tac       242
Cys Tyr Phe Thr Asn Gly Thr Gln Arg Ile Arg Tyr Val Thr Arg Tyr
```

```
                65                  70                  75
atc tac aac cgg gag gag tac gtg cgc tac gac agc gac gtg ggc gag        290
Ile Tyr Asn Arg Glu Glu Tyr Val Arg Tyr Asp Ser Asp Val Gly Glu
             80                  85                  90 cac cgc gcg gtg acc gag ctg ggg cgg cca gac gcc gag tac tgg aac        338
His Arg Ala Val Thr Glu Leu Gly Arg Pro Asp Ala Glu Tyr Trp Asn
         95                 100                 105 agc cag ccg gag atc ctg gag cga acg cgg gcc gag ctg gac acg gtg        386
Ser Gln Pro Glu Ile Leu Glu Arg Thr Arg Ala Glu Leu Asp Thr Val
    110                 115                 120 tgc aga cac aac tac gag ggg ccg gag acc cac acc tcc ctg cgg cgg        434
Cys Arg His Asn Tyr Glu Gly Pro Glu Thr His Thr Ser Leu Arg Arg
125                 130                 135                 140 ctt gaa cag ccc aat gtc gtc atc tcc ctg tcc agg aca gag gcc ctc        482
Leu Glu Gln Pro Asn Val Val Ile Ser Leu Ser Arg Thr Glu Ala Leu
                145                 150                 155 aac cac cac aac act ctg gtc tgc tca gtg aca gat ttc tac cca gcc        530
Asn His His Asn Thr Leu Val Cys Ser Val Thr Asp Phe Tyr Pro Ala
            160                 165                 170 aag atc aaa gtg cgc tgg ttc cgg aat ggc cag gag gag acg gtg ggg        578
Lys Ile Lys Val Arg Trp Phe Arg Asn Gly Gln Glu Glu Thr Val Gly
        175                 180                 185 gtc tca tcc aca cag ctt att agg aat ggg gac tgg acc ttc cag gtc        626
Val Ser Ser Thr Gln Leu Ile Arg Asn Gly Asp Trp Thr Phe Gln Val
    190                 195                 200 ctg gtc atg ctg gag atg acc cct cgg cgg gga gag gtc tac acc tgt        674
Leu Val Met Leu Glu Met Thr Pro Arg Arg Gly Glu Val Tyr Thr Cys
205                 210                 215                 220 cac gtg gag cat ccc agc ctg aag agc ccc atc act gtg gag tgg agg        722
His Val Glu His Pro Ser Leu Lys Ser Pro Ile Thr Val Glu Trp Arg
                225                 230                 235 gca cag tct gag tct gcc tgg agc aag gga ggc gga ggc ggt ggc gga        770
Ala Gln Ser Glu Ser Ala Trp Ser Lys Gly Gly Gly Gly Gly Gly Gly
            240                 245                 250 gga cgg atc gct cgg cta gag gaa aaa gtg aaa acc ttg aaa gcg caa        818
Gly Arg Ile Ala Arg Leu Glu Glu Lys Val Lys Thr Leu Lys Ala Gln
        255                 260                 265 aac tcc gag ctg gcg tcc acg gcc aac atg ctc agg gaa cag gtg gca        866
Asn Ser Glu Leu Ala Ser Thr Ala Asn Met Leu Arg Glu Gln Val Ala
    270                 275                 280 cag ctt aag cag aaa gtc atg aac cac tgactcg                            900
Gln Leu Lys Gln Lys Val Met Asn His
285                 290

<210> SEQ ID NO 19
<211> LENGTH: 293
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 19

Met Ala Ile Ile Tyr Leu Ile Leu Leu Phe Thr Ala Val Arg Gly Ile
1               5                   10                  15

Asn His Pro Gln Ser Asn Glu Leu Asn Ala Met Leu Tyr Glu Gly Gly
            20                  25                  30

Gly Gly Ser Leu Val Pro Arg Gly Ser Gly Gly Gly Ser Gly Asp
        35                  40                  45

Ser Glu Arg His Phe Val Tyr Gln Phe Met Gly Glu Cys Tyr Phe Thr
```

```
            50                  55                  60
Asn Gly Thr Gln Arg Ile Arg Tyr Val Thr Arg Tyr Ile Tyr Asn Arg
 65                  70                  75                  80

Glu Glu Tyr Val Arg Tyr Asp Ser Asp Val Gly Glu His Arg Ala Val
                 85                  90                  95

Thr Glu Leu Gly Arg Pro Asp Ala Glu Tyr Trp Asn Ser Gln Pro Glu
            100                 105                 110

Ile Leu Glu Arg Thr Arg Ala Glu Leu Asp Thr Val Cys Arg His Asn
        115                 120                 125

Tyr Glu Gly Pro Glu Thr His Thr Ser Leu Arg Arg Leu Glu Gln Pro
130                 135                 140

Asn Val Val Ile Ser Leu Ser Arg Thr Glu Ala Leu Asn His His Asn
145                 150                 155                 160

Thr Leu Val Cys Ser Val Thr Asp Phe Tyr Pro Ala Lys Ile Lys Val
                165                 170                 175

Arg Trp Phe Arg Asn Gly Gln Glu Glu Thr Val Gly Val Ser Ser Thr
            180                 185                 190

Gln Leu Ile Arg Asn Gly Asp Trp Thr Phe Gln Val Leu Val Met Leu
        195                 200                 205

Glu Met Thr Pro Arg Arg Gly Glu Val Tyr Thr Cys His Val Glu His
210                 215                 220

Pro Ser Leu Lys Ser Pro Ile Thr Val Glu Trp Arg Ala Gln Ser Glu
225                 230                 235                 240

Ser Ala Trp Ser Lys Gly Gly Gly Gly Gly Gly Gly Arg Ile Ala
                245                 250                 255

Arg Leu Glu Glu Lys Val Lys Thr Leu Lys Ala Gln Asn Ser Glu Leu
            260                 265                 270

Ala Ser Thr Ala Asn Met Leu Arg Glu Gln Val Ala Gln Leu Lys Gln
        275                 280                 285

Lys Val Met Asn His
    290

<210> SEQ ID NO 20
<211> LENGTH: 900
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (15)..(893)

<400> SEQUENCE: 20
tagatcgggg tacc atg gct atc atc tac ctc atc ctc ctg ttc acc gct        50
                Met Ala Ile Ile Tyr Leu Ile Leu Leu Phe Thr Ala
                 1               5                  10 gtg cgg ggc ata cct gcc aca ctc tca cta ctg aag gat gct gtc aag        98
Val Arg Gly Ile Pro Ala Thr Leu Ser Leu Leu Lys Asp Ala Val Lys
         15                  20                  25 aag aaa gga ggt gga ggc tca cta gtg ccc cga ggc tct gga ggt gga       146
Lys Lys Gly Gly Gly Gly Ser Leu Val Pro Arg Gly Ser Gly Gly Gly
     30                  35                  40 ggc tct gga gac tcc gaa agg cat ttc gtg tac cag ttc atg ggc gag       194
Gly Ser Gly Asp Ser Glu Arg His Phe Val Tyr Gln Phe Met Gly Glu
 45                  50                  55                  60 tgc tac ttc acc aac ggg acg cag cgc ata cga tat gtg acc aga tac       242
Cys Tyr Phe Thr Asn Gly Thr Gln Arg Ile Arg Tyr Val Thr Arg Tyr
```

```
                65                  70                  75
atc tac aac cgg gag gag tac gtg cgc tac gac agc gac gtg ggc gag    290
Ile Tyr Asn Arg Glu Glu Tyr Val Arg Tyr Asp Ser Asp Val Gly Glu
            80                  85                  90 cac cgc gcg gtg acc gag ctg ggg cgg cca gac gcc gag tac tgg aac    338
His Arg Ala Val Thr Glu Leu Gly Arg Pro Asp Ala Glu Tyr Trp Asn
        95                  100                 105 agc cag ccg gag atc ctg gag cga acg cgg gcc gag ctg gac acg gtg    386
Ser Gln Pro Glu Ile Leu Glu Arg Thr Arg Ala Glu Leu Asp Thr Val
    110                 115                 120 tgc aga cac aac tac gag ggg ccg gag acc cac acc tcc ctg cgg cgg    434
Cys Arg His Asn Tyr Glu Gly Pro Glu Thr His Thr Ser Leu Arg Arg
125                 130                 135                 140 ctt gaa cag ccc aat gtc gtc atc tcc ctg tcc agg aca gag gcc ctc    482
Leu Glu Gln Pro Asn Val Val Ile Ser Leu Ser Arg Thr Glu Ala Leu
                145                 150                 155 aac cac cac aac act ctg gtc tgc tca gtg aca gat ttc tac cca gcc    530
Asn His His Asn Thr Leu Val Cys Ser Val Thr Asp Phe Tyr Pro Ala
            160                 165                 170 aag atc aaa gtg cgc tgg ttc cgg aat ggc cag gag gag acg gtg ggg    578
Lys Ile Lys Val Arg Trp Phe Arg Asn Gly Gln Glu Glu Thr Val Gly
        175                 180                 185 gtc tca tcc aca cag ctt att agg aat ggg gac tgg acc ttc cag gtc    626
Val Ser Ser Thr Gln Leu Ile Arg Asn Gly Asp Trp Thr Phe Gln Val
    190                 195                 200 ctg gtc atg ctg gag atg acc cct cgg cgg gga gag gtc tac acc tgt    674
Leu Val Met Leu Glu Met Thr Pro Arg Arg Gly Glu Val Tyr Thr Cys
205                 210                 215                 220 cac gtg gag cat ccc agc ctg aag agc ccc atc act gtg gag tgg agg    722
His Val Glu His Pro Ser Leu Lys Ser Pro Ile Thr Val Glu Trp Arg
                225                 230                 235 gca cag tct gag tct gcc tgg agc aag gga ggc gga ggc ggt ggc gga    770
Ala Gln Ser Glu Ser Ala Trp Ser Lys Gly Gly Gly Gly Gly Gly Gly
            240                 245                 250 gga cgg atc gct cgg cta gag gaa aaa gtg aaa acc ttg aaa gcg caa    818
Gly Arg Ile Ala Arg Leu Glu Glu Lys Val Lys Thr Leu Lys Ala Gln
        255                 260                 265 aac tcc gag ctg gcg tcc acg gcc aac atg ctc agg gaa cag gtg gca    866
Asn Ser Glu Leu Ala Ser Thr Ala Asn Met Leu Arg Glu Gln Val Ala
    270                 275                 280 cag ctt aag cag aaa gtc atg aac cac tgactcg                        900
Gln Leu Lys Gln Lys Val Met Asn His
285                 290

<210> SEQ ID NO 21
<211> LENGTH: 293
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Met Ala Ile Ile Tyr Leu Ile Leu Leu Phe Thr Ala Val Arg Gly Ile
1               5                   10                  15

Pro Ala Thr Leu Ser Leu Leu Lys Asp Ala Val Lys Lys Gly Gly
            20                  25                  30

Gly Gly Ser Leu Val Pro Arg Gly Ser Gly Gly Gly Ser Gly Asp
        35                  40                  45

Ser Glu Arg His Phe Val Tyr Gln Phe Met Gly Glu Cys Tyr Phe Thr
```

```
            50                  55                  60
Asn Gly Thr Gln Arg Ile Arg Tyr Val Thr Arg Tyr Ile Tyr Asn Arg
 65                  70                  75                  80

Glu Glu Tyr Val Arg Tyr Asp Ser Asp Val Gly Glu His Arg Ala Val
                 85                  90                  95

Thr Glu Leu Gly Arg Pro Asp Ala Glu Tyr Trp Asn Ser Gln Pro Glu
                100                 105                 110

Ile Leu Glu Arg Thr Arg Ala Glu Leu Asp Thr Val Cys Arg His Asn
            115                 120                 125

Tyr Glu Gly Pro Glu Thr His Thr Ser Leu Arg Arg Leu Glu Gln Pro
    130                 135                 140

Asn Val Val Ile Ser Leu Ser Arg Thr Glu Ala Leu Asn His His Asn
145                 150                 155                 160

Thr Leu Val Cys Ser Val Thr Asp Phe Tyr Pro Ala Lys Ile Lys Val
                165                 170                 175

Arg Trp Phe Arg Asn Gly Gln Glu Glu Thr Val Gly Val Ser Ser Thr
                180                 185                 190

Gln Leu Ile Arg Asn Gly Asp Trp Thr Phe Gln Val Leu Val Met Leu
            195                 200                 205

Glu Met Thr Pro Arg Arg Gly Glu Val Tyr Thr Cys His Val Glu His
    210                 215                 220

Pro Ser Leu Lys Ser Pro Ile Thr Val Glu Trp Arg Ala Gln Ser Glu
225                 230                 235                 240

Ser Ala Trp Ser Lys Gly Gly Gly Gly Gly Gly Arg Ile Ala
                245                 250                 255

Arg Leu Glu Glu Lys Val Lys Thr Leu Lys Ala Gln Asn Ser Glu Leu
                260                 265                 270

Ala Ser Thr Ala Asn Met Leu Arg Glu Gln Val Ala Gln Leu Lys Gln
                275                 280                 285

Lys Val Met Asn His
            290
```